(12) United States Patent
Arnone et al.

(10) Patent No.: US 10,380,836 B2
(45) Date of Patent: *Aug. 13, 2019

(54) NETWORKED HYBRID GAMING SYSTEM

(71) Applicant: Gamblit Gaming, LLC, Glendale, CA (US)

(72) Inventors: Miles Arnone, Sherborn, MA (US); Frank Cire, Pasadena, CA (US); Eric Meyerhofer, Pasadena, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,594

(22) Filed: May 29, 2018

(65) Prior Publication Data

US 2018/0276944 A1    Sep. 27, 2018

Related U.S. Application Data

(63) Continuation of application No. 15/245,040, filed on Aug. 23, 2016, now Pat. No. 9,984,530, which is a
(Continued)

(51) Int. Cl.
*A63F 13/31* (2014.01)
*G07F 17/32* (2006.01)
(Continued)

(52) U.S. Cl.
CPC .......... *G07F 17/3225* (2013.01); *A63F 13/31* (2014.09); *A63F 13/335* (2014.09);
(Continued)

(58) Field of Classification Search
None
See application file for complete search history.

(56) References Cited

U.S. PATENT DOCUMENTS 5,413,357 A    5/1995    Schulze et al.
5,718,429 A    2/1998    Keller
(Continued)

FOREIGN PATENT DOCUMENTS

JP    2001300098 A    10/2001
JP    2003111980 A    4/2003
(Continued)

OTHER PUBLICATIONS

U.S. Appl. No. 14/625,475 Arnone, et al. filed Feb. 18, 2015.
(Continued)

*Primary Examiner* — Ronald Laneau
(74) *Attorney, Agent, or Firm* — Frank Cire; Caitlyn Ross

(57) ABSTRACT

A networked gaming system administering a multi-user entertainment game; modifying player actions based on wagers, modifying the game state based on the player actions, and distributing the modified game state to a second player using entertainment software controllers wherein each entertainment software controller is connected to one of a plurality of game world controllers; a plurality of game world controllers, wherein each game world controller is connected to the game server and one of a plurality of real world controllers.

20 Claims, 31 Drawing Sheets

Related U.S. Application Data continuation of application No. 14/679,885, filed on Apr. 6, 2015, now Pat. No. 9,449,466, which is a continuation of application No. 14/186,393, filed on Feb. 21, 2014, now Pat. No. 8,998,707, which is a continuation of application No. PCT/US2013/026761, filed on Feb. 19, 2013.

(60) Provisional application No. 61/613,597, filed on Mar. 21, 2012, provisional application No. 61/602,039, filed on Feb. 22, 2012, provisional application No. 61/600,147, filed on Feb. 17, 2012.

(51) Int. Cl.
A63F 13/335 (2014.01)
A63F 13/80 (2014.01)
A63F 13/65 (2014.01)
A63F 13/792 (2014.01)
A63F 13/352 (2014.01)

(52) U.S. Cl.
CPC ............ *A63F 13/352* (2014.09); *A63F 13/65* (2014.09); *A63F 13/792* (2014.09); *A63F 13/80* (2014.09); *G07F 17/32* (2013.01); *G07F 17/326* (2013.01); *G07F 17/3211* (2013.01); *G07F 17/3244* (2013.01); *G07F 17/3262* (2013.01); *G07F 17/3272* (2013.01); *G07F 17/3295* (2013.01)

(56) References Cited

U.S. PATENT DOCUMENTS

| | | | |
|---|---|---|---|
| 5,785,592 A | 7/1998 | Jacobsen |
| 5,853,324 A | 12/1998 | Kami et al. |
| 5,963,745 A | 10/1999 | Collins et al. |
| 6,050,895 A | 4/2000 | Luciano |
| 6,165,071 A | 12/2000 | Weiss |
| 6,227,974 B1 | 5/2001 | Eilat |
| 6,267,669 B1 | 7/2001 | Luciano |
| 6,302,791 B1 | 10/2001 | Frohm et al. |
| 6,685,563 B1 | 2/2004 | Meekins et al. |
| 6,712,693 B1 | 3/2004 | Hettinger |
| 6,761,632 B2 | 7/2004 | Bansemer et al. |
| 6,761,633 B2 | 7/2004 | Riendeau |
| 6,764,397 B1 | 7/2004 | Robb |
| 6,811,482 B2 | 11/2004 | Letovsky |
| 7,118,105 B2 | 10/2006 | Benevento |
| 7,294,058 B1 | 11/2007 | Slomiany |
| 7,326,115 B2 | 2/2008 | Baertocher |
| 7,361,091 B2 | 4/2008 | Letovsky |
| 7,517,282 B1 | 4/2009 | Pryor |
| 7,575,517 B2 | 8/2009 | Parham et al. |
| 7,682,239 B2 | 3/2010 | Friedman et al. |
| 7,720,733 B2 | 5/2010 | Jung |
| 7,753,770 B2 | 7/2010 | Walker et al. |
| 7,753,790 B2 | 7/2010 | Nguyen |
| 7,766,742 B2 | 8/2010 | Bennett et al. |
| 7,775,885 B2 | 8/2010 | Van Luchene |
| 7,798,896 B2 | 9/2010 | Katz |
| 7,828,657 B2 | 11/2010 | Booth |
| 7,917,371 B2 | 3/2011 | Jung et al. |
| 7,931,531 B2 | 4/2011 | Oberberger |
| 7,938,727 B1 | 5/2011 | Konkle |
| 7,950,993 B2 | 5/2011 | Oberberger |
| 7,967,674 B2 | 6/2011 | Baerlocher |
| 7,980,948 B2 | 7/2011 | Rowe |
| 7,996,264 B2 | 8/2011 | Kusumoto et al. |
| 8,012,023 B2 | 9/2011 | Gates |
| 8,047,908 B2 | 11/2011 | Walker |
| 8,047,915 B2 | 11/2011 | Lyle |
| 8,060,829 B2 | 11/2011 | Jung et al. |
| 8,075,383 B2 | 12/2011 | Friedman et al. |
| 8,087,999 B2 | 1/2012 | Oberberger |
| 8,113,938 B2 | 2/2012 | Friedman et al. |
| 8,118,654 B1 | 2/2012 | Nicolas |
| 8,123,618 B2 | 2/2012 | Karmarkar |
| 8,128,487 B2 | 3/2012 | Hamilton et al. |
| 8,135,648 B2 | 3/2012 | Oram |
| 8,137,193 B1 | 3/2012 | Kelly et al. |
| 8,142,272 B2 | 3/2012 | Walker |
| 8,157,653 B2 | 4/2012 | Buhr |
| 8,167,695 B2 | 5/2012 | Rowe |
| 8,167,699 B2 | 5/2012 | Inamura |
| 8,177,628 B2 | 5/2012 | Manning |
| 8,182,338 B2 | 5/2012 | Thomas |
| 8,182,339 B2 | 5/2012 | Anderson |
| 8,187,068 B2 | 5/2012 | Slomiany |
| 8,206,210 B2 | 6/2012 | Walker |
| 8,308,544 B2 | 11/2012 | Friedman |
| 8,430,735 B2 | 4/2013 | Oberberger |
| 8,475,266 B2 | 7/2013 | Arnone |
| 8,480,470 B2 | 7/2013 | Napolitano et al. |
| 8,485,893 B2 | 7/2013 | Rowe |
| 8,622,809 B1 | 1/2014 | Arora et al. |
| 8,657,660 B2 | 2/2014 | Arnone |
| 8,864,564 B2 | 10/2014 | Oberberger |
| 8,998,694 B2 | 4/2015 | Rowe |
| 9,070,257 B1 | 6/2015 | Scalise |
| 9,092,946 B2 | 7/2015 | Rowe |
| 9,111,412 B2 | 8/2015 | Rowe |
| 9,454,873 B2 | 9/2016 | Rowe |
| 2001/0004609 A1 | 6/2001 | Walker et al. |
| 2001/0019965 A1 | 9/2001 | Ochi |
| 2002/0022509 A1 | 2/2002 | Nicastro |
| 2002/0090990 A1 | 7/2002 | Joshi et al. |
| 2002/0175471 A1 | 11/2002 | Faith |
| 2003/0060286 A1 | 3/2003 | Walker et al. |
| 2003/0119576 A1 | 6/2003 | McClintic et al. |
| 2003/0139214 A1 | 7/2003 | Wolf et al. |
| 2003/0171149 A1 | 9/2003 | Rothschild |
| 2003/0204565 A1 | 10/2003 | Guo et al. |
| 2003/0211879 A1 | 11/2003 | Englman |
| 2004/0092313 A1 | 5/2004 | Saito et al. |
| 2004/0102238 A1 | 5/2004 | Taylor |
| 2004/0121839 A1 | 6/2004 | Webb |
| 2004/0225387 A1 | 11/2004 | Smith |
| 2005/0003878 A1 | 1/2005 | Updike |
| 2005/0096124 A1 | 5/2005 | Stronach |
| 2005/0116411 A1 | 6/2005 | Herrmann et al. |
| 2005/0192087 A1 | 9/2005 | Friedman et al. |
| 2005/0233791 A1 | 10/2005 | Kane |
| 2005/0233806 A1 | 10/2005 | Kane et al. |
| 2005/0239538 A1 | 10/2005 | Dixon |
| 2005/0269778 A1 | 12/2005 | Samberg |
| 2005/0288101 A1 | 12/2005 | Lockton et al. |
| 2006/0003823 A1 | 1/2006 | Zhang |
| 2006/0003830 A1 | 1/2006 | Walker et al. |
| 2006/0035696 A1 | 2/2006 | Walker |
| 2006/0040735 A1 | 2/2006 | Baerlocher |
| 2006/0068913 A1 | 3/2006 | Walker et al. |
| 2006/0084499 A1 | 4/2006 | Moshal |
| 2006/0084505 A1 | 4/2006 | Yoseloff |
| 2006/0135250 A1 | 6/2006 | Rossides |
| 2006/0154710 A1 | 7/2006 | Serafat |
| 2006/0166729 A1 | 7/2006 | Saffari et al. |
| 2006/0189371 A1 | 8/2006 | Walker et al. |
| 2006/0223611 A1 | 10/2006 | Baerlocher |
| 2006/0234791 A1 | 10/2006 | Nguyen et al. |
| 2006/0240890 A1 | 10/2006 | Walker |
| 2006/0246403 A1 | 11/2006 | Monpouet et al. |
| 2006/0258433 A1 | 11/2006 | Finocchio et al. |
| 2007/0026924 A1 | 2/2007 | Taylor |
| 2007/0035548 A1 | 2/2007 | Jung et al. |
| 2007/0038559 A1 | 2/2007 | Jung et al. |
| 2007/0064074 A1 | 3/2007 | Silverbrook et al. |
| 2007/0087799 A1 | 4/2007 | Van Luchene |
| 2007/0093299 A1 | 4/2007 | Bergeron |
| 2007/0099696 A1 | 5/2007 | Nguyen et al. |
| 2007/0117641 A1 | 5/2007 | Walker et al. |
| 2007/0129149 A1 | 6/2007 | Walker |
| 2007/0142108 A1 | 6/2007 | Linard |
| 2007/0156509 A1 | 7/2007 | Jung et al. |

(56) References Cited

U.S. PATENT DOCUMENTS

| | | |
|---|---|---|
| 2007/0167212 A1 | 7/2007 | Nguyen |
| 2007/0167239 A1 | 7/2007 | O'Rourke |
| 2007/0173311 A1 | 7/2007 | Morrow et al. |
| 2007/0191104 A1 | 8/2007 | Van Luchene |
| 2007/0202941 A1 | 8/2007 | Miltenberger |
| 2007/0203828 A1 | 8/2007 | Jung et al. |
| 2007/0207847 A1 | 9/2007 | Thomas |
| 2007/0259717 A1 | 11/2007 | Mattice |
| 2007/0293306 A1 | 12/2007 | Nee et al. |
| 2008/0004107 A1 | 1/2008 | Nguyen et al. |
| 2008/0014835 A1 | 1/2008 | Weston et al. |
| 2008/0015004 A1 | 1/2008 | Gatto et al. |
| 2008/0064488 A1 | 3/2008 | Oh |
| 2008/0070659 A1 | 3/2008 | Naicker |
| 2008/0070690 A1 | 3/2008 | Van Luchene |
| 2008/0070702 A1 | 3/2008 | Kaminkow |
| 2008/0096665 A1 | 4/2008 | Cohen |
| 2008/0108406 A1 | 5/2008 | Oberberger |
| 2008/0108425 A1 | 5/2008 | Oberberger |
| 2008/0113704 A1 | 5/2008 | Jackson |
| 2008/0119283 A1 | 5/2008 | Baerlocher |
| 2008/0146308 A1 | 6/2008 | Okada |
| 2008/0161081 A1 | 7/2008 | Berman |
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0248850 A1 | 10/2008 | Schugar |
| 2008/0254893 A1 | 10/2008 | Patel |
| 2008/0274796 A1 | 11/2008 | Lube |
| 2008/0274798 A1 | 11/2008 | Walker et al. |
| 2008/0311980 A1 | 12/2008 | Cannon |
| 2008/0318668 A1 | 12/2008 | Ching |
| 2009/0011827 A1 | 1/2009 | Englman |
| 2009/0023489 A1 | 1/2009 | Toneguzzo |
| 2009/0023492 A1 | 1/2009 | Erfanian |
| 2009/0061974 A1 | 3/2009 | Lutnick et al. |
| 2009/0061975 A1 | 3/2009 | Ditchev |
| 2009/0061991 A1 | 3/2009 | Popovich |
| 2009/0061997 A1 | 3/2009 | Popovich |
| 2009/0061998 A1 | 3/2009 | Popovich |
| 2009/0061999 A1 | 3/2009 | Popovich |
| 2009/0082093 A1 | 3/2009 | Okada |
| 2009/0088239 A1 | 4/2009 | Iddings |
| 2009/0098934 A1 | 4/2009 | Amour |
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1 | 6/2009 | Strause et al. |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0291755 A1 | 11/2009 | Walker et al. |
| 2009/0309305 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0285869 A1 | 11/2010 | Walker |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gerson |
| 2011/0045896 A1 | 2/2011 | Sak et al. |
| 2011/0070945 A1 | 3/2011 | Walker |
| 2011/0077087 A1 | 3/2011 | Walker et al. |
| 2011/0082571 A1 | 4/2011 | Murdock et al. |
| 2011/0105206 A1 | 5/2011 | Rowe et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0201413 A1 | 8/2011 | Oberberger |
| 2011/0207523 A1 | 8/2011 | Filipour et al. |
| 2011/0212766 A1 | 9/2011 | Bowers |
| 2011/0212767 A1 | 9/2011 | Barclay |
| 2011/0218028 A1 | 9/2011 | Acres |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0263312 A1 | 10/2011 | De Waal |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0202587 A1 | 8/2012 | Allen |
| 2012/0302311 A1 | 11/2012 | Luciano |
| 2012/0322545 A1 | 12/2012 | Arnone et al. |
| 2013/0029760 A1 | 1/2013 | Wickett |
| 2013/0131848 A1 | 5/2013 | Arnone et al. |
| 2013/0190074 A1 | 7/2013 | Arnone et al. |
| 2013/0260869 A1 | 10/2013 | Leandro et al. |
| 2013/0281171 A1 | 10/2013 | Ramsour |
| 2014/0087801 A1 | 3/2014 | Nicely et al. |
| 2014/0087808 A1 | 3/2014 | Leandro et al. |
| 2014/0087809 A1 | 3/2014 | Leupp et al. |
| 2015/0126274 A1* | 5/2015 | Newton .............. G07F 17/3244 463/25 |
| 2017/0124802 A1* | 5/2017 | Greenberg Castro ...................... G07F 17/3225 |
| 2017/0148271 A1 | 5/2017 | Graboyes Goldman et al. |
| 2017/0186272 A1* | 6/2017 | Schwartz ................ A63F 13/00 |

FOREIGN PATENT DOCUMENTS

| | | |
|---|---|---|
| JP | 2004097610 A | 4/2004 |
| JP | 20040097610 A1 | 5/2004 |
| JP | 2004166746 A | 6/2004 |
| JP | 2008510525 A | 4/2008 |
| WO | 9851384 A1 | 11/1998 |
| WO | 2010087090 A1 | 8/2010 |
| WO | 2011109454 A1 | 9/2011 |

(56) References Cited

FOREIGN PATENT DOCUMENTS

| | | |
|---|---|---|
| WO | 2012139083 A1 | 10/2012 |
| WO | 2013059308 A1 | 4/2013 |

OTHER PUBLICATIONS

U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Jan. 23, 2015.
U.S. Appl. No. 14/604,629 Arnone, et al. filed Feb. 18, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.
U.S. Appl. No. 15/063,365 Arnone, et al. filed Mar. 7, 2016.
U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 15/098,287 Arnone, et al. filed Apr. 13, 2016.
U.S. Appl. No. 15/098,313 Arnone, et al. filed Apr. 13, 2016.
U.S. Appl. No. 15/130,101 Arnone, et al. filed Apr. 15, 2016.
U.S. Appl. No. 15/133,624 Arnone, et al. filed Apr. 20, 2016.
U.S. Appl. No. 15/134,852 Arnone, et al. filed Apr. 21, 2016.
U.S. Appl. No. 15/139,148 Arnone, et al. filed Apr. 26, 2016.
U.S. Appl. No. 15/141,784 Arnone, et al. filed Apr. 29, 2016.
U.S. Appl. No. 15/155,107 Arnone, et al. filed May 16, 2016.
U.S. Appl. No. 15/156,222 Arnone, et al. filed May 16, 2016.
U.S. Appl. No. 15/158,530 Arnone, et al. filed May 18, 2016.
U.S. Appl. No. 15/161,174 Arnone, et al. filed May 20, 2016.
U.S. Appl. No. 15/170,773 Arnone, et al. filed Jun. 1, 2016.
U.S. Appl. No. 15/174,995 Arnone, et al. filed Jun. 6, 2016.
U.S. Appl. No. 15/179,940 Arnone, et al. filed Jun. 10, 2016.
U.S. Appl. No. 15/189,797 Arnone, et al. filed Jun. 22, 2016.
U.S. Appl. No. 15/190,745 Arnone, et al. filed Jun. 23, 2016.
U.S. Appl. No. 15/191,050 Arnone, et al. filed Jun. 23, 2016.
U.S. Appl. No. 15/219,257 Arnone, et al. filed Jul. 25, 2016.
U.S. Appl. No. 15/227,881 Arnone, et al. filed Aug. 3, 2016.
U.S. Appl. No. 15/241,683 Arnone, et al. filed Aug. 19, 2016.
U.S. Appl. No. 15/245,040 Arnone, et al. filed Aug. 23, 2016.
U.S. Appl. No. 15/233,294 Arnone, et al. filed Aug. 24, 2016.
U.S. Appl. No. 15/252,190 Arnone, et al. filed Aug. 30, 2016.
U.S. Appl. No. 15/255,789 Arnone, et al. filed Sep. 2, 2016.
U.S. Appl. No. 15/261,858 Arnone, et al. filed Sep. 9, 2016.
U.S. Appl. No. 15/264,521 Arnone, et al. filed Sep. 13, 2016.
U.S. Appl. No. 15/264,557 Arnone, et al. filed Sep. 13, 2016.
U.S. Appl. No. 15/271,214 Arnone, et al. filed Sep. 20, 2016.
U.S. Appl. No. 15/272,318 Arnone, et al. filed Sep. 21, 2016.
U.S. Appl. No. 15/273,260 Arnone, et al. filed Sep. 22, 2016.
U.S. Appl. No. 15/276,469 Arnone, et al. filed Sep. 26, 2016.
U.S. Appl. No. 15/280,255 Arnone, et al. filed Sep. 29, 2016.
U.S. Appl. No. 15/286,922 Arnone, et al. filed Oct. 6, 2016.
U.S. Appl. No. 15/287,129 Arnone, et al. filed Oct. 6, 2016.
U.S. Appl. No. 15/289,648 Arnone, et al. filed Oct. 10, 2016.
U.S. Appl. No. 15/297,019 Arnone, et al. filed Oct. 18, 2016.
U.S. Appl. No. 15/298,533 Arnone, et al. filed Oct. 20, 2016.
U.S. Appl. No. 15/336,696 Arnone, et al. filed Oct. 27, 2016.
U.S. Appl. No. 15/339,898 Arnone, et al. filed Oct. 31, 2016.
U.S. Appl. No. 15/345,451 Arnone, et al. filed Nov. 7, 2016.
U.S. Appl. No. 15/362,214 Arnone, et al. filed Nov. 28, 2016.
itl.nist.gov, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.
Changing the Virtual Self: Avatar Transformations in Popular Games; Barr et al., Victoria Univ., NZ, 2006.
Real-Time Multimodal Human—Avatar Interaction; Li et al., IEEE (Video Technology) vol. 18, No. 4, 2008.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813, Arnone, et al., filed Feb. 6, 2014.
U.S. Appl. No. 14/175,986, Arnone, et al., filed Feb. 7, 2014.
U.S. Appl. No. 14/176,014, Arnone, et al., filed Feb. 7, 2014.

(56) References Cited

OTHER PUBLICATIONS

U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 14/815,764 Arnone, et al. filed Jul. 31, 2015.
U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
U.S. Appl. No. 15/051,535 Arnone, et al. filed Feb. 23, 2016.
U.S. Appl. No. 15/053,236 Arnone, et al. filed Feb. 25, 2016.
U.S. Appl. No. 15/057,095 Arnone, et al. filed Feb. 29, 2016.
U.S. Appl. No. 15/060,502 Arnone, et al. filed Mar. 3, 2016.
U.S. Appl. No. 15/651,934 Arnone, et al. filed Jul. 17, 2017.
U.S. Appl. No. 15/657,826 Arnone, et al. filed Jul. 24, 2017.
U.S. Appl. No. 15/657,835 Arnone, et al. filed Jul. 24, 2017.
U.S. Appl. No. 15/664,535 Arnone, et al. filed Jul. 31, 2017.
U.S. Appl. No. 15/667,168 Arnone, et al. filed Aug. 2, 2017.
U.S. Appl. No. 15/267,511 Rowe, filed Sep. 16, 2016.
U.S. Appl. No. 15/681,966 Arnone, et al. filed Aug. 21, 2017.
U.S. Appl. No. 15/681,970 Arnone, et al. filed Aug. 21, 2017.
U.S. Appl. No. 15/681,978 Arnone, et al. filed Aug. 21, 2017.
U.S. Appl. No. 15/687,922 Arnone, et al. filed Aug. 28, 2017.
U.S. Appl. No. 15/687,927 Arnone, et al. filed Aug. 28, 2017.
U.S. Appl. No. 15/694,520 Arnone, et al. filed Sep. 1, 2017.
U.S. Appl. No. 15/694,738 Arnone, et al. filed Sep. 1, 2017.
U.S. Appl. No. 15/713,595 Arnone, et al. filed Sep. 22, 2017.
U.S. Appl. No. 15/715,144 Arnone, et al. filed Sep. 25, 2017.
U.S. Appl. No. 15/716,317 Arnone, et al. filed Sep. 26, 2017.
U.S. Appl. No. 15/716,318 Arnone, et al. filed Sep. 26, 2017.
U.S. Appl. No. 15/728,096 Arnone, et al. filed Oct. 9, 2017.
U.S. Appl. No. 15/784,961 Arnone, et al. filed Oct. 16, 2017.
U.S. Appl. No. 15/790,482 Arnone, et al. filed Oct. 23, 2017.
U.S. Appl. No. 15/794,712 Arnone, et al. filed Oct. 26, 2017.
U.S. Appl. No. 15/797,571 Arnone, et al. filed Oct. 30, 2017.
U.S. Appl. No. 15/804,413 Arnone, et al. filed Nov. 6, 2017.
U.S. Appl. No. 15/811,412 Arnone, et al. filed Nov. 13, 2017.
U.S. Appl. No. 15/811,419 Arnone, et al. filed Nov. 13, 2017.
U.S. Appl. No. 15/815,629 Arnone, et al. filed Nov. 16, 2017.
U.S. Appl. No. 15/822,908 Arnone, et al. filed Nov. 27, 2017.
U.S. Appl. No. 15/822,912 Arnone, et al. filed Nov. 27, 2017.
U.S. Appl. No. 15/830,614 Arnone, et al. filed Dec. 4, 2017.
U.S. Appl. No. 15/834,006 Arnone, et al. filed Dec. 6, 2017.
U.S. Appl. No. 15/837,795 Arnone, et al. filed Dec. 11, 2017.
U.S. Appl. No. 15.845,433 Arnone, et al. filed Dec. 18, 2017.
U.S. Appl. No. 15/858,817 Arnone, et al. filed Dec. 29, 2017.
U.S. Appl. No. 15/858,826 Arnone, et al. filed Dec. 29, 2017.
U.S. Appl. No. 15/862,329 Arnone, et al. filed Jan. 4, 2018.
U.S. Appl. No. 15/864,737 Arnone, et al. filed Jan. 8, 2018.
U.S. Appl. No. 15/882,328 Arnone, et al. filed Jan. 29, 2018.
U.S. Appl. No. 15/882,333 Arnone, et al. filed Jan. 29, 2018.
U.S. Appl. No. 15/882,428 Arnone, et al. filed Jan. 29, 2018.
U.S. Appl. No. 15/882,447 Arnone, et al. filed Jan. 29, 2018.
U.S. Appl. No. 15/882,850 Arnone, et al. filed Jan. 29, 2018.
U.S. Appl. No. 15/882,902 Arnone, et al. filed Jan. 29, 2018.
U.S. Appl. No. 15/888,512 Arnone, et al. filed Feb. 5, 2018.
U.S. Appl. No. 15/894,398 Arnone, et al. filed Feb. 12, 2018.
U.S. Appl. No. 15/912,019 Arnone, et al. filed Mar. 5, 2018.
U.S. Appl. No. 15/912,026 Arnone, et al. filed Mar. 5, 2018.
U.S. Appl. No. 15/912,529 Arnone, et al. filed Mar. 5, 2018.
U.S. Appl. No. 15/920,374 Arnone, et al. filed Mar. 13, 2018.
U.S. Appl. No. 15/920,380 Arnone, et al. filed Mar. 13, 2018.
U.S. Appl. No. 15/920,388 Arnone, et al. filed Mar. 13, 2018.
U.S. Appl. No. 15/362,660 Arnone, et al. filed Nov. 28, 2016.
U.S. Appl. No. 15/365,628 Arnone, et al. filed Nov. 30, 2016.
U.S. Appl. No. 15/367,541 Arnone, et al. filed Dec. 2, 2016.
U.S. Appl. No. 15/369,394 Arnone, et al. filed Dec. 5, 2016.
U.S. Appl. No. 15/370,425 Arnone, et al. filed Dec. 6, 2016.
U.S. Appl. No. 15/375,711 Arnone, et al. filed Dec. 12, 2016.
U.S. Appl. No. 15/387,117 Arnone, et al. filed Dec. 21, 2016.
U.S. Appl. No. 15/392,887 Arnone, et al. filed Dec. 28, 2016.
U.S. Appl. No. 15/393,212 Arnone, et al. filed Dec. 28, 2016.
U.S. Appl. No. 15/394,257 Arnone, et al. filed Dec. 29, 2016.
U.S. Appl. No. 15/396,352 Arnone, et al. filed Dec. 30, 2016.
U.S. Appl. No. 15/396,354 Arnone, et al. filed Dec. 30, 2016.
U.S. Appl. No. 15/396,365 Arnone, et al. filed Dec. 30, 2016.
U.S. Appl. No. 15/406,474 Arnone, et al. filed Jan. 13, 2017.
U.S. Appl. No. 15/413,322 Arnone, et al. filed Jan. 23, 2017.
U.S. Appl. No. 15/415,833 Arnone, et al. filed Jan. 25, 2017.
U.S. Appl. No. 15/417,030 Arnone, et al. filed Jan. 26, 2017.
U.S. Appl. No. 15/422,453 Arnone, et al. filed Feb. 1, 2017.
U.S. Appl. No. 15/431,631 Arnone, et al. filed Feb. 13, 2017.
U.S. Appl. No. 15/434,843 Arnone, et al. filed Feb. 16, 2017.
U.S. Appl. No. 15/439,499 Arnone, et al. filed Feb. 22, 2017.
U.S. Appl. No. 15/449,249 Arnone, et al. filed Mar. 3, 2017.
U.S. Appl. No. 15/449,256 Arnone, et al. filed Mar. 3, 2017.
U.S. Appl. No. 15/450,287 Arnone, et al. filed Mar. 6, 2017.
U.S. Appl. No. 15/456,079 Arnone, et al. filed Mar. 10, 2017.
U.S. Appl. No. 15/457,827 Arnone, et al. filed Mar. 13, 2017.
U.S. Appl. No. 15/458,490 Arnone, et al. filed Mar. 14, 2017.
U.S. Appl. No. 15/460,195 Arnone, et al. filed Mar. 15, 2017.
U.S. Appl. No. 15/463,725 Arnone, et al. filed Mar. 20, 2017.
U.S. Appl. No. 15/464,282 Arnone, et al. filed Mar. 20, 2017.
U.S. Appl. No. 15/465,521 Arnone, et al. filed Mar. 21, 2017.
U.S. Appl. No. 15/470,869 Arnone, et al. filed Mar. 27, 2017.
U.S. Appl. No. 15/473,523 Arnone, et al. filed Mar. 29, 2017.
U.S. Appl. No. 15/483,773 Arnone, et al. filed Apr. 10, 2017.

(56) References Cited

OTHER PUBLICATIONS

U.S. Appl. No. 15/489,343 Arnone, et al. filed Apr. 17, 2017.
U.S. Appl. No. 15/491,617 Arnone, et al. filed Apr. 19, 2017.
U.S. Appl. No. 15/583,295 Arnone, et al. filed May 1, 2017, 2017.
U.S. Appl. No. 15/589,780 Arnone, et al. filed May 8, 2017.
U.S. Appl. No. 15/597,123 Arnone, et al. filed May 16, 2017.
U.S. Appl. No. 15/597,812 Arnone, et al. filed May 17, 2017.
U.S. Appl. No. 15/599,590 Arnone, et al. filed May 19, 2017.
U.S. Appl. No. 15/605,688 Arnone, et al. filed May 25, 2017.
U.S. Appl. No. 15/605,705 Arnone, et al. filed May 25, 2017.
U.S. Appl. No. 15/626,754 Arnone, et al. filed Jun. 19, 2017.
U.S. Appl. No. 15/631,762 Arnone, et al. filed Jun. 23, 2017.
U.S. Appl. No. 15/632,478 Arnone, et al. filed Jun. 26, 2017.
U.S. Appl. No. 15/632,479 Arnone, et al. filed Jun. 26, 2017.
U.S. Appl. No. 15/632,943 Arnone, et al. filed Jun. 26, 2017.
U.S. Appl. No. 15/632,950 Arnone, et al. filed Jun. 26, 2017.
U.S. Appl. No. 15/641,119 Arnone, et al. filed Jul. 3, 2017.
WIPO—ISA, International Search Report and Written Opinion, PCT/US13/026761, dated Apr. 25, 2013.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 15/920,390 Arnone, et al. filed Mar. 13, 2018.
U.S. Appl. No. 15/922,816 Arnone, et al. filed Mar. 15, 2018.
U.S. Appl. No. 15/922,905 Arnone, et al. filed Mar. 15, 2018.
U.S. Appl. No. 15/925,268 Arnone, et al. filed Mar. 19, 2018.
U.S. Appl. No. 15/925,751 Arnone, et al. filed Mar. 19, 2018.
U.S. Appl. No. 15/933,319 Arnone, et al. filed Mar. 22, 2018.
U.S. Appl. No. 15/935,956 Arnone, et al. filed Mar. 26, 2018.
U.S. Appl. No. 15/943,207 Arnone, et al. filed Apr. 2, 2018.
U.S. Appl. No. 15/948,607 Arnone, et al. filed Apr. 9, 2018.
Japan Patent Office, Office Action, Japan Application No. 2014-557871, dated Jun. 5, 2018.

* cited by examiner

NETWORKED HYBRID GAMING SYSTEM

CROSS REFERENCE TO RELATED APPLICATIONS

This application is a continuation of U.S. patent application Ser. No. 15/245,040 filed Aug. 23, 2016, issued as U.S. Pat. No. 9,984,530 on May 29, 2018, which is a continuation of U.S. patent application Ser. No. 14/679,885 filed Apr. 6, 2015, issued as U.S. Pat. No. 9,449,466 on Sep. 20, 2016, which is a continuation of U.S. patent application Ser. No. 14/186,393 filed Feb. 21, 2014, issued as U.S. Pat. No. 8,998,707 on Apr. 7, 2015, which is a continuation of PCT Application No. PCT/US13/26761, filed Feb. 19, 2013, which claims the benefit of U.S. Provisional Patent Application Nos. 61/600,147 filed on Feb. 17, 2012, 61/613,597 filed Mar. 21, 2012, and 61/602,039 filed on Feb. 22, 2012, the contents of each of which are hereby incorporated by reference as if stated in full herein. This application references Patent Cooperation Treaty Application Nos. PCT/US11/26768, filed Mar. 1, 2011, PCT/US11/63587, filed Dec. 6, 2011, and PCT/US12/58156, filed Sep. 29, 2012, the contents of each of which are hereby incorporated by reference in as if stated in full herein.

FIELD OF THE INVENTION

Embodiments of the present invention are generally related to gaming and more specifically to networked hybrid game that includes both an entertainment game and a gambling game.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game may depend upon a player's skill with the game. Gambling games are typically not as interactive and do not include graphics as sophisticated as an entertainment game, which is a game of skill such as a video game.

SUMMARY OF THE INVENTION

Systems and methods in accordance with embodiments of the invention operate a networked gaming system.

An embodiment includes a game server connected by a network to a plurality of entertainment software controllers, the game server constructed to; administer a multi-user entertainment game; apply a game status update to the multi-user entertainment game; the plurality of entertainment software controllers wherein each entertainment software controller is connected to one of a plurality of game world controllers, each entertainment software controller constructed to: receive from a player a contribution of a credit; display the multi-user entertainment game; transmit a player action taken by the player during the player's execution of the multi-user entertainment game; receive, from the game sever, the applied game status update; the plurality of game world controllers, wherein each game world controller is connected to the game server and one of a plurality of real world controllers, each game world controller constructed to: receive a player action from a connected entertainment software controller; generate a wager of real world credits for a gambling game based on the transmitted player action; transmit, to a connected real world controller, the wager; receive, from the connected real world controller, a wager result for the wager; generate the game status update on the basis of the player action and the wager result; and transmit, to the game server, the game status update; and the plurality of real world controllers connected to the plurality of game world controllers, each real world controller constructed to: receive the wager from the game world controller; and provide a wager result from the wager made in the gambling game using a random number generator.

In a further embodiment, the game world controller is further constructed to: generate a modified player action based on the player action and the received wagering result.

In a further embodiment, the modified player action provides an advantage to the player.

In a further embodiment, the modified game state provides an advantage to the player.

In a further embodiment, the modified game state provides an additional game object for the player.

In a further embodiment, the entertainment software controller is a browser.

An embodiment includes a plurality of game world controllers connected by a network to a plurality of entertainment software controllers and a game server, each game world controller constructed to: receive, from the entertainment software controller, a player action taken by a player during the player's execution of a multi-user entertainment game; generate a wager of real world credits for a gambling game based on the received player action; transmit, to a real world controller, the wager; receive, from the real world controller, a wager result for the wager; transmit, to the game server, the player action; receive, from the game server, a game state update of the multi-user entertainment game based on the player action; generate a modified game state update on the basis of the game state update and the wager result; and transmit, to the connected entertainment software controller, the modified game state update; and the real world controller connected to one of the plurality of game world controllers, and constructed to: receive the wager from the connected game world controller; and provide a wager result from the wager made in the gambling game using a random number generator.

DETAILED DESCRIPTION

Figure 1:
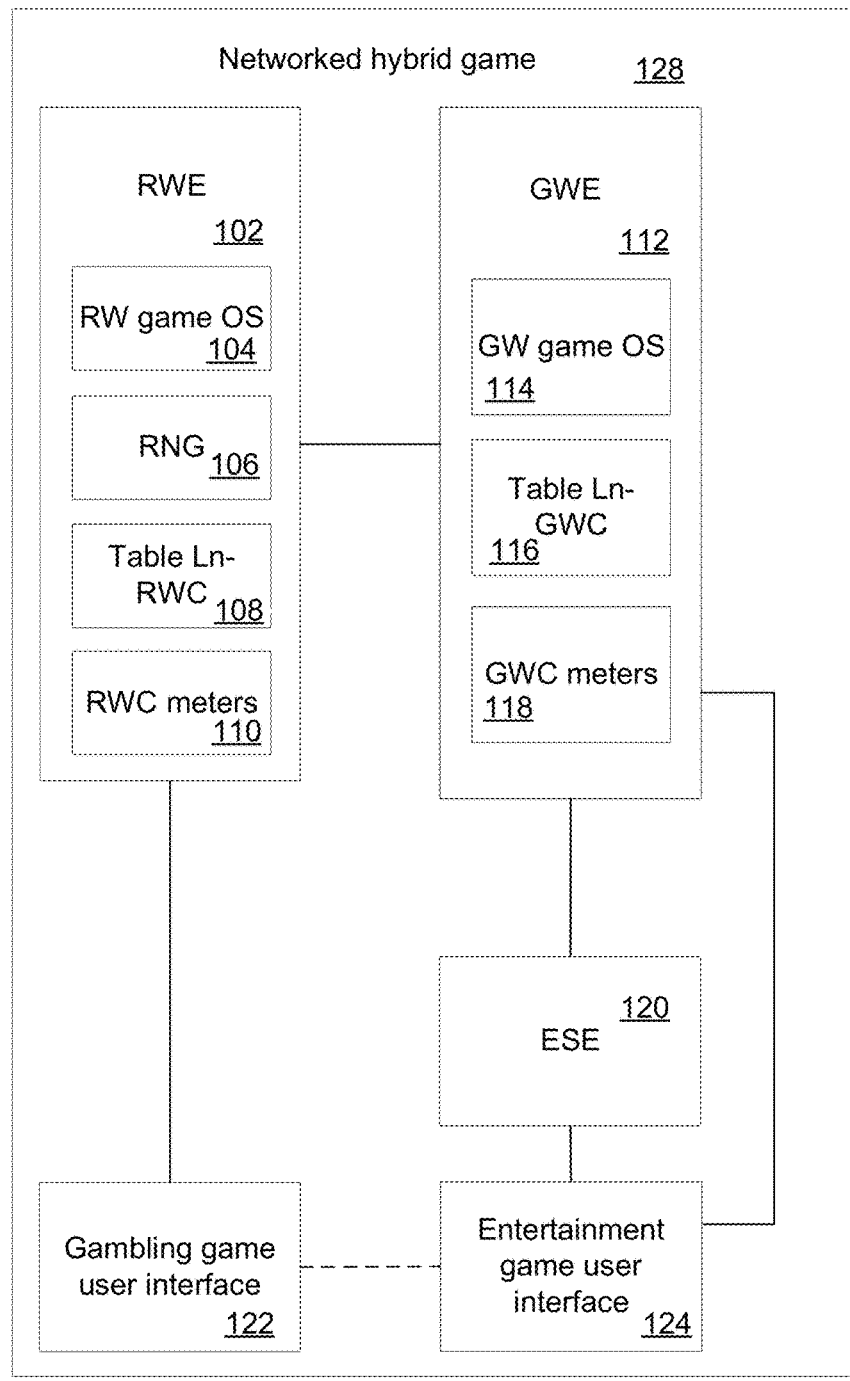
FIG. 1 illustrates a networked hybrid game in accordance with an embodiment of the invention.

Turning now to the drawings, systems and methods for operation of a networked hybrid game are illustrated. In several embodiments, a networked hybrid game is a form of a hybrid game that is distributed across a network and includes both a gambling game that includes a real world engine (RWE) which manages the gambling game, as well as an entertainment game that includes a game world engine (GWE) which manages the entertainment portion of a game, and an entertainment software engine (ESE) which executes the entertainment game for user entertainment. In certain embodiments, the networked hybrid game also includes a user interface associated with either or both the gambling game and the entertainment game. In operation of a networked hybrid game, a player acts upon various types of elements of the entertainment game in a game world environment. Elements are a limited resource consumed within an entertainment game to advance entertainment game gameplay. In playing the entertainment game using the elements, a player can (optionally) consume and accrue game world credits (GWC) within the entertainment game. These credits can be in the form of (but are not limited to) game world objects, experience points, or points generally. Wagers are made in the gambling game using real world credits (RWC). The real world credits can be credits in an actual currency, or may be credits in a virtual currency which may or may not have real world value. Gambling outcomes from the gambling game may cause consumption, loss or accrual of RWC. In addition, gambling outcomes in the gambling game may influence elements in the entertainment game such as (but not limited to) by restoring a consumed element, causing the loss of an element, restoration or placement of a fixed element. In certain embodiments, elements can also be wagered in a gambling game for a payout of elements. Example elements include enabling elements (EE) which are elements that enable a player's play of the entertainment game and whose consumption by the player while playing the entertainment game may trigger a wager in a gambling game. Another example of an element are reserve enabling elements (REE), which are elements that convert into enabling elements upon occurrence of a release event in transportable variable hybrid game gameplay. Other types of elements include actionable elements (AE) which are elements that are acted upon to trigger a wager in the gambling game and may or may not be restorable during normal play of the entertainment game. In progressing through entertainment game gameplay, elements can be utilized by a player during interactions with a controlled entity (CE) which is a character, entity, inanimate object, device or other object under control of a player. Also, entertainment game gameplay progress can be dependent upon: a required object (RO) which is a specific object in an entertainment game necessary for an AE to be completed (such as but not limited to a specific key needed to open a door); a required environmental condition (REC) which is a game state necessary within an entertainment game for an AE to be completed (such as but not limited to daylight that is required to walk through woods); or a controlled entity characteristic (CEC) which is a status necessary of the CE within an entertainment game for an AE to be completed (such as but not limited to a CE required to have full health points before entering battle). Various hybrid games are discussed in Patent Cooperation Treaty Application No. PCT/US11/26768, filed Mar. 1, 2011, entitled ENRICHED GAME PLAY ENVIRONMENT (SINGLE and/or MULTI-PLAYER) FOR CASINO APPLICATIONS and Patent Cooperation Treaty Application No. PCT/US11/63587, filed Dec. 6, 2011, entitled ENHANCED SLOT-MACHINE FOR CASINO APPLICATIONS each disclosure of which is hereby incorporated by reference in its entirety.

Networked Hybrid Games

Certain embodiments of networked hybrid games are hybrid games that are distributed across a network. In many embodiments, a networked hybrid game integrates high levels of entertainment content with a game of skill (entertainment game), a gambling experience with a game of chance (gambling game). A networked hybrid game provides for random outcomes independent of player skill while providing that the user's gaming experience (as measured by obstacles/challenges encountered, time of play and other factors) is shaped by the player's skill. A networked hybrid game in accordance with an embodiment of the invention is illustrated in FIG. 1. The networked hybrid game 128 includes a RWE 102, GWE 112, ESE 120, gambling game user interface 122 and entertainment game user interface 124. The two user interfaces may be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In several embodiments, the RWE 102 is the operating system for the gambling game of the networked hybrid game 128 and controls and operates the gambling game. The operation of a gambling game is enabled by RWC, such as money or other real world funds. A gambling game can increase or decreases an amount of RWC based on random gambling outcomes, where the gambling proposition of a gambling game is typically regulated by gaming control bodies. In many embodiments, the RWE includes a RW operating system (OS) 104, random number generator (RNG) 106, level n real-world credit pay tables (Table Ln-RWC) 108, RWC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random or pseudo random outcomes. A level n real-world credit pay table (Table Ln-RWC) 108 is a table that can be used in conjunction with a random number generator (RNG) 106 to dictate the real world credits (RWC) earned as a function of gameplay and is analogous to the pay tables used in a conventional slot machine. Table Ln-RWC payouts are independent of player skill. There may be one or a plurality of Table Ln-RWC pay tables 108 contained in a gambling game, the selection of which may be determined by factors including (but not limited to) game progress a player has earned, and/or bonus rounds which a player may be eligible for. Real world credits (RWC) are credits analogous to slot machine game credits, which are entered into a gambling game by the user, either in the form of money such as hard currency or electronic funds. RWCs can be decremented or augmented based on the outcome of a random number generator according to the Table Ln-RWC real world credits pay table 108, independent of player skill. In certain embodiments, an amount of RWC can be required to enter higher ESE game levels. RWC can be carried forward to higher game levels or paid out if a cash out is opted for by a player. The amount of RWC required to enter a specific level of the game level n need not be the same for each level. In some embodiments a virtual currency (VC) is used to fund the RWC.

In many embodiments, the GWE 112 manages the overall networked hybrid game operation, with the RWE 102 and the ESE 120 effectively being support units to the GWE 112. In several embodiments, the GWE 112 contains mechanical, electronic and software system for an entertainment game. The GWE 112 includes an operating system (OS) 114 that provides control of the entertainment game. The GWE additionally contains a level n game world credit pay table (Table Ln-GWC) 116 from where to take input from this table to affect the play of the entertainment game. The GWE 112 can further couple to the RWE 102 to determine the amount of RWC available on the game and other metrics of wagering on the gambling game (and potentially affect the amount of RWC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120.

In many embodiments, a level n game world credit pay table (Table Ln-GWC) 116 dictates the GWC earned as a function of player skill in the nth level of the game. The payouts governed by this table are dependent upon player skill and sponsored gameplay at large and may or may not be coupled to a random number generator. In several embodiments, game world credits (GWC) are player points earned or depleted as a function of player skill, specifically as a function of player performance in the context of the game. GWC is analogous to the score in a typical video game. Each entertainment game has one or more scoring criterion, embedded within the Table Ln-GWC 116 that reflects player performance against the goal(s) of the game. GWC can be carried forward from one level of sponsored gameplay to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system, where the GWC is attributed to a specific player.

In certain embodiments, the operation of the GWE does not affect the RWE's gambling operation except for player choice parameters that are allowable in slot machines including but not limited to wager terms such as but not limited to a wager amount, how fast the player wants to play (by pressing a button or pulling the slot's handle) and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RWC available in the gambling game. The communication link can also convey a necessary status operation of the RWE (such as on-line or tilt). The communication link can further communicate the various gambling control factors which the RWE 102 uses as input, such as the number of RWC consumed per game or the player's election to enter a jackpot round. In FIG. 1, the GWE 112 is also shown as connecting to the player's user interface directly, as this may be necessary to communicate certain entertainment game club points, player status, control the selection of choices and messages which a player may find useful in order to adjust their entertainment game experience or understand their gambling status in the RWE 102.

In various embodiments, the ESE 120 manages and controls the visual, audio, and player control for the entertainment game. In certain embodiments, the ESE 120 accepts input from a player through a set of human interface devices (HIDs) including by not limited to hand controls, and/or head, gesture, and/or eye tracking systems and outputs video, audio and/or other sensory output to a user interface. In many embodiments, the ESE 120 can exchange data with and accept control information from the GWE 112. In several embodiments an ESE 120 can be implemented using a personal computer (PC), a Sony PlayStation® (a video game console developed by Sony Computer Entertainment of Tokyo Japan), Microsoft Xbox® (a video game console developed by Microsoft Corporation of Redmond, Wash.), a tablet computer, or smartphone a running a specific entertainment game software program. In numerous embodiments, an ESE can be an electromechanical game system of a networked hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 may send certain entertainment game control parameters and elements to the ESE 120 to affect its play, such as (but not limited to) what level of character to be using, changing the difficulty level of the game, changing the type of gun or car in use, and/or requesting potions to become available or to be found by the character. These game control parameters and elements may be based on a gambling outcome of a gambling game that was triggered by an element in the entertainment game being acted upon by the player. The ESE 120 can accept this input from the GWE 112, make adjustments, and continue the play action all the while running seamlessly from the player's perspective. The player's execution of the entertainment is mostly skillful as the ESE's operation is mostly skill based, except for where the ESE's processes may inject complexities into the game by chance in its normal operation to create unpredictability in the entertainment game. Utilizing this interface, the ESE 120 may also communicate player choices made in the game to the GWE 112, such as but not limited to selection of a different gun, and/or the player picking up a special potion in the GW environment. The GWE's job in this architecture, being interfaced thusly to the ESE 120, is to allow the transparent coupling of entertainment software to a fair and transparent random chance gambling game, providing a seamless perspective to the player that they are playing a typical popular entertainment game (which is skill based). In certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the described herein interface by which the GWE 120 can request amendments to the operation of the ESE software in order to provide seamless and sensible operation as both a gambling game and an entertainment game.

In several embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RWC in play, and amount of RWC available. The RWE 102 can accept modifications in the amount of RWC wagered on each individual gambling try, or the number of games per minute the RWE 102 can execute, entrance into a bonus round, and other factors, all the while these factors can take a different form than that of a typical slot machine. An example of a varying wager amount that the player can choose might be that they have decided to play with a more powerful character in the game, a more powerful gun, or a better car. These choices can increase or decrease the amount wagered per individual gambling game, in the same manner that a standard slot machine player may decide to wager more or less credits for each pull of the handle. In several embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player may control the per game wager amount, with the choice mapping to some parameter or component that is applicable to the entertainment game experience of the hybrid game. In a particular embodiment, the RWE 102 operation can be a game of chance as a gambling game running every 10 seconds where the amount wagered is communicated from the GWE 112 as a function of choices the player makes in the operation profile in the entertainment game such as those cited above.

In many embodiments, a networked hybrid game integrates a video game style gambling machine, where the gambling game (including an RWE 102 and RWC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time a rich environment of rewards to stimulate gamers can be established with the entertainment game. In several embodiments, the networked hybrid game can leverage very popular titles with gamers and provides a sea change environment for casinos to attract players with games that are more akin to the type of entertainment that a younger generation desires. In various embodiments, players can use their skill towards building and banking GWC that in turn can be used to win tournaments and various prizes as a function of their gamer prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In certain embodiments, networked hybrid games also allow players to gain entry into subsequent competitions through the accumulation of game world credits (GWC) as a function of the user's demonstrated skill at the game. These competitions can pit individual players or groups of players against one another and/or against the casino to win prizes based upon a combination of chance and skill. These competitions may be either asynchronous events, whereby players participate at a time and/or place of their choosing, or they may be synchronized events, whereby players participate at a specific time and/or venue.

In many embodiments, one or more players engage in playing an entertainment game, resident in the ESE, the outcomes of which are dependent at least in part on skill. The networked hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

Figure 2:
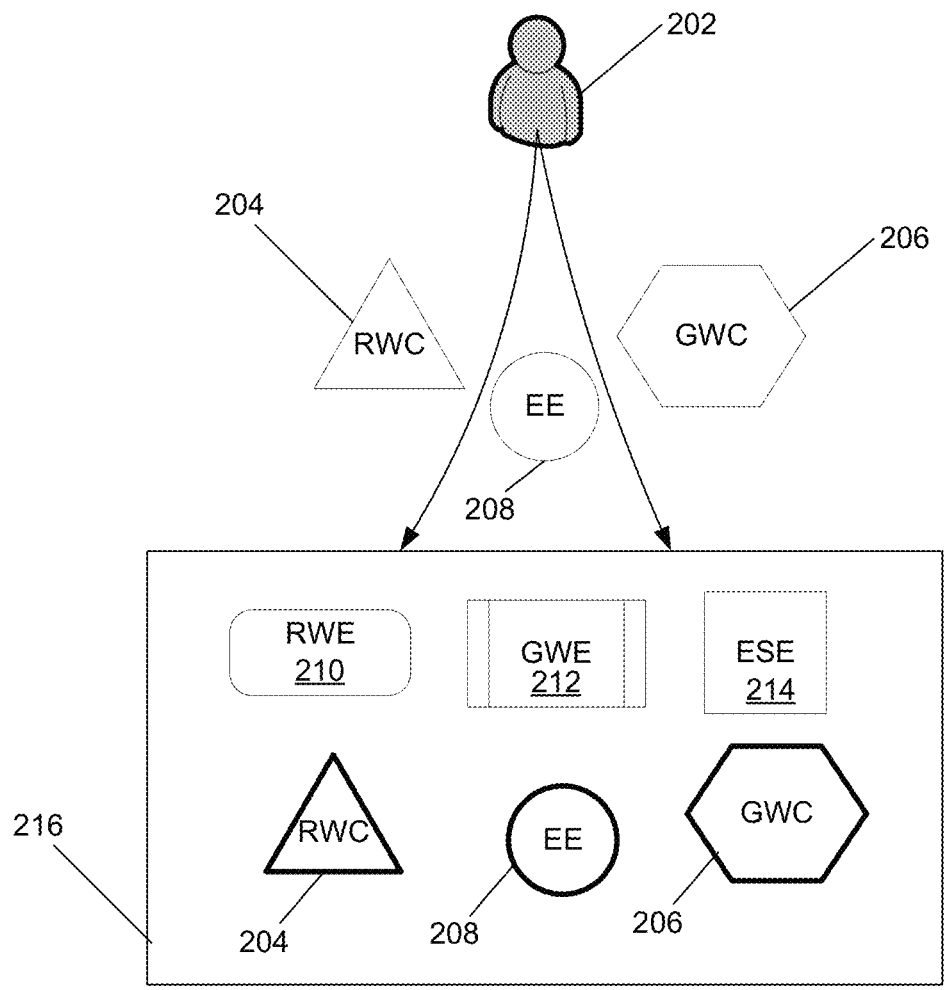
FIG. 2 is a conceptual diagram that illustrates how resources are utilized in a networked hybrid game in accordance with an embodiment of the invention.

In several embodiments, a player can interact with a networked hybrid game by using RWC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RWC and elements, such as but not limited to EE, are utilized in a networked hybrid game in accordance with an embodiment of the invention is illustrated in FIG. 2. The conceptual diagram illustrates that RWC 204, EE 208 and GWC 206 can be utilized by a player 202 in interactions with the RWE 210, GWE 212 and ESE 214 of a networked hybrid game 216. The contribution of elements, such as EE 208, may be linked to a player's access to credits, such as RWC 204 or GWC 206. Electronic transfer in of these credits may come via a smart card, voucher or other portable media, or as transferred in over a network from a server. In certain implementations, these credits may be drawn on demand from a player profile located in a database locally on a networked hybrid game or in a remote server.

Figure 3:
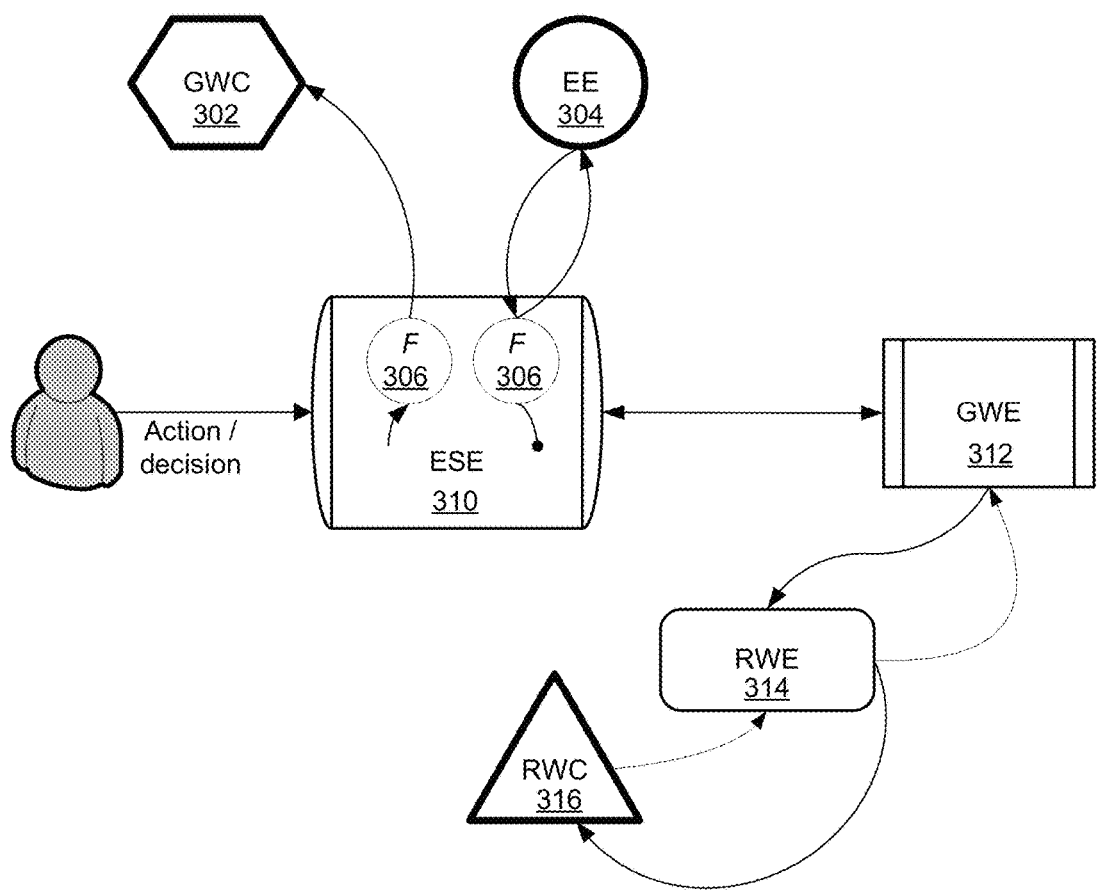
FIG. 3 is a conceptual diagram that illustrates interplay between resources and components of a networked hybrid game in accordance with an embodiment of the invention.
Figure 4:
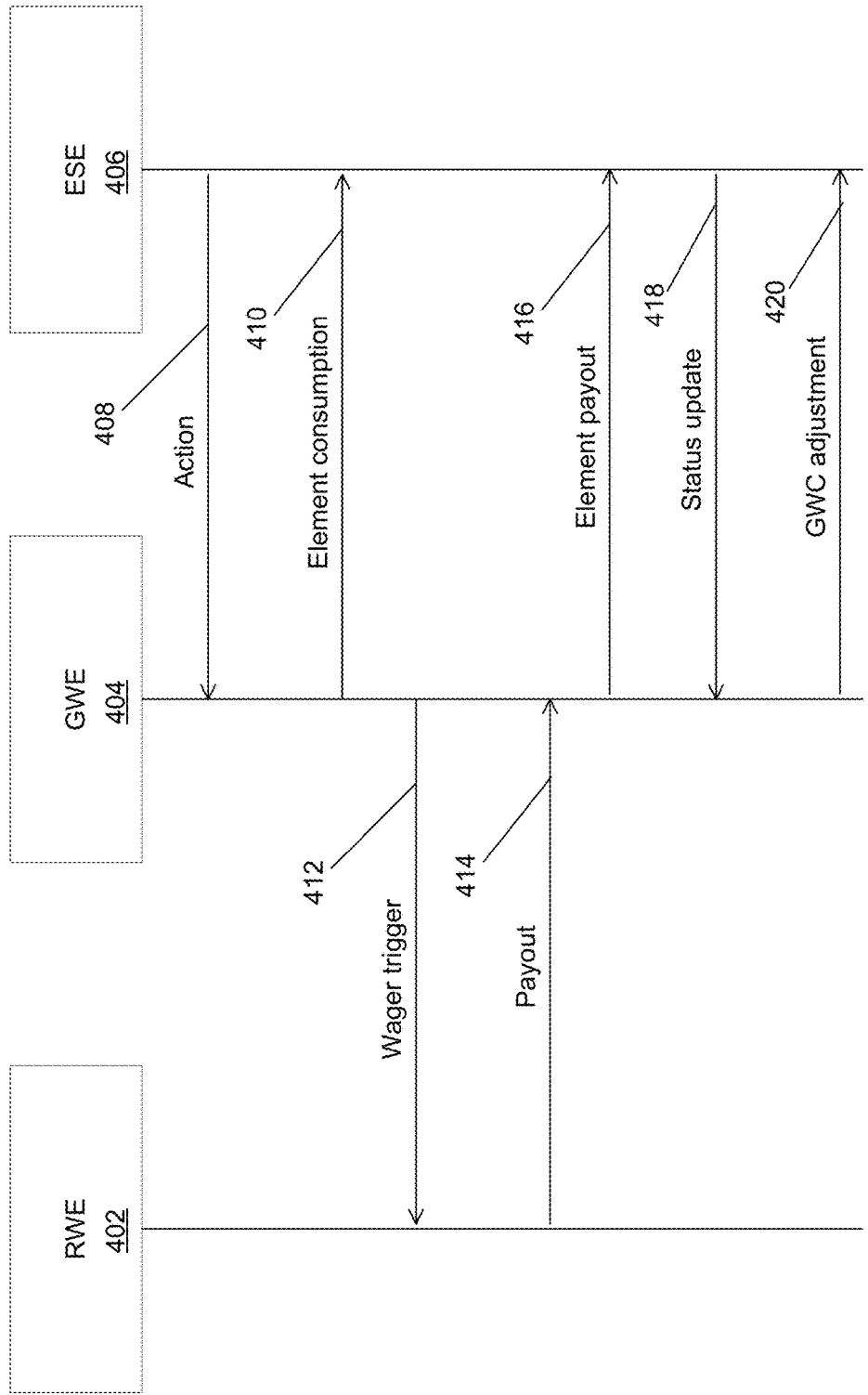
FIG. 4 is a timing diagram that illustrates a process of facilitating interactions between an entertainment game and a gambling game in accordance with embodiments of the invention.

A conceptual diagram that illustrates interplay between elements and components of a networked hybrid game in accordance with an embodiment of the invention is illustrated in FIG. 3. Similar to FIG. 2, a player's actions and/or decisions can affect functions 306 that consume and/or accumulate GWC 302 and/or EE 304 in an entertainment game executed by an ESE 310. A GWE 312 can monitor the activities taking place within an entertainment game executed by an ESE 310 for gameplay gambling event occurrences. The GWE 312 can also communicate the gameplay gambling event occurrences to an RWE 314 that triggers a wager of RWC 316 in a gambling game executed by the RWE 314. A timing diagram that illustrates a process of facilitating interactions between an entertainment game and a gambling game in accordance with embodiments of the invention is illustrated in FIG. 4. The process includes a player performing a player action using a user interface. An ESE 406 can signal (408) a GWE 404 of the player action. The GWE 404 can signal (410) the ESE 406 as to the amount of EE that will be consumed by the player action in return. The signal can configure a function that controls EE consumption, decay or addition for the ESE. The ESE 406 can, based upon the function, consume an amount of EE designated by the GWE 404 to couple to the activity. Upon detection that the player action is a gameplay gambling event, the GWE 404 can signal an RWE 402 as to the wager terms associated with the gameplay gambling event triggers (412) a wager. The RWE 402 can consume RWC in executing the wager. The RWE 402 can return RWC as a payout from the wager. The RWE 402 can inform (414) the GWE 404 as to the payout from the wager. The GWE 404 can signal (416) the ESE 406 to ascribe a payout of EE based upon the wager. The ESE 406 can reconcile and combine the payout of EE with the EE already ascribed to the player in the entertainment game. The ESE 406 can signal (408) the GWE 404 as to its updated status based upon reconciling the payout of EE, and the GWE 404 can signal the ESE 406 of a payout of GWC in response (420) to the status update.

In certain embodiments, the sequence of events in the timing diagram of FIG. 4 can be reflected in a first person shooter themed entertainment game. For example, a player can select a machine gun to use in an entertainment game and fires a burst at an opponent. The can ESE signal (408) the GWE of the player action, such as the player's choice of weapon, that a burst of fire was fired, and the outcome of whether the player hit the opponent with the burst of fire. The GWE can process the information concerning the machine gun burst, and signal (410) the ESE to consume 3 bullets (EE) with each pull of the trigger. The entertainment game then consumes 3 bullets (EE) from the trigger being pulled. The GWE can also signal (412) the RWE that 3 credits of RWC are to be wagered to match the 3 bullets (EE) consumed, on a particular pay table (Table Ln-RC) as a function how much damage the player inflicted on his/her opponent. The RWE can consume the 3 credits for the wager and execute the specified wager. In executing the wager, the RWE can determine that the player hits a jackpot of 6 credits, and return the 6 credits of RWC to the credit meter. The RWE can also inform (414) the GWE that 3 credits of RWC net were won as a payout from the wager. The GWE can signal (416) the ESE to add 3 bullets (EE) to the player's ammo clip based upon the gambling game payout. The ESE can then add 3 bullets (EE) to the player's ammo clip in the entertainment game. This may take place by directly adding them to the clip, or may happen in the context of the entertainment game, such as the player finding extra ammo on the ground or in an old abandoned ammo dump. The GWE can receive (418) an update from the ESE as to the total amount of EE associated with the player. The GWE can log the new player score (GWC) in the game (as a function of the successful hit on the opponent) based on the update, and signal (420) the ESE to add 2 extra points of GWC to the player's score.

In many embodiments, if an entertainment game includes a sports themed game, such as a version of Madden Football™, a player can bet on whether or not the player is going to beat the computer, or if the player is playing against another player, that other player. These bets can be made, for example, on the final outcome of the game, and/or the state of the game along various intermediary points (such as but not limited to the score at the end of the 1st quarter) and/or on various measures associated with the game (such as but not limited to the total offensive yards, number of turnovers, or number of sacks). Players can bet against one another, or engage the computer in a head to head competition in the context of their skill level in the entertainment game in question. As such, players can have a handicap associated with their player profile that describes their skill (which can be their professed skill in certain embodiments), and which is used by a GWE (such as a local GWE or a GWE that receives services from remote servers) to offer appropriate bets around the final and/or intermediate outcomes of the entertainment game, and/or to condition sponsored gameplay as a function of player skill, and/or to select players across one or more networked hybrid games to participate in head to head games and/or tournaments.

Many embodiments enable the maximization of the number of players able to compete competitively by enabling handicapping of players by utilizing a skill normalization module that handicaps players to even the skill level of players competing against each other. Handicapping enables players of varying performance potential to compete competitively regardless of absolute skill level, such as but not limited to where a player whose skill level identifies the player as a beginner can compete in head to head or tournament play against a highly skilled player with meaningful results.

In several embodiments, wagers can be made among numerous networked hybrid games with a global betting manager (GBM). The GBM is a system that coordinates wagers that are made across multiple networked hybrid games by multiple players. In some implementations it can also support wagers by third parties relative to the in game performance of other players. The GBM can stand alone, or is capable of being embedded in one of a number of systems, including a GWE, ESE or any remote server capable of providing services to a networked hybrid game, or can operate independently on one or a number of servers on-site at a casino, as part of a larger network and/or the internet or cloud in general. The GBM also supports the management of lottery tickets issued as a function of sponsored gameplay.

Networked hybrid games in accordance with many embodiments of the invention can operate locally while being network connected to draw services from remote locations or to communicate with other networked hybrid games. In many embodiments, operations associated with a networked hybrid game can be performed across multiple devices. These multiple devices can be implemented using a single server or a plurality of servers such that a networked hybrid game is executed as a system in a virtualized space, such as (but not limited to) where the RWE and GWE are large scale centralized servers in the cloud coupled to a plurality of widely distributed ESE controllers or clients via the Internet.

In many embodiments, an RWE server can perform certain functionalities of a RWE of a networked hybrid game. In certain embodiments, a RWE server includes a centralized odds engine which can generate random outcomes (such as but not limited to win/loss outcomes) for a gambling game, thereby eliminating the need to have that functionality of the RWE performed locally within the networked hybrid game. The RWE server can perform a number of simultaneous or pseudo-simultaneous runs in order to generate random outcomes for a variety of odds percentages that one or more networked hybrid games may require. In certain embodiments, an RWE of a networked hybrid game can send information to a RWE server including (but not limited to) Table Ln-RWC tables, maximum speed of play for a gambling game, gambling game monetary denominations or any promotional RWC provided by the operator of the networked hybrid game. In particular embodiments, a RWE server can send information to a RWE of a networked hybrid game including (but not limited to) RWC used in the gambling game, player profile information or play activity and a profile associated with a player.

In several embodiments, a GWE server can perform the functionality of the GWE across various networked hybrid games. These functionalities can include (but are not limited to) providing a method for monitoring high scores on select groups of games, coordinating interactions between gameplay layers, linking groups of games in order to join them in head to head tournaments, and acting as a tournament manager.

In a variety of embodiments, management of player profile information can be performed by a patron management server separate from a GWE server. A patron management server can manage information related to a player profile, including (but not limited to) data concerning controlled entities (such as characters used by a layer in hybrid game gameplay session), game scores, elements, RWC and GWC associated with particular players and managing tournament reservations. Although a patron management server is discussed separately from a GWE server, in certain embodiments a GWE server also performs the functions of a patron management server. In certain embodiments, a GWE of a networked hybrid game can send information to a patron management server including (but not limited to) GWC and RWC used in a game, player profile information, play activity and profile information for players and synchronization information between a gambling game and an entertainment game or other aspects of a networked hybrid game. In particular embodiments, a patron management server can send information to a GWE of a networked hybrid game including (but not limited to) entertainment game title and type, tournament information, Table Ln-GWC tables, special offers, character or profile setup and synchronization information between a gambling game and an entertainment game or other aspects of a networked hybrid game.

In numerous embodiments, an ESE server provides a host for managing head to head play, operating on the network of ESEs which are connected to the ESE server by providing an environment where players can compete directly with one another and interact with other players. Although an ESE server is discussed separately from a GWE server, in certain embodiments a GWE server also performs the functions of an ESE server.

In several embodiments, a multisession server can be connected with a networked hybrid game and can implement a multisession module to coordinate the activities of a networked hybrid game. A multisession module can execute as part of a multisession server to enable networked hybrid game gameplay that is continuous across multiple gameplay sessions. The multisession module is configured to enable networked hybrid game gameplay by initiating a current hybrid game gameplay session for a player that builds upon the player's interactions with a networked hybrid game in a prior hybrid game gameplay session.

Servers connected via a network to implement networked hybrid games in accordance with many embodiments of the invention can communicate with each other to provide services utilized within a networked hybrid game. In several embodiments a RWE server can communicate with a GWE server. A RWE server can communicate with a GWE server to communicate any type of information as appropriate for a specific application, including (but not limited to): configure the various simultaneous or pseudo simultaneous odds engines executing in parallel within the RWE to accomplish the networked hybrid game system requirements, determine metrics of RWE performance such as random executions run and outcomes for tracking system performance, perform audits, provide operator reports, and request the results of a random run win/loss result for use of function operating within the GWE (such as where automatic drawings for prizes are a function of ESE performance).

In several embodiments a GWE server can communicate with an ESE server. A GWE server can communicate with an ESE server to communicate any type of information as appropriate for a specific application, including (but not limited to): the management of an ESE server by a GWE server such as the management of a networked hybrid game tournament. Typically a GWE (such as a GWE that runs within a networked hybrid game or on a GWE server) is not aware of the relationship of itself to the rest of a tournament since in a typical configuration the actual tournament play is managed by the ESE server. Therefore, management of a networked hybrid game tournament can include (but is not limited to) tasks such as: conducting tournaments according to system programming that can be coordinated by an operator of the networked hybrid game; allowing entry of a particular player into a tournament; communicating the number of players in a tournament and the status of the tournament (such as but not limited to the amount of surviving players, their status within the game, time remaining on the tournament); communicating the status of an ESE contained in a game; communicating the performance of its players within the tournament; communicating the scores of the various members in the tournament; and providing a synchronizing link to connect the GWEs in a tournament, with their respective ESE's.

In several embodiments a GWE server can communicate with a patron management server. A GWE server can communicate with a patron server to communicate any type of information as appropriate for a specific application, including (but not limited to) information for configuring tournaments according to system programming conducted by an operator of a networked hybrid game, exchange of data necessary to link a player's player profile to their ability to participate in various forms of sponsored gameplay (such as but not limited to the difficulty of play set by the GWE server or the GWE in the game they are playing on), determining a player's ability to participate in a tournament as a function of a player's characteristics (such as but not limited to a player's gaming prowess or other metrics used for tournament screening), configuring the game contained GWE and ESE performance to suit preferences of a player on a particular networked hybrid game, as recorded in their player profile, determining a player's play and gambling performance for the purposes of marketing intelligence, and logging secondary drawing awards, tournament prizes, RWC and GWC into the player profile.

In many embodiments, the actual location of where various algorithms and functions are executed may be located either in the game contained devices (RWE, GWE, ESE), on the servers (RWE server, GWE server, or ESE server), or a combination of both. In particular embodiments, certain functions of a RWE server, GWE server, patron management server or ESE server may operate on the local RWE, GWE or ESE contained with a networked hybrid game locally. In certain embodiments, a server is a server system including a plurality of servers, where software may be run on one or more physical devices. Similarly, in particular embodiments, multiple servers may be combined on a single physical device.

Figure 5:
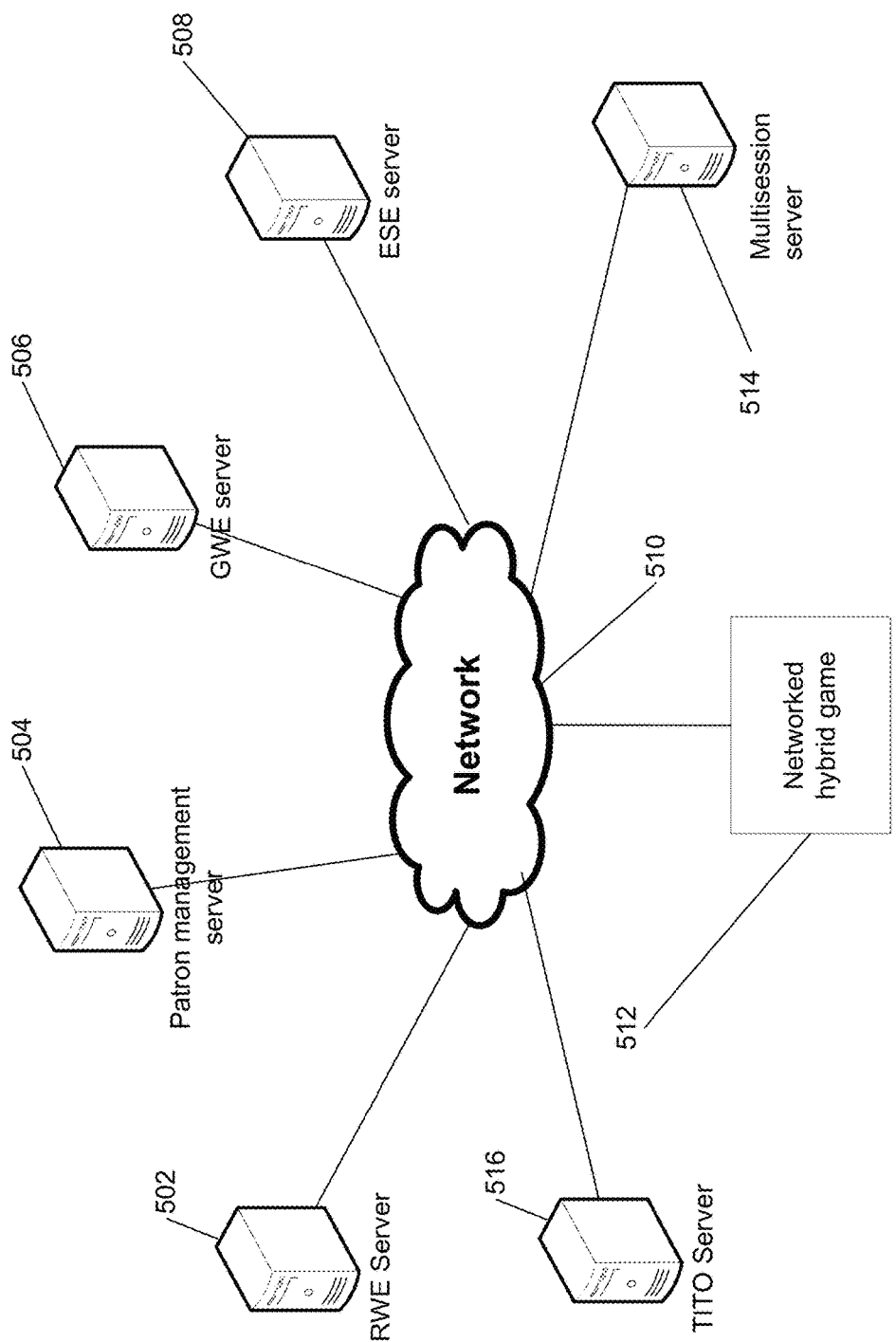
FIG. 5 is a system diagram that illustrates a network distributed networked hybrid game in accordance with an embodiment of the invention.

Networked hybrid games in accordance with many embodiments of the invention can be networked with remote servers in various configurations. A networked hybrid game in accordance with an embodiment of the invention is illustrated in FIG. 5. The networked hybrid game 512 is connected with a RWE server 502, patron management server 504, GWE server 506, ESE server 508, a multisession server 514, and a ticket-in ticket-out (TITO) server 516 over a network 510, such as (but not limited to) the Internet or a local area network. Servers networked with a networked hybrid game 512 can also communicate with each of the components of a networked hybrid game and amongst the other servers in communication with the networked hybrid game 512.

Figure 6:
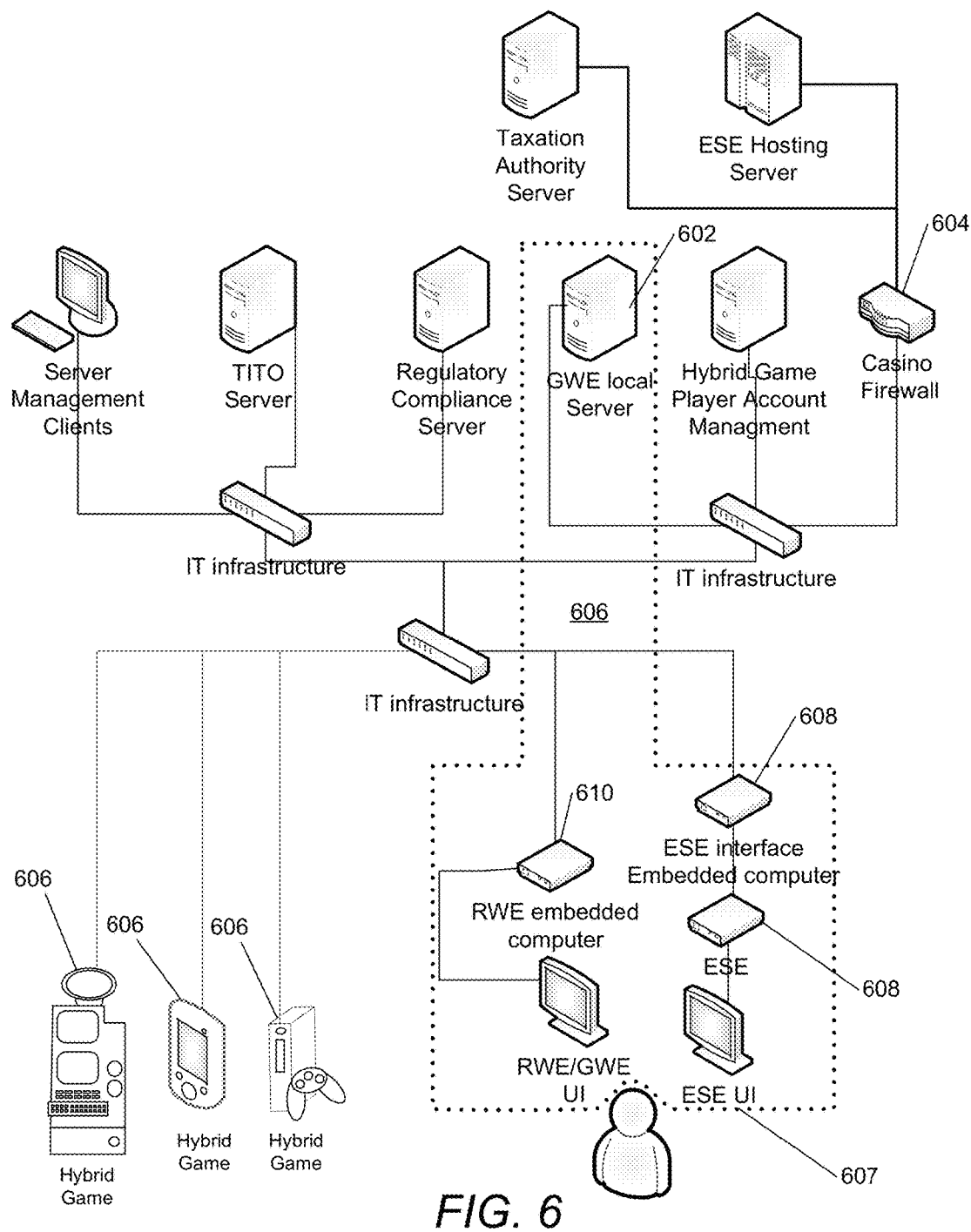
FIG. 6 is a system diagram that illustrates an implementation of a network distributed networked hybrid game with a game world engine local server in accordance with an embodiment of the invention.

A system diagram that illustrates an implementation of a network distributed networked hybrid game with a GWE local server in accordance with an embodiment of the invention is illustrated in FIG. 6. The system includes several networked hybrid games 606 sharing services from the same GWE local server 602 over a network. In various embodiments, a networked hybrid game may be implemented as a casino-based game in a cabinet, as an application running on a mobile device such as a tablet computer or a smartphone, or on a video gaming console. An embodiment of a single networked hybrid game 606 with a RWE 610, ESE 608 and GWE 602 is enclosed within a dotted line 607. A number of other peripheral systems, such as player management, casino management, regulatory, ticket-in ticket-out, and hosting servers can also interface with the networked hybrid games over a network within an operator's firewall 604. Also, other servers can reside outside the bounds of a network within an operator's firewall 604 to provide additional services for network connected networked hybrid games.

Figure 7:
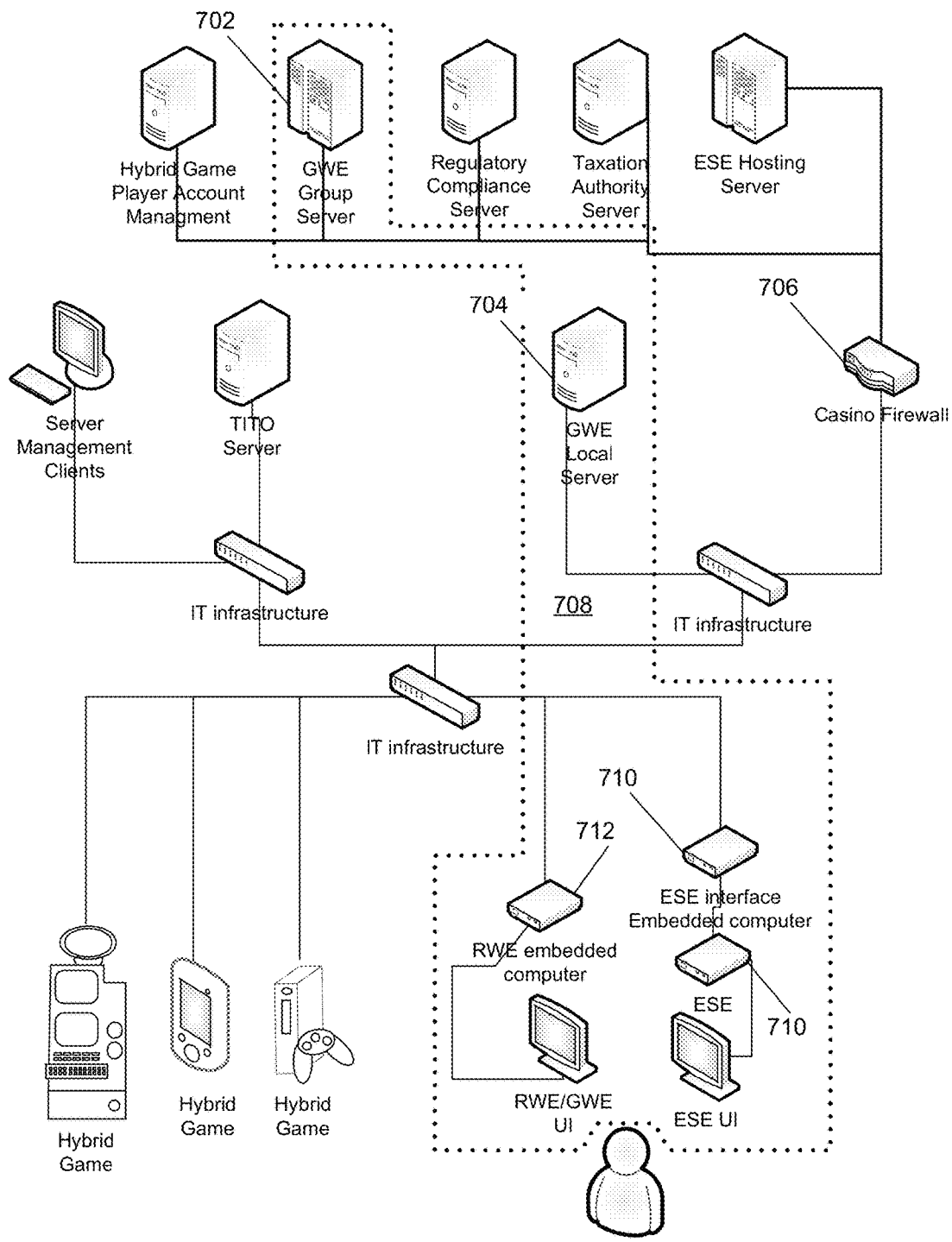
FIG. 7 is a system diagram that illustrates an implementation of a network distributed hybrid game with a game world engine group server in accordance with an embodiment of the invention.

A system diagram that illustrates an implementation of a network distributed hybrid game with a GWE local server and a GWE group server in accordance with an embodiment of the invention is illustrated in FIG. 7. This system includes a networked hybrid game with a RWE 712, ESE 710 and GWE 704 enclosed within a dotted line but where a single hybrid game can call upon services from servers within an operator's firewall 706 (such as but not limited to a GWE local server) as well as beyond an operator's firewall 706 (such but not limited to a GWE group server 702). The GWE group server 702 can coordinate multiple networked hybrid games from across a network that spans beyond an operator's firewall 706.

Figure 8:
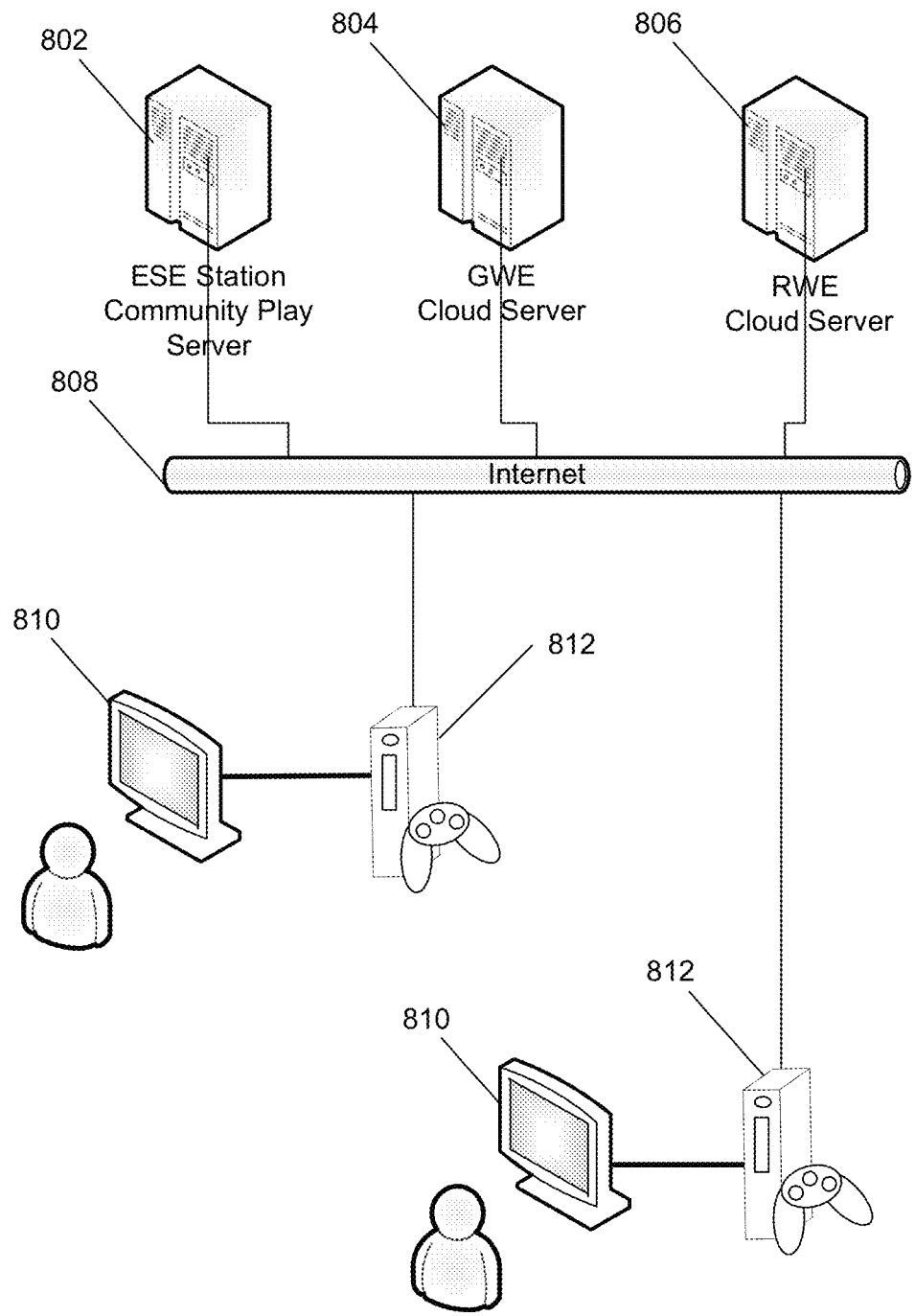
FIG. 8 is a system diagram that illustrates an implementation of network distributed hybrid games over the Internet in accordance with an embodiment of the invention.

A system diagram that illustrates an implementation of network distributed hybrid games over the Internet in accordance with an embodiment of the invention is illustrated in FIG. 8. The system includes an ESE server 802, GWE server 804 and RWE server 806 that connects to a user interface 810 of networked hybrid games over the Internet 808. Each networked hybrid game includes a local ESE 812 that also interfaces with a remote ESE server 802.

Figure 9:
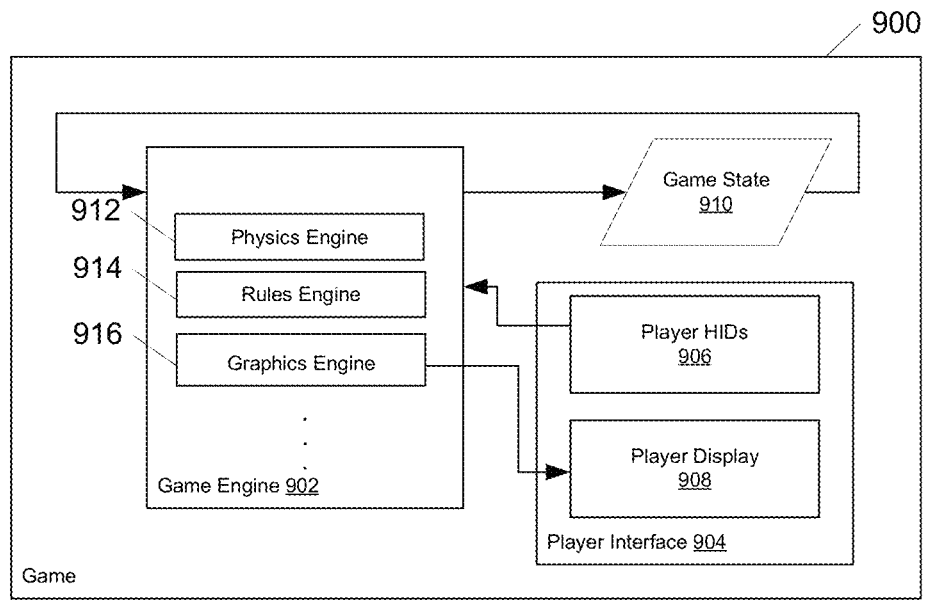
FIG. 9 is a cooperation diagram of an interactive entertainment game in accordance with an embodiment of the invention.

FIG. 9 is a cooperation diagram of an interactive entertainment game in accordance with an embodiment of the invention. The interactive entertainment game 900 includes a game engine 902 that generates player outputs for interaction with a player. The player outputs include a player presentation that is presented to a player through a user or player interface 904 including a player display 908. The player presentation may be audio, visual or tactile, or any combination of such. The player interface further includes one or more Human Input Devices (HIDs) 906 that the player uses to interact with the game. Various components of the game engine read data from a game state 910 in order to implement the features of the game. The game engine includes a physics engine 912 used to simulate physical interactions between virtual objects in the game state, a rules engine 914 for implementing the rules of the game, a graphics engine 916 used to generate a visual representation of the game state to the player, etc.

In operation, the components of the game engine read portions of the game state and generate the player presentation for the player. The player perceives the presentation and provides player inputs using the HIDs. The corresponding player inputs are received as user actions or inputs by various components of the game engine. The game engine translates the player actions into interactions with the virtual objects of the game world stored in the game state. Components of the game engine use the player interactions with the virtual objects of the game and the game state to update the game state and update the presentation presented to the user. The process loops in a game loop continuously while the player plays the game.

Figure 10:
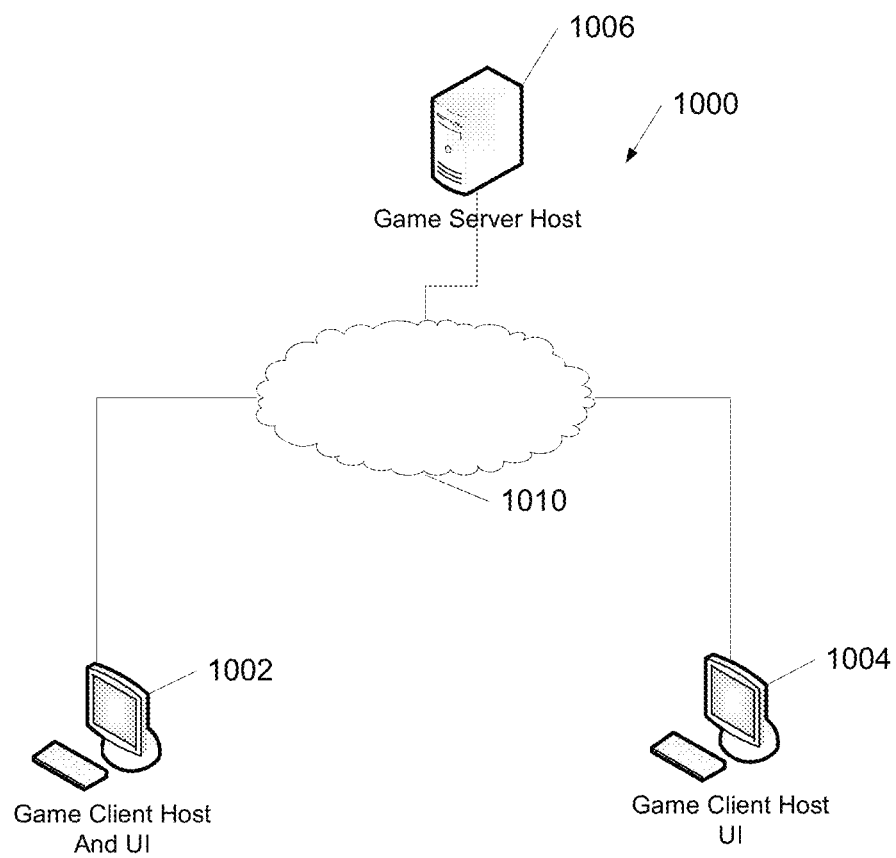
FIG. 10 is a deployment diagram illustrating physical connections between hosts used in an online gaming system in accordance with an embodiment of the invention.

FIG. 10 is a deployment diagram illustrating physical connections between hosts used in an online gaming system in accordance with an embodiment of the invention. The online gaming 1000 system includes one or more game client hosts 1002 and 1004 operatively connected to a game server host 1006 via a network 1010 such as a Local Area Network (LAN) or Wide Area Network (WAN) such as the Internet. The game server host hosts a game server that is operatively connected to one or more game clients hosted by the one or game client hosts.

Figure 11:
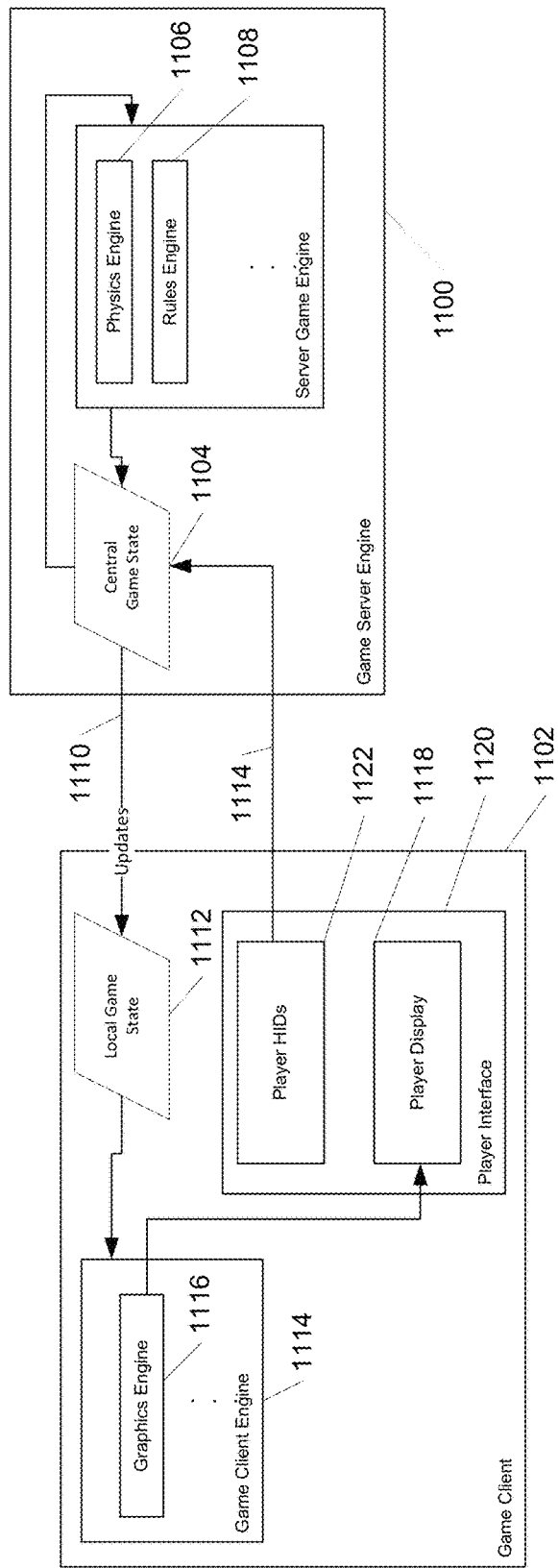
FIG. 11 is a cooperation diagram illustrating a portion of an online gaming system in accordance with an embodiment of the invention.

FIG. 11 is a cooperation diagram illustrating a portion of an online gaming system in accordance with an embodiment of the invention. A game server engine 1100 hosted by a game server host is operatively connected through a network such as a LAN or WAN to a game client 1102 hosted by a game client host. The game server includes a game server engine that uses a central game state 1104 to implement an interactive entertainment game served by the game server. The game server engine includes components that operate on and use the central game state, such as a physics engine 1106, a game rules engine 1108, etc. The game server engine uses the central game state to generate an updated central game state. The game server also generates game state updates 1110 that may be used to update a synchronized local game state 1112 in a game client. The game state updates are transmitted through the network to the game client. The game client receives the game state updates and updates the local game state using the received game state updates.

The game client includes a game client engine 1114. The game client engine includes components, such as a graphics engine 1116, etc., that operate on and use the local game state to implement the features of the game. The graphics engine generates a player display 1118 that is displayed to a player through a player interface 1120. The player interacts with the game client using one or more player HIDs 1122. The game client receives the player inputs through the player HIDs and generates player inputs or actions 114 that are transmitted to the game server via the network. The game server receives the player actions and the game server engine uses the player actions and the central game state to update the central game state. The updates to the central game state are transmitted to the game client through the network and the game client uses the game state updates to update the location game state. The processes in both the game client and the game server loop continuously in a game loop while the player continues to play the game.

Figure 12:
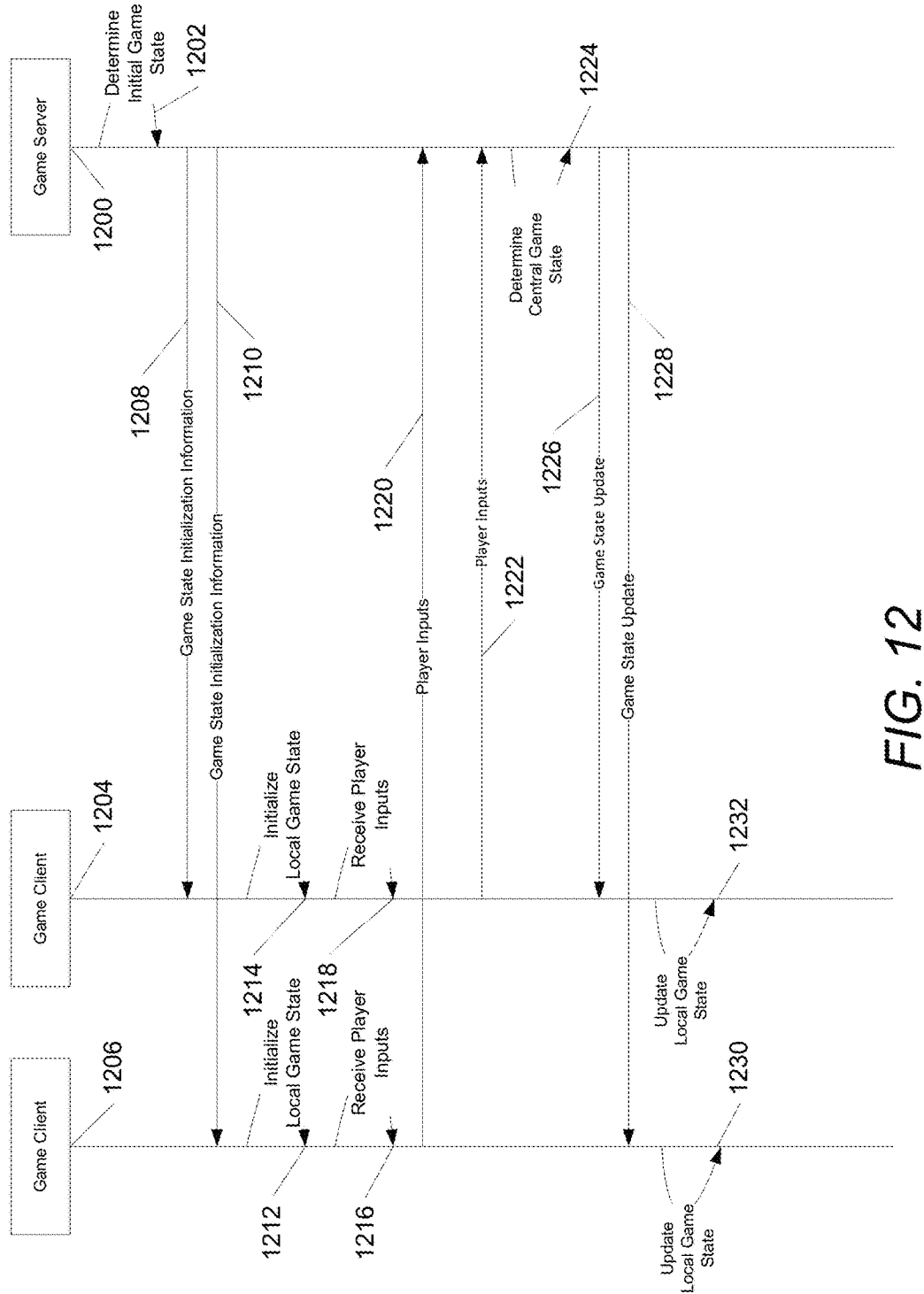
FIG. 12 is a sequence diagram illustrating the sequence of operations and communications between a game client and a game server in accordance with an embodiment of the invention.

FIG. 12 is a sequence diagram illustrating the sequence of operations and communications between a game client and a game server in accordance with an embodiment of the invention. A game server 1200 determines 1202 an initial game state for an interactive entertainment game to be played by one or more players playing the interactive entertainment game on one or more game clients, such as game clients 1204 and 1206. The game server stores the initialized game state as a central game state that will be used to synchronize local game states maintained by the one or more game clients. The game server transmits the initial game state, 1208 and 1210, to each of the game clients. In response, the game clients initialize, 1212 and 1214, their own respective local game states and use their respective initialized local game states to generate a player presentation to present to a player as described herein. Each game client receives, 1216 and 1218, player inputs from their respective players as described herein and transmits the player inputs, 1220 and 1222, or player actions to the game server. The game server receives the player inputs or actions from the one or more game clients and uses the player inputs or actions to update 1224 the central game state using a game server engine as described herein. The game server also transmits game states updates, 1226 and 1228, to the one or more game clients. The one or more game clients use the game state updates to update, 1230 and 1232, their respective game states. The process continues by the respective game loops on each of the one or more game clients and the game server. In this manner, each game client includes a local game state that is maintained in synchronization with the central game state without having to transmit the entire game state each time a player interacts with the interactive entertainment game.

Figure 13:
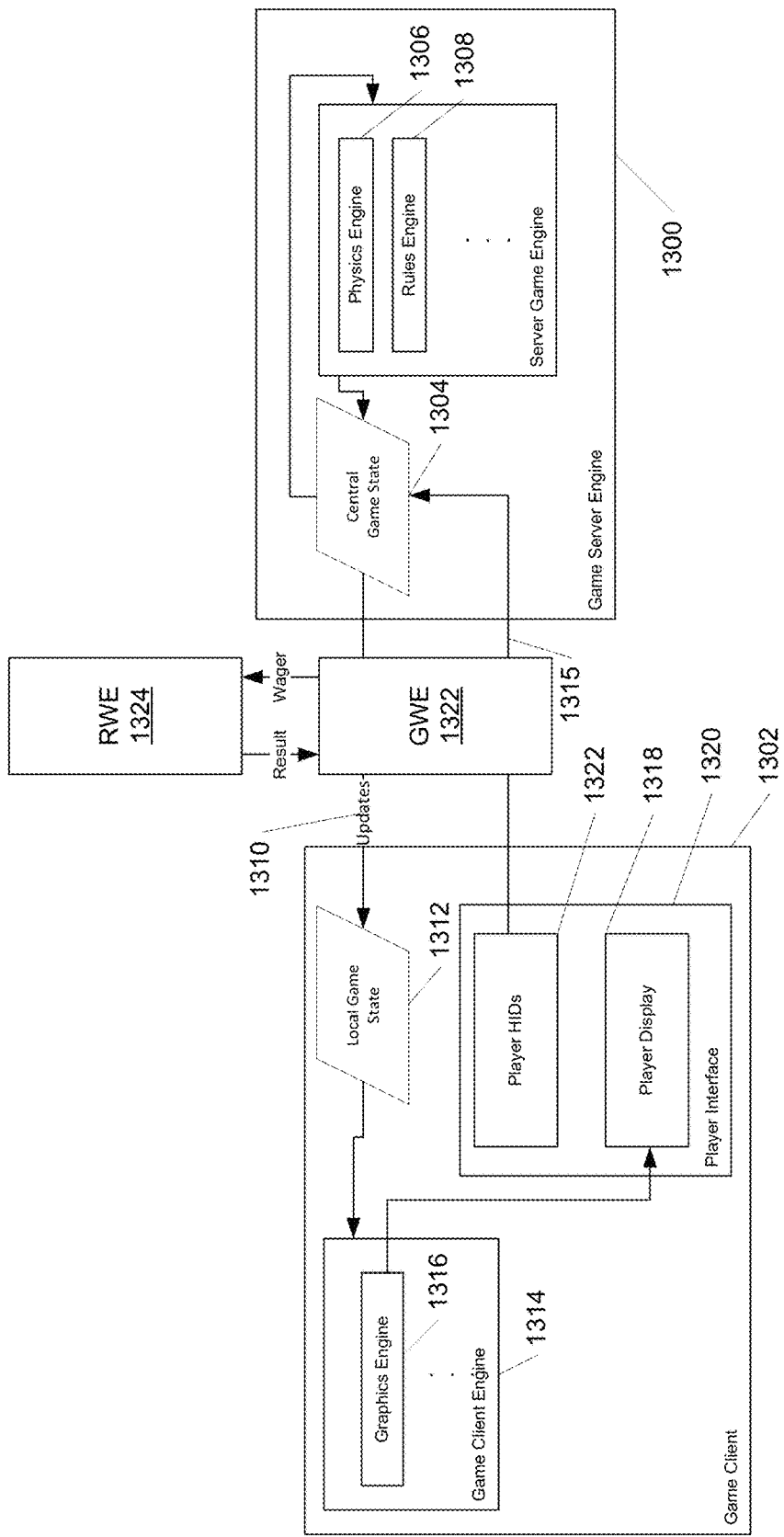
FIG. 13 is a cooperation diagram illustrating the interactions between components of an online hybrid game in accordance with an embodiment of the invention.

FIG. 13 is a cooperation diagram illustrating the interactions between components of an online hybrid game in accordance with an embodiment of the invention. A game server engine 1300 hosted by a game server host is operatively connected through a network such as a LAN or WAN to a game world engine (GWE) 1322 hosted by a GWE host. The GWE is further operatively connected to a game client 1302 through the network. The GWE is also operatively connected to a real world engine (RWE) 1320. The game server includes a game server engine that uses a central game state 1304 to implement an interactive entertainment game served by the game server. The game server engine includes components that operate on and use the central game state, such as a physics engine 1306, a game rules engine 1308, etc. The game server engine uses the central game state to generate an updated central game state. The game server also generates game state updates 1310 that may be used to update a synchronized local game state 1312 in the game client. The game state updates are transmitted through the network to the game client. The game client receives the game state updates and updates the local game state using the received game state updates.

In numerous embodiments, the GWE also receives the game state updates that the GWE uses to update its own local game state. In some embodiments, the GWE intercepts the game state updates and modifies the game state updates before transmitting the game state updates to the game client.

The game client includes a game client engine 1314. The game client engine includes components, such as a graphics engine 1316, etc., that operate on and use the local game state to implement the features of the interactive entertainment game. The graphics engine generates a player display 1318 that is displayed to a player through a player interface 1320. The player interacts with the game client using player HIDs 1322. The game client receives the player inputs through the player HIDs and generates player actions 1315 that are transmitted to the game server via the network.

The GWE also receives the player actions and uses the player actions to generate a wager in a process as described herein, thus transforming the interactive entertainment game into a networked hybrid game. The wager is transmitted to the RWE for wagering or gambling purposes. The RWE receives the wager and executes a game of chance using the wager as described herein. A wagering result of the game of chance is transmitted to the GWE. In some embodiments, the GWE may intercept and modify the player actions based on the wager result before passing the player actions onto the game server. In numerous embodiments, the GWE may intercept the game state updates and use the wagering result to modify the game state updates before the game state updates are transmitted to the game client.

The game server receives the player actions and the game server engine uses the player actions and the central game state to update the central game state. The updates to the central game state are transmitted to the game client through the network and the game client uses the game state updates to update the local game state. The processes in both the game client and the game server loop continuously in a game loop while the player continues to play the networked hybrid game.

Figure 14:
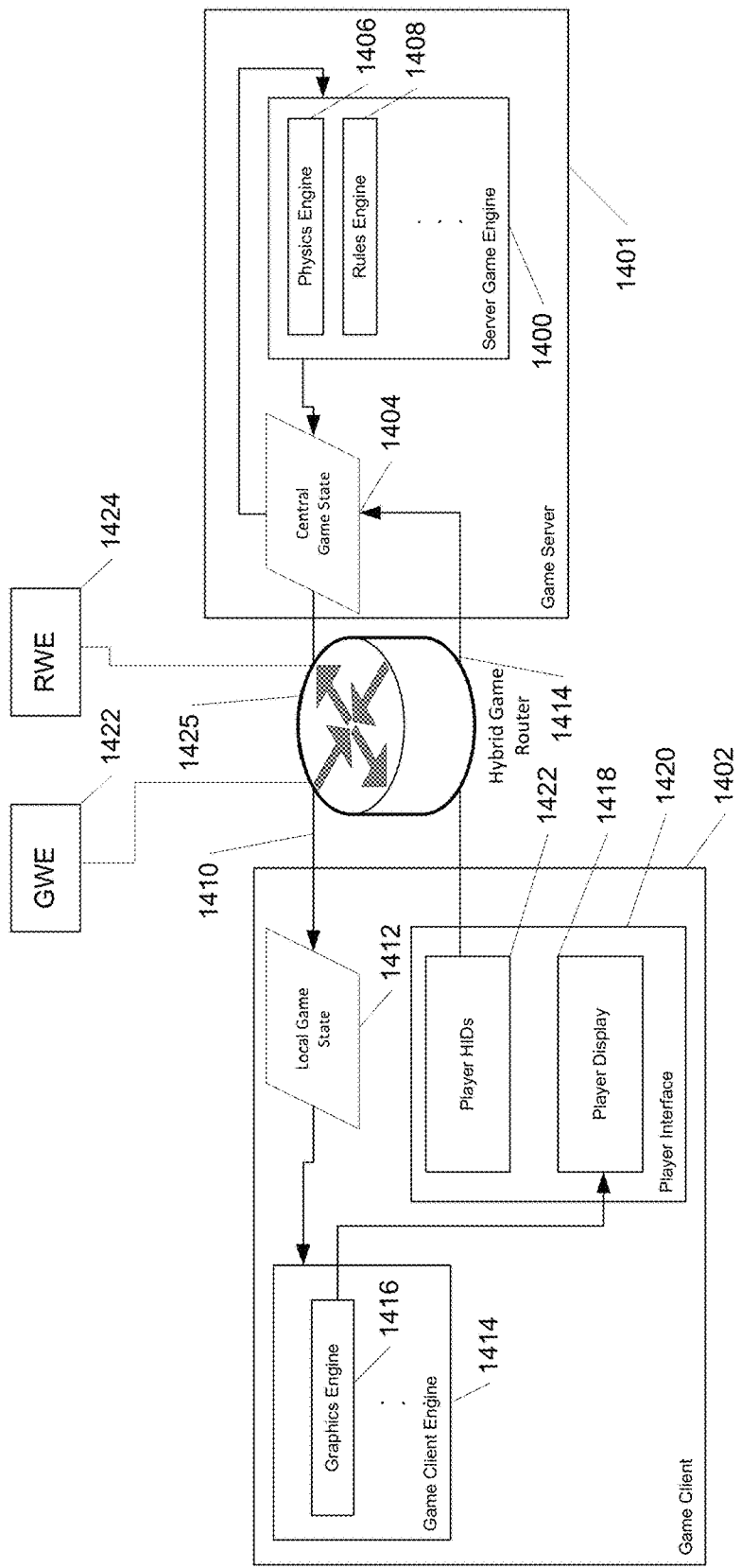
FIG. 14 is a deployment diagram of components of a networked hybrid game in accordance with an embodiment of the invention.

FIG. 14 is a deployment diagram of a networked hybrid game and a hybrid game router in accordance with an embodiment of the invention. In a networked hybrid game, an ESE, such as a game client 1402 hosted by a game client host, is operatively connected to a GWE 1422, an RWE 1424 and a game server 1400 hosted by a game server host, by a hybrid game router 1425. In various embodiments, the hybrid game router may be a component of the ESE and hosted by the ESE's host, the hybrid game router may be a component separate from the ESE and hosted by the ESE's host, or it may be a device separate from the ESE and the ESE's host. The hybrid game router routes communications between the ESE, or game client, and the GWE, RWE and game server as described herein.

In operation, the game server engine 1400 that is part of the game server 1401 is operatively connected through a network such as a LAN or WAN to a game world engine (GWE) 1422 hosted by a GWE host. The GWE is further operatively connected to the game client 1402 through the network. The GWE is also operatively connected to a real world engine (RWE) 1420. The game server includes a game server engine that uses a central game state 1404 to implement a game served by the game server. The game server engine includes components that operate on and use the central game state, such as a physics engine 1406, a game rules engine 1408, etc. The game server engine uses the central game state to generate an updated central game state. The game server also generates game state updates 1410 that may be used to update a synchronized local game state 1412 in the game client. The game state updates are transmitted through the network to the game client. The game client receives the game state updates and updates the local game state using the received game state updates.

In numerous embodiments, the GWE also receives the game state updates that the GWE uses to update its own local game state. In some embodiments, the GWE intercepts the game state updates and modifies the game state updates before transmitting the game state updates to the game client.

The game client includes a game client engine 1414. The game client engine includes components, such as a graphics engine 1416, etc., that operate on and use the local game state to implement the features of the game. The graphics engine generates a player display 1418 that is displayed to a player through a player interface 1420. The player interacts with the game client using player HIDs 1422. The game client receives the player inputs through the player HIDs and generates player actions 1414 that are transmitted to the game server via the network.

The GWE also receives the player actions and uses the player actions to generate a wager in a process as described herein. The wager is transmitted to the RWE for wagering or gambling purposes. The RWE receives the wager and executes a game of chance using the wager as described herein. A wagering result of the game of chance is transmitted to the GWE. In some embodiments, the GWE may intercept and modify the player actions based on the wager result before passing the player actions onto the game server. In numerous embodiments, the GWE may intercept the game state updates and use the wagering result to modify the game state updates before the game state updates are transmitted to the game client.

The game server receives the player actions and the game server engine uses the player actions and the central game state to update the central game state. The updates to the central game state are transmitted to the game client through the network and the game client uses the game state updates to update the local game state. The processes in both the game client and the game server loop continuously in a game loop while the player continues to play the networked hybrid game.

Figure 15:
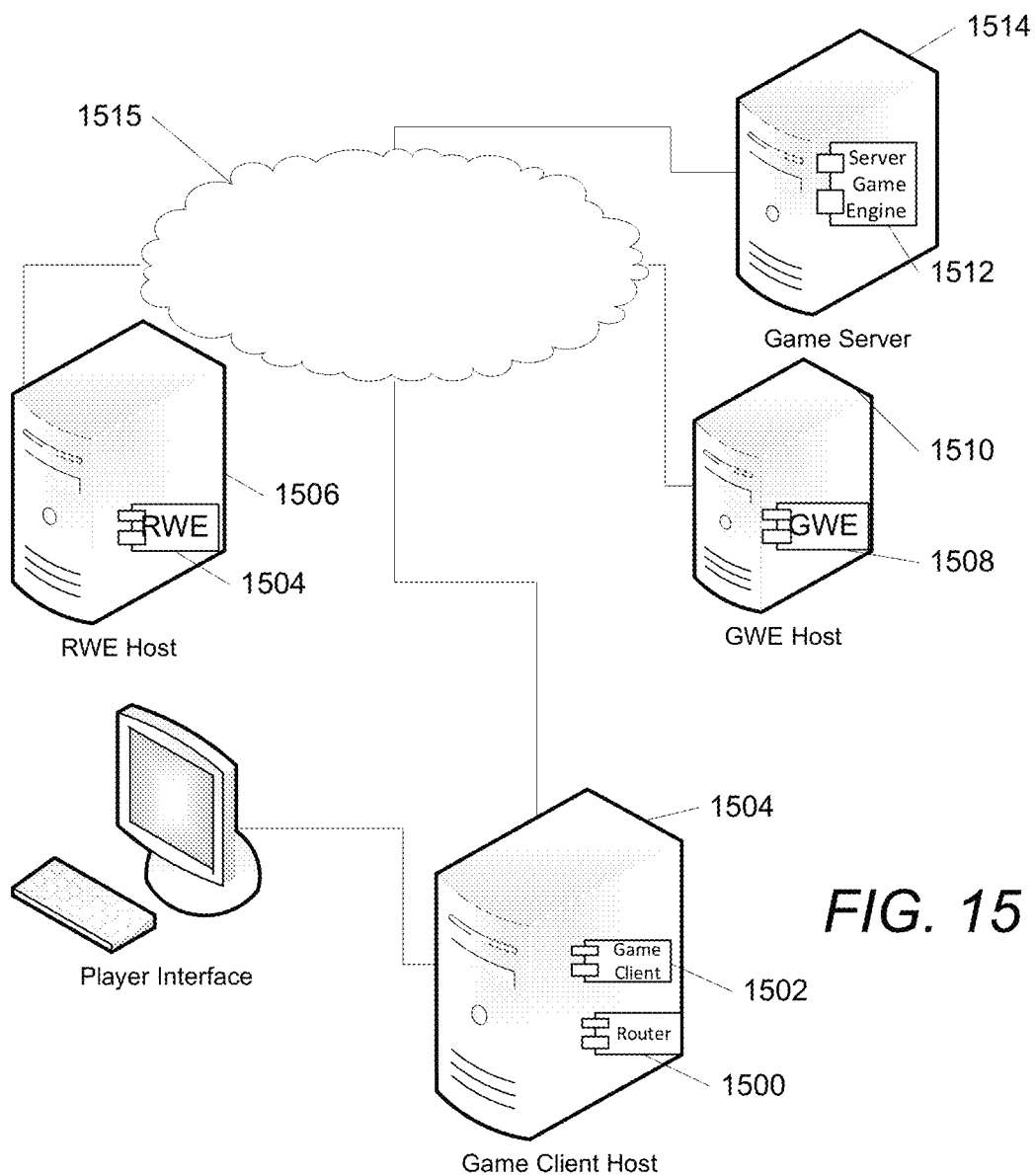
FIG. 15 is deployment diagram illustrating a networked hybrid game in accordance with an embodiment of the invention.

FIG. 15 is deployment diagram illustrating a networked hybrid game in accordance with an embodiment of the invention. A hybrid game router 1500 routes communications between an ESE or game client 1502 on an ESE host 1504, to an RWE 1504 on an RWE host 1506, a GWE 1508 on a GWE host 1510 and a game server 1512 on a game server host 1514 via a network 1515 such as a local area network or a wide area network (WAN) such as the Internet. In this embodiment, the game client or ESE and the hybrid game router are both hosted by the same host, namely the game client or ESE host.

Figure 16:
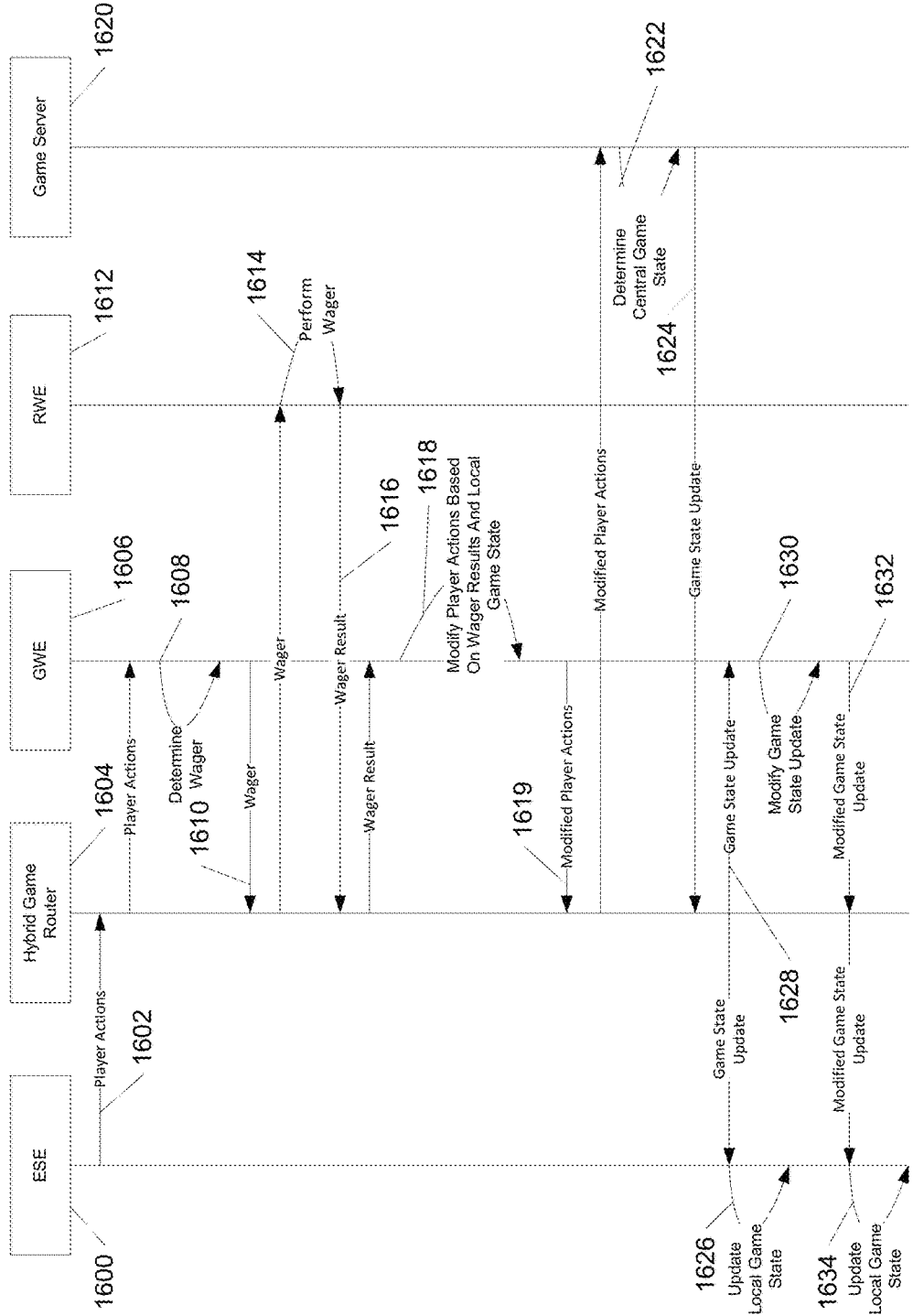
FIG. 16 is a sequence diagram illustrating the communications between components of a networked hybrid game in accordance with an embodiment of the invention.

FIG. 16 is a sequence diagram illustrating the communications between an ESE or game client hosted by an ESE host, through a hybrid game router and to a GWE, RWE and game server in accordance with an embodiment of the invention. The ESE receives player inputs from a player playing a game (not shown) of the ESE. The ESE 1600 determines player actions 1602 based on the player inputs as described herein. The player actions are the actions taken by the player when interacting with elements of the game such as the virtual objects, non-player characters, player characters, etc. within the game The ESE transmits the player actions to the hybrid game router 1604. The hybrid game router receives the player actions and routes them to the GWE 1606.

The GWE determines 1608 a type and amount of a wager 1610 based on the player actions as described herein and transmits the type and amount of the wager to the RWE 1612 via the hybrid game router. The RWE receives the type and amount of wager and determines 1614 a wager result 1616 as described herein and transmits the wager result to the GWE via the hybrid game router. The GWE uses the wager result to generate 1618 modified player actions 1619 that are transmitted to the game server 1620 via the hybrid game router.

In various embodiments, the GWE maintains a local game state that the GWE uses to modify intercepted game state updates and/or player actions being sent to the ESE by the game server.

The game server receives the modified player actions and updates 1622 a central game state using the player actions. The game server transmits a game state update 1624 to the hybrid game router. The game state update is to be used by the ESE to update 1626 a local game state maintained by the ESE such that the local game state remains synchronized with the central game state. The hybrid game router transmits the game state update to the ESE. The ESE uses the game state update to update the local game state maintained by the ESE.

In various embodiments, the GWE modifies the player actions based on the outcome of the wager made by the RWE. For example, the player's actions may have an effect on an outcome of a portion of the game being played by the player. In the case that the player is playing a First Person Shooter (FPS), the player's actions may include information about what weapon the player is currently using, the aim point of the weapon, the status of the weapon, whether the weapon has been actuated, etc. In a Role Playing Game (RPG) style game, the player actions may include information about what spells the player is casting and how many resources are to be used in casting the spell.

An outcome of the portion of the game that the player is player may be affected by modifying the player actions. For example, in the exemplary FPS case, an aimpoint of a weapon may be improved if the wager outcome is favorable to the player. In the exemplary RPG case, the indicated amount of resources used for a spell may be reduced if the wager outcome is unfavorable to the player, thus reducing the effectiveness of the cast spell. As the modified player actions are transmitted to the game server by the GWE instead of the actual player actions, the game server will use the modified player actions to update the central game state maintained by the game server instead of the actual player inputs. This may result in an improved game outcome for the player (if the wager outcome was favorable to the player) or may result in a worse game outcome for the player (if the wager outcome was not favorable to the player.)

In numerous embodiments, the hybrid game router eavesdrops on the communications of the ESE with the game server, for example by sniffing packets being transmitted between the ESE and game server if they are using a communications protocol using packets. The hybrid game router eavesdrops on the communications in order to determine if the communications coming from the ESE contain player actions for playing a game or are other types of communications between the ESE and the game server, such as the ESE and game server exchanging authentication information for a player, starting game states, etc. If the communications includes player action information, the hybrid game router routes the player actions to the GWE for processing. If the communications do not include player actions requiring processing by the GWE, the hybrid game router routes the communications to the game server.

In various embodiments, the hybrid game router may route the player actions to the GWE and the game server at the same time. This is to prevent any lag time created by communications between the RWE and the GWE from affecting the communications between the ESE and the game server. In such embodiments, the GWE does not modify the player actions before they are transmitted to the game server by the ESE.

In numerous embodiments, the GWE intercepts the game state update and modifies 1630 and a modified game state update 1632 is transmitted to the ESE for updating 1634 the local game state. In several such embodiments, the modification to the game state update is made based on the wager result generated by the RWE. In such embodiments, the GWE may generate its own display information regarding the wager result to the ESE for display to the player in another context or manner than in the context of the entertainment game being played by the player.

In numerous embodiments, the GWE receives the player actions from the ESE. The GWE uses the player actions to determine a wager as described herein. The wager is transmitted to the RWE. In response to receiving the wager, the RWE executes the wager as described herein and transmits the wager result back to the GWE. The GWE uses the wager result to generate a game state update based on the wager result, the player actions and the GWE's own local game state. For example, the GWE may calculate the amount an EE is incremented or decremented based on the wager result as described herein. The GWE uses the game state update to update its own local game state and transmits the game state update to the game engine along with the player actions. The game server receives the player actions and the game state updates to generate a new game state that is then used for processing as described herein.

In many embodiments, the ESE performs some of the services of a game engine, such as collision detection, and generates a game state update reflecting the processing result of the performed service that is transmitted along with the player actions to the other components of a hybrid game as described herein.

Figure 17:
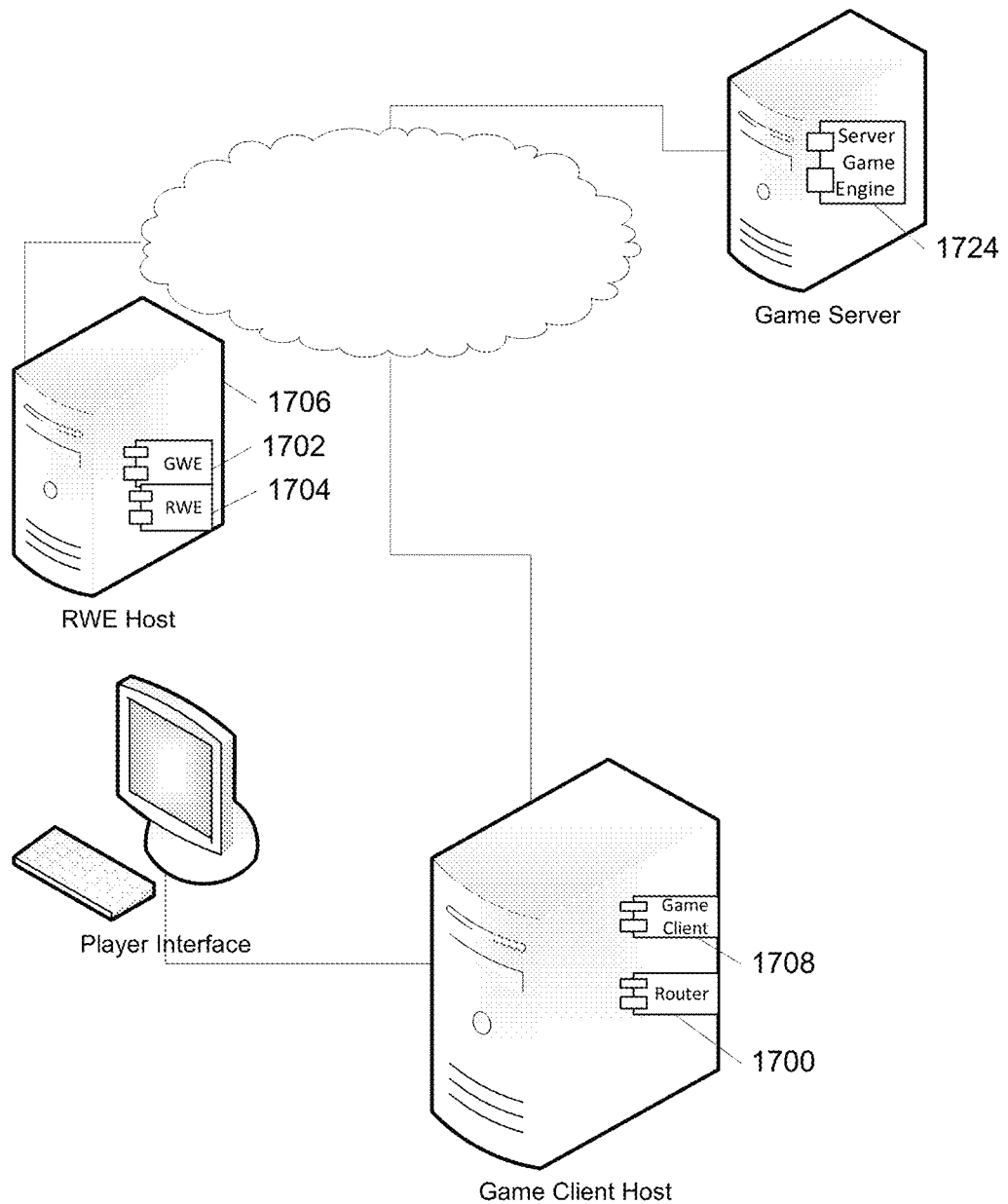
FIG. 17 is a deployment diagram illustrating components of a networked hybrid game in accordance with an embodiment of the invention.
Figure 18:
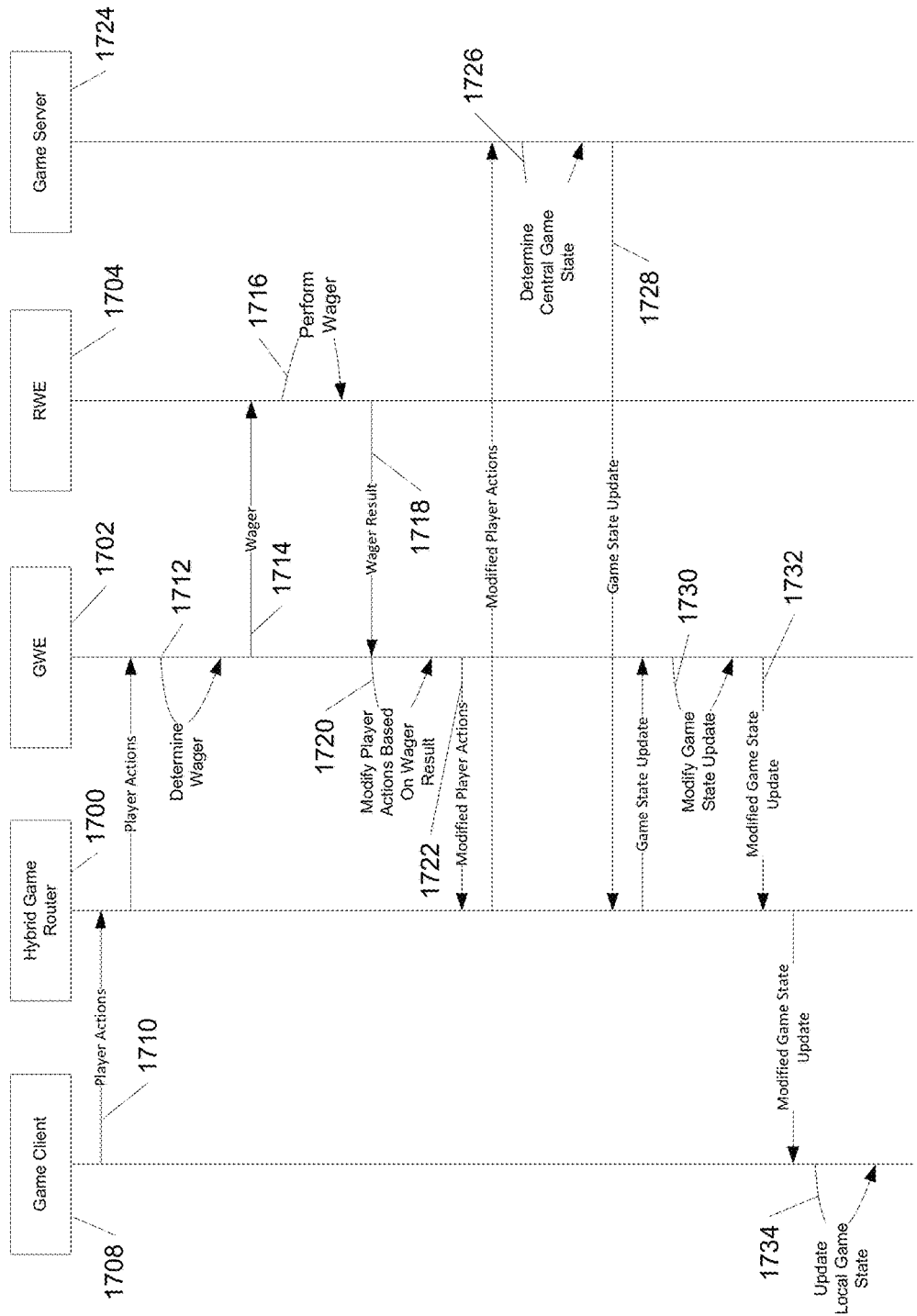
FIG. 18 is a sequence diagram illustrating the interactions between components of a networked hybrid game in accordance with an embodiment of the invention.

Referring now to both FIGS. 17 and 18, FIG. 17 is a deployment diagram illustrating that an RWE and GWE may be hosted on the same host, and FIG. 18 is a sequence diagram illustrating the interactions between an ESE, a GWE, an RWE and a game server, both figures being in accordance with an embodiment of the invention. In such an embodiment, the hybrid game router 1700 does not route communications between the GWE 1702 and the RWE 1704 as the GWE and RWE are hosted by the same host, namely RWE host 1706. The game client or ESE 1708 transmits the player actions 1710 to the hybrid game router. The hybrid game router receives the player actions and routes them to the GWE.

The GWE determines 1712 a type and amount of a wager based on the player actions and provides the type and amount of the wager 1714 to the RWE. The RWE receives the type and amount of wager and determines 1716 a wager result 1718 and provides the wager result to the GWE. The GWE uses the wager result to generate 1720 modified player actions 1722 as described herein that are transmitted to the game server 1724 via the hybrid game router.

The game server receives the modified player actions 1726 and updates a central game state using the player actions. The game server transmits a game state update 1728 to the hybrid game router. The hybrid game router routes the game state update to the GWE. The GWE receives the game state updates and modifies 1730 the game state updates based on the wager result as described herein. The GWE transmits the modified game state updates 1732 to the ESE via the hybrid game router and these updates 1734 the local game state using the modified game state updates.

As described herein, in various embodiments, the GWE may not modify the player actions before the player actions are transmitted to the game server by the hybrid game router. Instead, the hybrid game router routes the player actions to the game server and the GWE at the same time. In such embodiments, the GWE may transmit a separate game state update or other indication of the wager result to the ESE via the hybrid game router for display to the player playing the entertainment game.

In numerous embodiments, the GWE receives the player actions from the ESE. The GWE uses the player actions to determine a wager as described herein. The wager is transmitted to the RWE. In response to receiving the wager, the RWE executes the wager as described herein and transmits the wager result back to the GWE. The GWE uses the wager result to generate a game state update based on the wager result, the player actions and the GWE's own local game state. For example, the GWE may calculate the amount an EE is incremented or decremented based on the wager result as described herein. The GWE uses the game state update to update its own local game state and transmits the game state update to the game engine along with the player actions. The game server receives the player actions and the game state updates to generate a new game state that is then used for processing as described herein.

Figure 19:
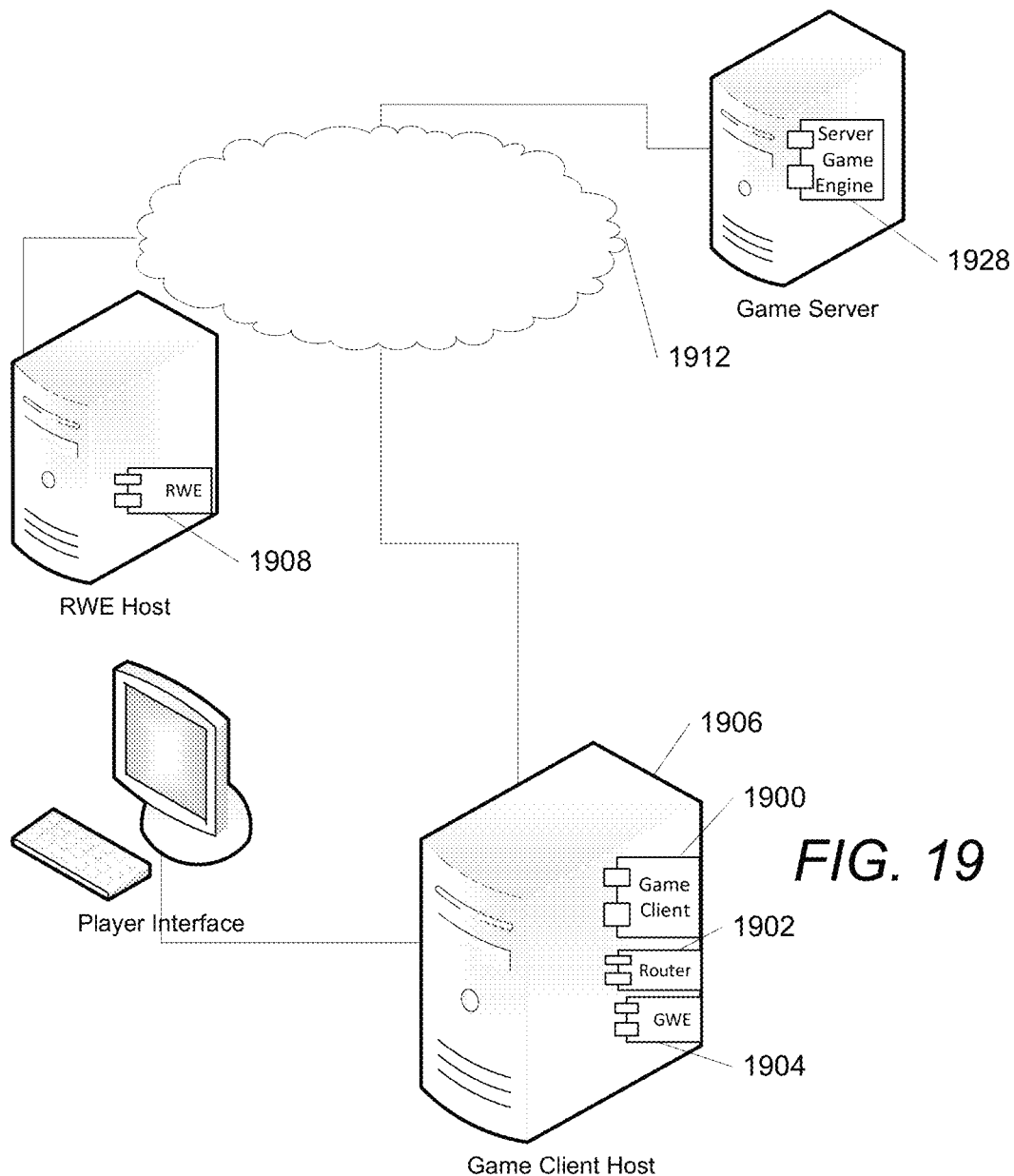
FIG. 19 is a deployment diagram of components of a networked hybrid game in accordance with an embodiment of the invention.
Figure 20:
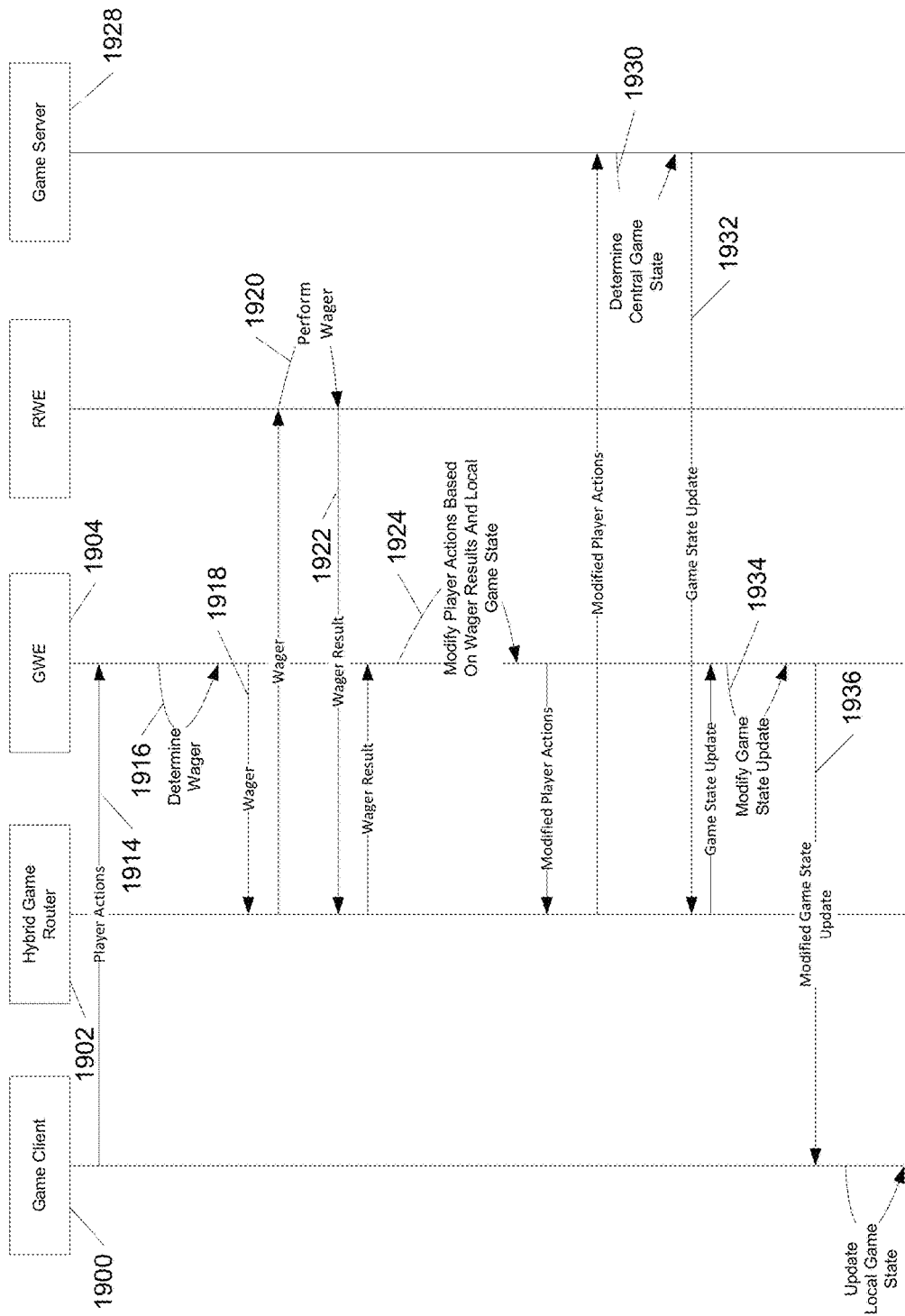
FIG. 20 is a sequence diagram illustrating a sequence of operations between components of a networked hybrid game in accordance with an embodiment of the invention.

Referring now to FIGS. 19 and 20, FIG. 19 is a deployment diagram and FIG. 20 is a sequence diagram illustrating the sequence of operations between components of a networked hybrid game in accordance with an embodiment of the invention. An ESE or game client 1900, a hybrid game router 1902, and a GWE 1904 may all be hosted by the ESE or game client host 1906. In such embodiments, the hybrid game router routes communications from the GWE to an RWE 1908 hosted by an RWE host 1910 through a network 1912, such as a local area network or a wide area network.

In operation, the ESE or game client 1900 transmits player actions 1914 to the GWE. The GWE receives the player actions and determines 1916 a wager 1918 as described herein. The GWE transmits the wager to the hybrid game router. The hybrid game router receives the wager and transmits the wager to the RWE. The RWE receives the wager and executes 1920 a wagering game using the wager as described herein. The RWE transmits a wager result 1922 of the executed wager to the hybrid game router. The hybrid game router receives the wager result and transmits the wager result to the GWE. The GWE receives the wager result and modifies 1924 the player actions based on the wager results and a local game state maintained by the GWE. The GWE transmits the modified player actions to the hybrid game router. The hybrid game router receives the modified player actions and transmits the modified player actions to the game server 1928. The game server receives the modified player actions and determines 1930 a new central game state using the player actions. The game server also determines a game state update 1932 that is used by the GWE and the ESE to update their respective local game states. The game server transmits the game state update to the hybrid game router. The hybrid game router receives the game state update and transmits the game state update to the GWE. The GWE receives the game state update and modifies 1934 the game state update as described herein. The GWE transmits the modified game state update to the ESE and the ESE uses the modified game state update to update 1938 its local game state.

In several embodiments, the GWE may not modify the game state update and merely uses the game state update to update its own local game state. The GWE transmits the game state update to the ESE. The ESE receives the game state update and updates its own local game state.

In various embodiments, the GWE may not modify the player actions before the player actions are transmitted to the game server by the hybrid game router. Instead, the hybrid game router routes the player actions to the game server and the GWE at the same time. In such embodiments, the GWE may transmit a separate game state update or other indication of the wager result to the ESE via the hybrid game router for display to the player playing the entertainment game.

In numerous embodiments, the GWE receives the player actions from the ESE. The GWE uses the player actions to determine a wager as described herein. The wager is transmitted to the RWE. In response to receiving the wager, the RWE executes the wager as described herein and transmits the wager result back to the GWE. The GWE uses the wager result to generate a game state update based on the wager result, the player actions and the GWE's own local game state. For example, the GWE may calculate the amount an EE is incremented or decremented based on the wager result as described herein. The GWE uses the game state update to update its own local game state and transmits the game state update to the game engine along with the player actions. The game server receives the player actions and the game state updates to generate a new game state that is then used for processing as described herein.

Figure 21:
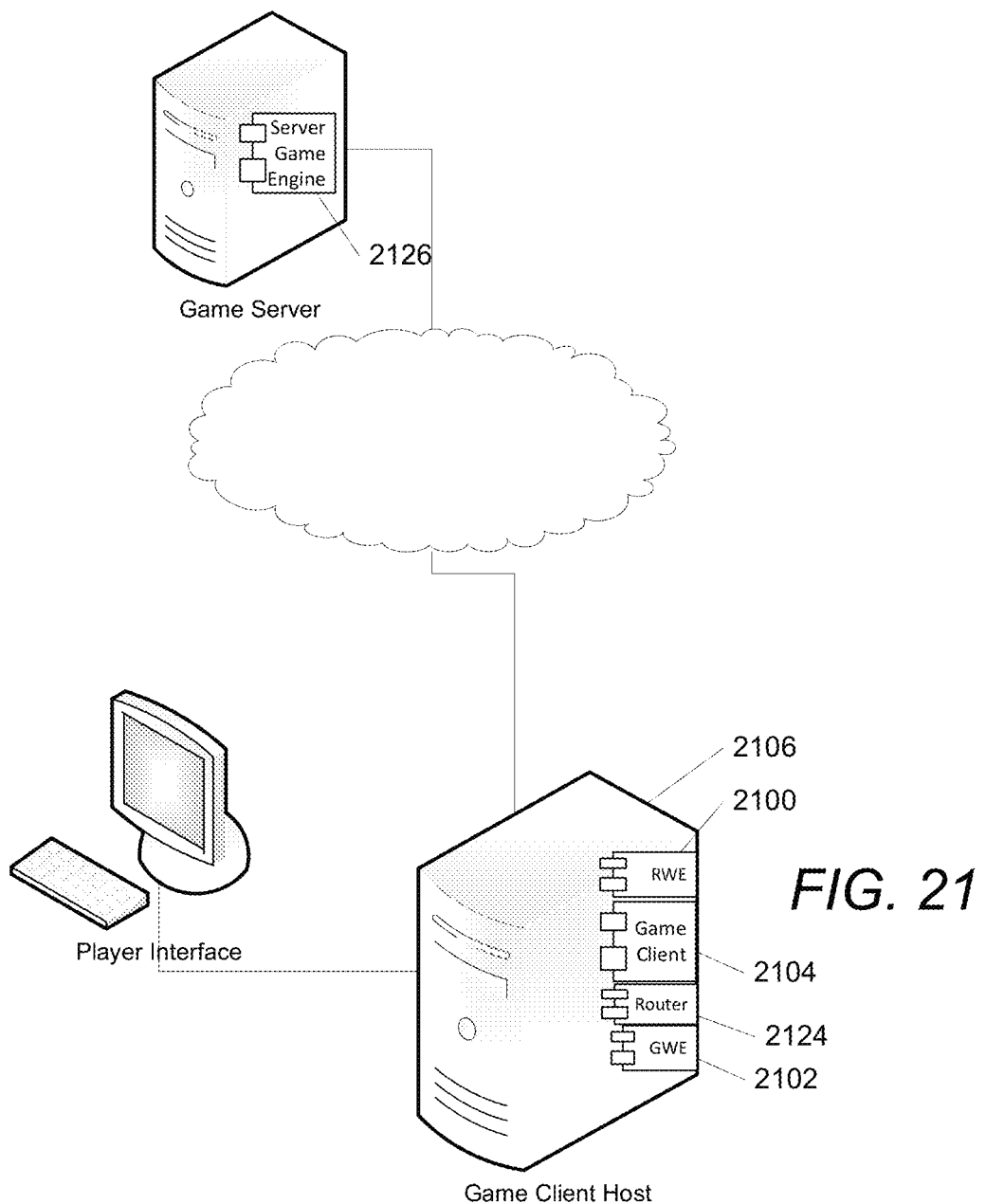
FIG. 21 is a deployment diagram of components of a networked hybrid game in accordance with an embodiment of the invention.
Figure 22:
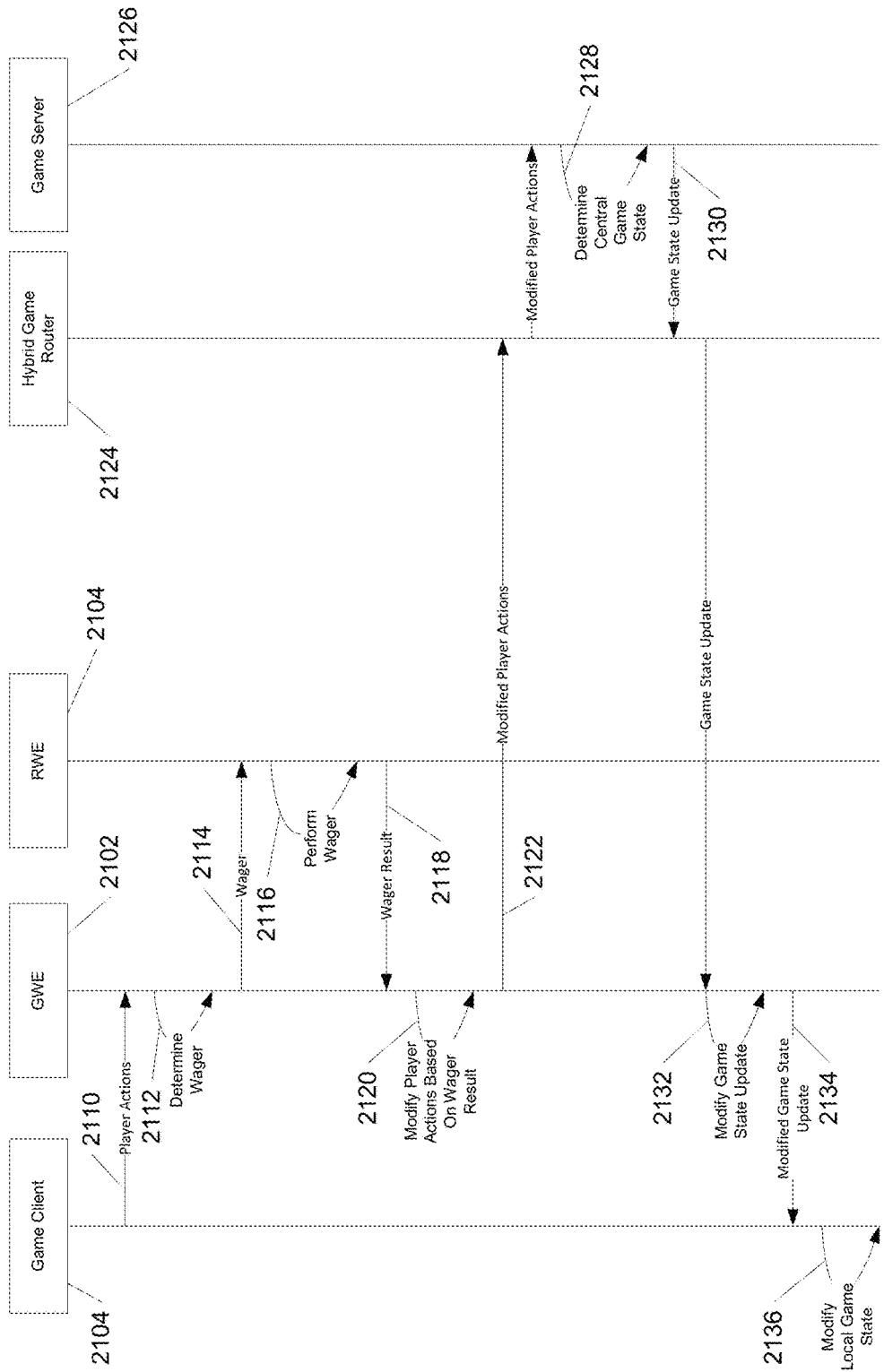
FIG. 22 is a sequence diagram illustrating a sequence of operations between components of a networked hybrid game in accordance with an embodiment of the invention.

Referring now to FIGS. 21 and 22, FIG. 21 is a deployment diagram and FIG. 22 is a sequence diagram for a networked hybrid game in accordance with an embodiment in accordance of the invention. In such an embodiment, an RWE 2100, GWE 2102 and ESE or game client 2104 may be hosted by the same host 2106. In operation, the ESE transmits player actions 2110 to the GWE. The GWE receives the player actions and determines 2112 a wager 2114 using the player actions as described herein. The GWE transmits the wager to the RWE. The RWE receives the wager and executes 2116 a wagering game using the wager as described herein. The RWE transmits a wager result 2118 of the executed wager to the GWE. The GWE receives the wager result and modifies 2120 the player actions based on the wager results and the local game state maintained by the GWE and the ESE. The GWE transmits the modified player actions 2122 to the hybrid game router 2124. The hybrid game router receives the modified player actions and transmits the modified player actions to the game server 2126. The game server receives the modified player actions and determines 2128 a new central game state using the player actions. The game server also determines a game state update 2130 that is used by the GWE and the ESE to update the local game state. The game server transmits the game state update to the hybrid game router. The hybrid game router receives the game state update and transmits the game state update to the GWE. The GWE receives the game state update and modifies 2132 the game state as described herein. The GWE transmits the modified game state update 2134 to the ESE. The ESE uses the modified game state update to modify 2136 the local game state.

In various embodiments, a GWE does not modify the game state update and uses the game state update to update a local game state or transmits the game state update to the ESE without modification.

As described herein, a GWE may modify the player actions received from the ESE before those player actions are forwarded to a game server. The modifications to the player actions are based on a wager result received from an RWE. The modified player actions may be modified in such a way that the modifications improve the player's chances for having a successful outcome in the game being played by the player. Alternatively, the player actions may be modified such that they decrease the player's chances of a successful outcome in the game being played by the player.

In numerous embodiments, a GWE receives the player actions from the ESE. The GWE uses the player actions to determine a wager as described herein. The wager is transmitted to the RWE. In response to receiving the wager, the RWE executes the wager as described herein and transmits the wager result back to the GWE. The GWE uses the wager result to generate a game state update based on the wager result, the player actions and the GWE's own local game state. For example, the GWE may calculate the amount an EE is incremented or decremented based on the wager result as described herein. The GWE uses the game state update to update its own local game state and transmits the game state update to the game engine along with the player actions. The game server receives the player actions and the game state updates to generate a new game state that is then used for processing as described herein.

In various embodiments, a GWE may not modify the player actions before the player actions are transmitted to the game server by the hybrid game router. Instead, the GWE transmits the player actions to the game server via the hybrid game router. In such embodiments, the GWE may transmit a separate game state update or other indication of the wager result to the ESE via the hybrid game router for display to the player playing the entertainment game.

In various embodiments, a hybrid game router may be implemented as a component of the host hosting the ESE or client game. In such a case, the hybrid game router may be implemented as a reprogrammable or reconfigurable router and used to route communications to the appropriate GWE, ESE and RWE components. That is, the hybrid game router contains the addresses needed to route communications to components external to the ESE host. As such, the components hosted by the ESE host need not know the addresses of the external components and need only establish communications with the hybrid game router and do not need to handle the communications protocols with the other components hosted outside of the ESE host.

In numerous embodiments, a hybrid game router intercepts communications between the ESE or game client and the game server. The hybrid game router then reroutes communications from the ESE to the game server through the GWE and RWE as described herein. In addition, the hybrid game router intercepts the communications coming from the game server to the ESE or game client and reroutes those communications to the GWE for processing as described herein. In this way, an ESE, a GWE, an RWE and a game server may be implemented independently of one another, with only the hybrid game router needing to know the addresses of the disparate components.

Figure 23:
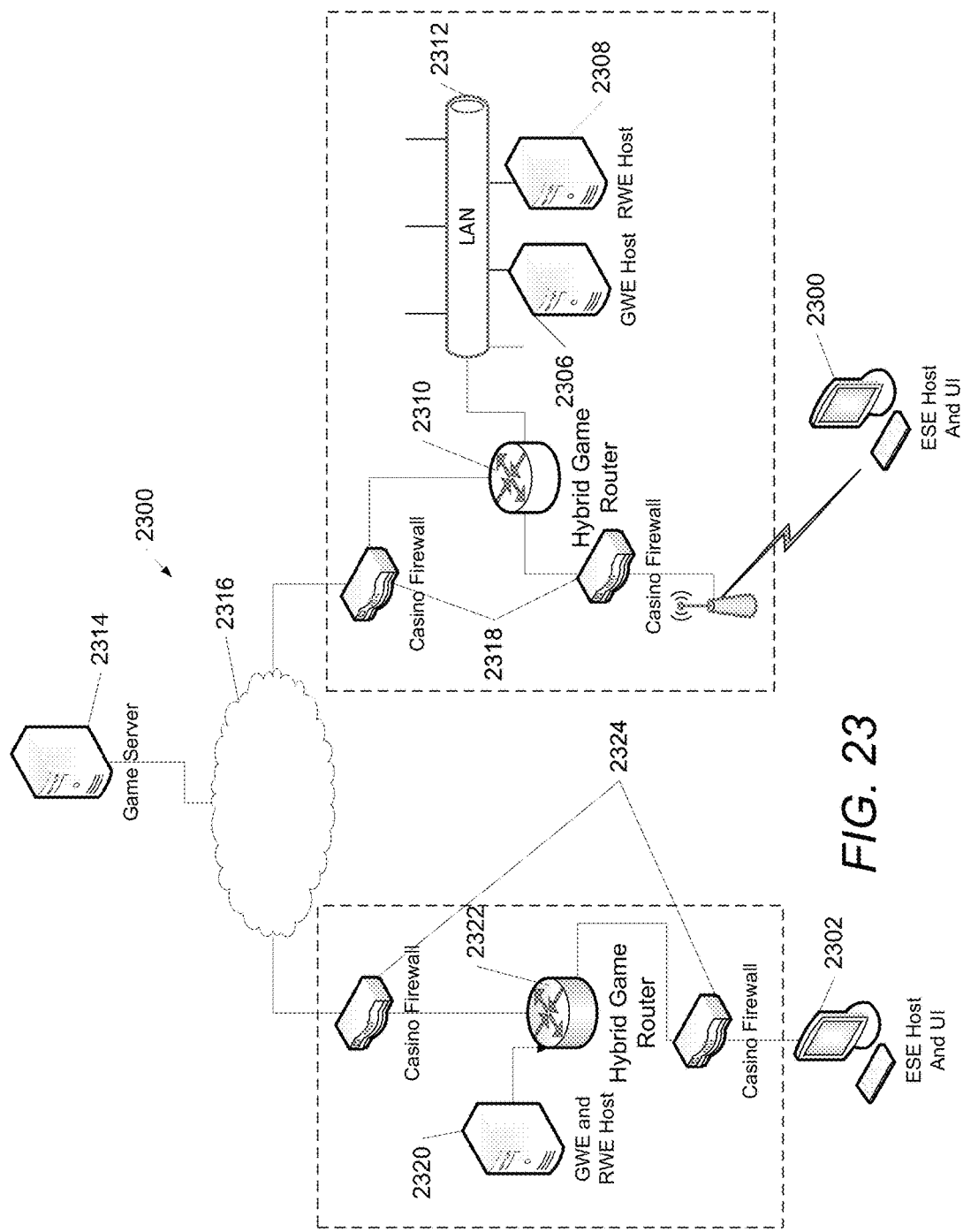
FIG. 23 is a deployment diagram of components of a networked hybrid game in accordance with an embodiment of the invention.

FIG. 23 is a deployment diagram of a hybrid online gaming system incorporating components of a networked hybrid game in accordance with an embodiment of the invention. In a hybrid online gaming system 2300, an ESE host 2302, is operatively connected to a GWE host and an RWE host 2320 by a hybrid game router 2322. The hybrid game router, GWE and RWE host are operated by a casino operator under a regulatory environment that is consistent with the casino operator's physical location. That is, wherever the casino operator is subject to regulatory control, the same regulatory controls are applied to the casino operator's operation of the GWE host and the RWE host. The ESE host may or may not be physically located such that a player of a game of an ESE hosted by the ESE host is subject to the same regulatory controls as the GWE host and RWE host. That is, the ESE host may be operatively connected to the hybrid game router through a wide area network (WAN) or a local area network (LAN) such that the ESE host is not located in the same jurisdiction as the casino operator.

The combination of the GWE and RWE host and hybrid game router are used to implement an online casino having an identifiable physical location at which the casino operator consents to regulatory control. The hybrid game router also operatively connects the ESE host to a game server 2314 via a network 2316 such as a local area network (LAN) or a wide area network (WAN) such as the Internet. The hybrid game router does so through a firewall 2324 that protects the LAN of the online casino from intrusion. Thus the ESE host is operatively connected to the GWE and RWE host of the casino and to the game server through the hybrid game router. In addition, the hybrid game router acts as an edge router for the casino LAN and as a bridge between the casino LAN and the WAN.

Also illustrated are another GWE and RWE host 2320 and hybrid game router 2322 that may be physically located in another location and subject to another regulatory environment and are used to implement another online casino that is operated in the other regulatory environment. Another ESE 2300 is operatively connected to the other hybrid game router 2302 via a wireless access point (WAP) illustrating that an ESE may be prevented from connecting to a hybrid game router unless that ESE is in close physical proximity to the hybrid game router, and thus is operated under the same regulatory environment as the other casino.

A GWE host 2306, RWE host 2308 and hybrid game router are operatively connected by a LAN 2312. The other ESE 2300 is also operatively connected by the other hybrid game router 2310 to the game server 2314 via the network 2316. Accordingly, both the ESE 2302 and the other ESE 2300 can communicate with the game server, thus allowing two separate players to play an online game administered by the game server. However, the ESE 2302 and the other ESE 2300 may be connected to separate GWE hosts and RWE hosts that are subject to separate regulatory controls. Therefore, a player of the ESE host 2302 and a player of the other ESE host 2300 will be connected to the same game server, but will play through online casinos that may be under separate regulatory controls.

In some embodiments, an ESE host is operatively connected through a hybrid game router and a WAN or LAN to a GWE host. The GWE host is also operatively connected through the hybrid game router to an RWE. Alternatively, the GWE may be operatively connected to the RWE host through a separate router. This enables the GWE host and GWE to be maintained outside of the jurisdiction of the RWE and/or maintained by a different entity than the entity that manages the RWE host.

In many embodiments, the GWE and the ESE are hosted by the same host. In this configuration, the ESE and GWE are hosted by the same device. In addition, the program instructions used to implement the features of the GWE and the ESE may be components of the same software package. Furthermore, the ESE and GWE communicate with each other without transmissions through the hybrid game router while the GWE may still use the hybrid game router for communications with the RWE.

Figure 24:
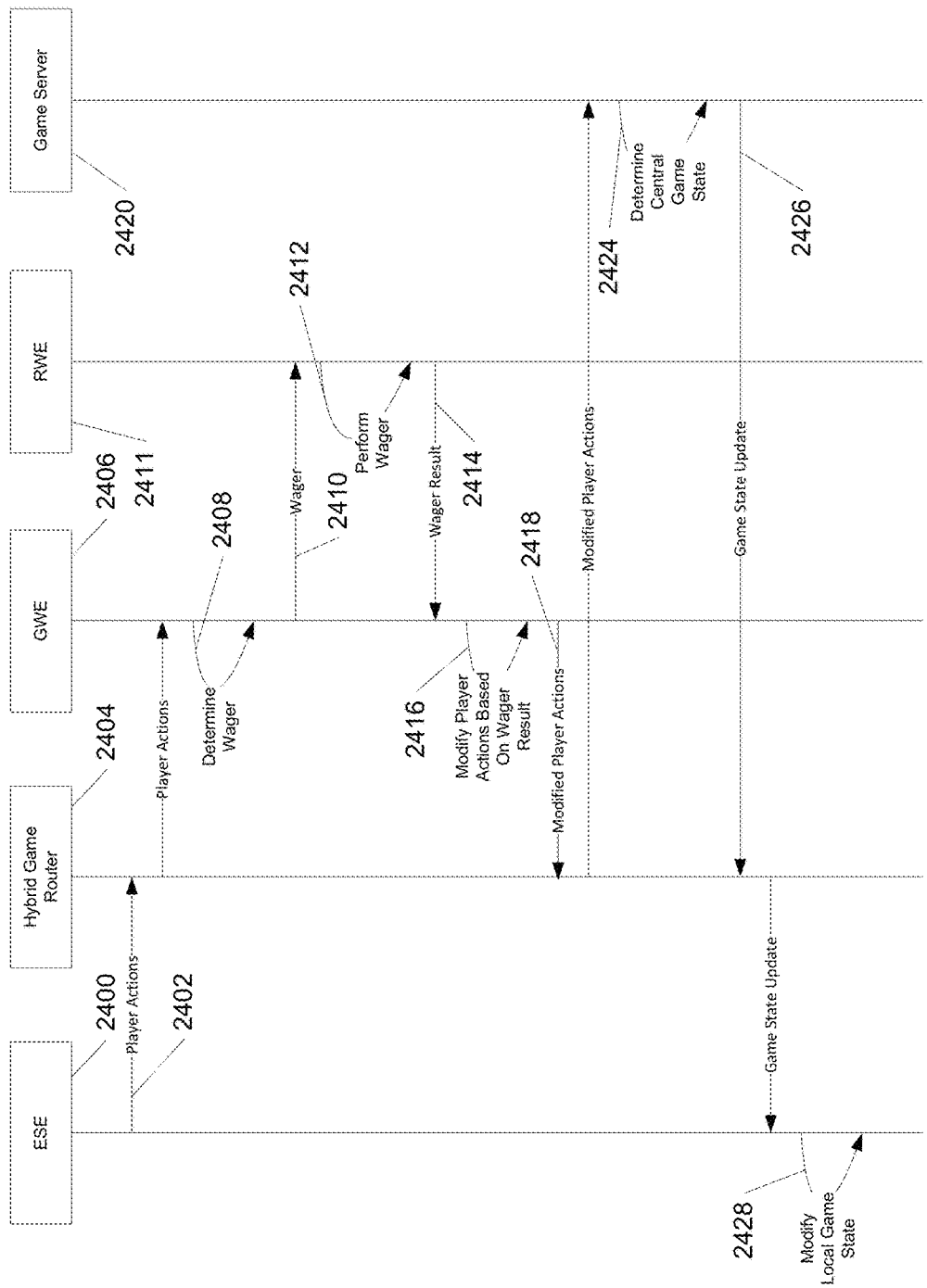
FIG. 24 is a sequence diagram illustrating a sequence of operations between components of a networked hybrid game in accordance with an embodiment of the invention.

FIG. 24 is a sequence operation illustrating the communications between an ESE hosted by an ESE host, through a hybrid game router and to a game server in accordance with an embodiment of the invention. The ESE 2400 receives player inputs from a player playing a game (not shown) of the ESE. The ESE determines player actions 2402 based on the player inputs. The player actions are the actions taken by the player when interacting with elements of the game such as the virtual objects, non-player characters, player characters, etc. within the game The ESE transmits the player actions to a hybrid game router 2404. The hybrid game router receives the player actions and routes them to a GWE 2406.

The GWE determines 2408 a type and amount of a wager 2410 based on the player actions and transmits the type and amount of the wager to an RWE 2411. The RWE receives the type and amount of wager and determines 2412 a wager result 2414 and transmits the wager result to the GWE. The GWE uses the wager result to generate 2416 modified player actions 2418 as described herein that are transmitted to a game server 2420 via the hybrid game router.

The game server receives the modified player actions and updates 2424 a central game state using the player actions. The game server transmits a game state update 2426 to the hybrid game router. The game state update is to be used by the ESE to update a local game state maintained by the ESE such that the local game state remains synchronized with the central game state. The hybrid game router transmits the game state update to the ESE. The ESE uses the game state update to update 2428 the local game state maintained by the ESE.

In various embodiments, the GWE modifies the player actions based on the outcome of the wager made by the RWE. For example, as described herein, the player's actions may have an effect on an outcome of a portion of the game being played by the player. In the case that the player is player a FPS, the player's actions may include information about what weapon the player is currently using, the aim point of the weapon, the status of the weapon, whether the weapon has been actuated, etc. In an RPG style game, the player actions may include information about what spells the player is casting and how many resources are to be used in casting the spell. An outcome of the portion of the game that the player is player may be affected by modifying the player actions. For example, in the exemplary FPS case, the aim-point of the weapon may be improved if the wager outcome is favorable to the player. In the exemplary RPG case, the indicated amount of resources used for the spell may be reduced if the wager outcome is unfavorable to the player, thus reducing the effectiveness of the cast spell. As the modified player actions are transmitted to the game server by the GWE instead of the actual player actions, the game server will use the modified player actions to update the central game state maintained by the game server instead of the actual player inputs. This may result in an improved game outcome for the player (if the wager outcome was favorable to the player) or may result in a worse game outcome for the player (if the wager outcome was not favorable to the player.)

In numerous embodiments, the hybrid game router eavesdrops on the communications of the ESE with the game server, for example by sniffing packets being transmitted between the ESE and game server if they are using a communications protocol using packets. The hybrid game router eavesdrops on the communications in order to determine if the communications coming from the ESE contain player actions for playing a game or are other types of communications between the ESE and the game server, such as the ESE and game server exchanging authentication information for a player, starting game states, etc. If the communications includes player action information, the hybrid game router routes the player actions to the GWE for processing. If the communications do not include player actions requiring processing by the GWE, the hybrid game router routes the communications to the game server.

Figure 25:
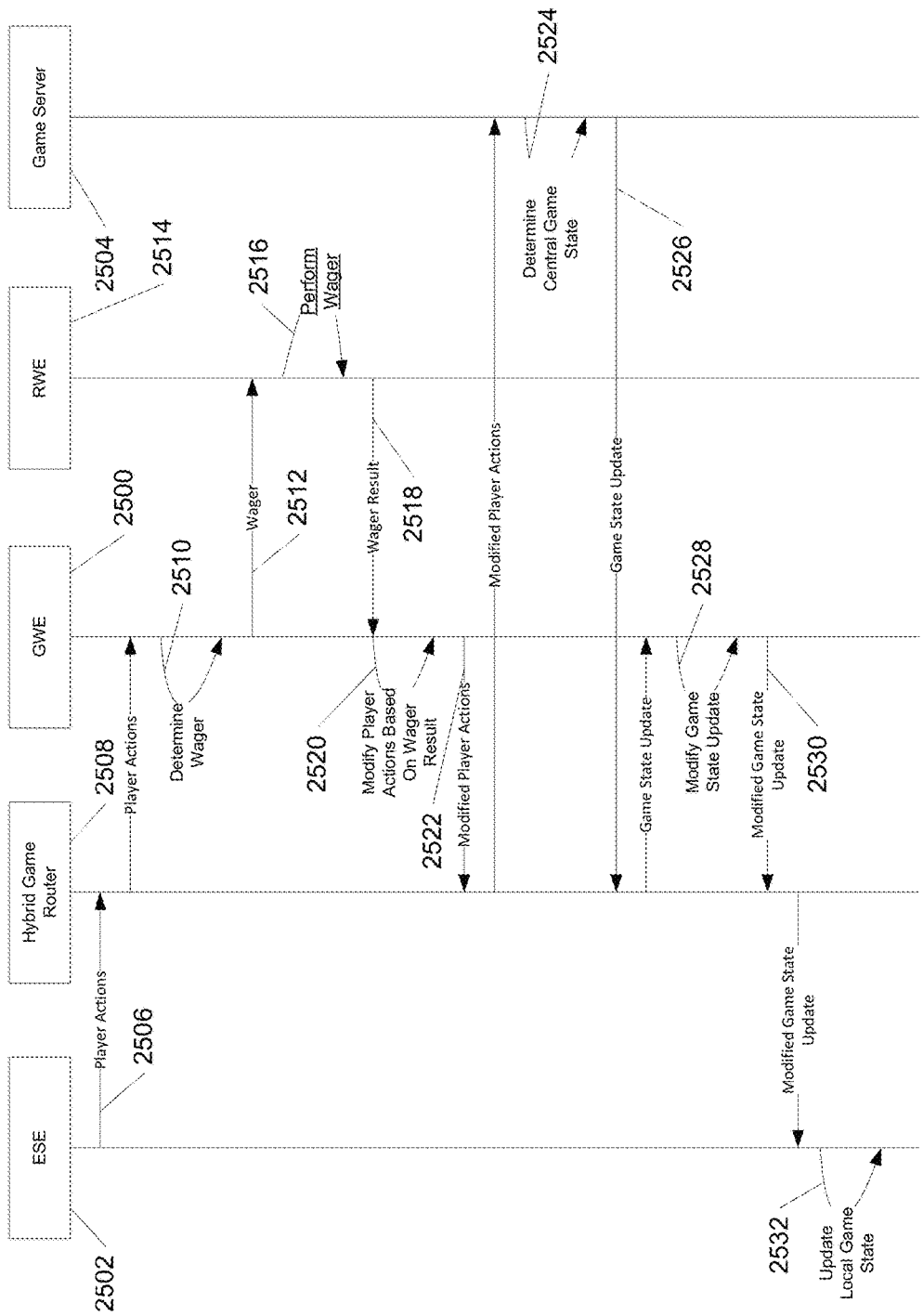
FIG. 25 is a sequence diagram illustrating a sequence of operations between components of a networked hybrid game in accordance with an embodiment of the invention.

FIG. 25 is a sequence diagram illustrating the interactions between an ESE, a GWE, a RWE and a game server in accordance with an embodiment of the invention. In this diagram, a GWE 2500 intercepts and modifies game state updates being sent to an ESE 2502 by a game server 2504. The ESE receives player inputs from a player playing a game of the ESE. The ESE determines player actions 2506 based on the player inputs. The player actions are the actions taken by the player when interacting with elements of the game such as the virtual objects, non-player characters, player characters, etc. within the game The ESE transmits the player actions to a hybrid game router 2508. The hybrid game router receives the player actions and routes them to the GWE.

The GWE determines 2510 a type and amount of a wager 2512 based on the player actions and transmits the type and amount of the wager to an RWE 2514. The RWE receives the type and amount of wager and determines 2516 a wager result 2518 and transmits the wager result to the GWE. The GWE uses the wager result to generate 2520 modified player actions 2522 as described herein that are transmitted to the game server via the hybrid game router.

The game server receives the modified player actions and updates 2524 a central game state using the player actions. The game server transmits a game state update 2526 to the hybrid game router. The hybrid game router routes the game state update to the GWE. The GWE receives the game state updates and modifies the game state updates 2528 as described herein based on the wager result. The GWE transmits the modified game state updates to the ESE via the hybrid game router and the ESE uses the modified game state updates to update 2532 a local game state.

Figure 26:
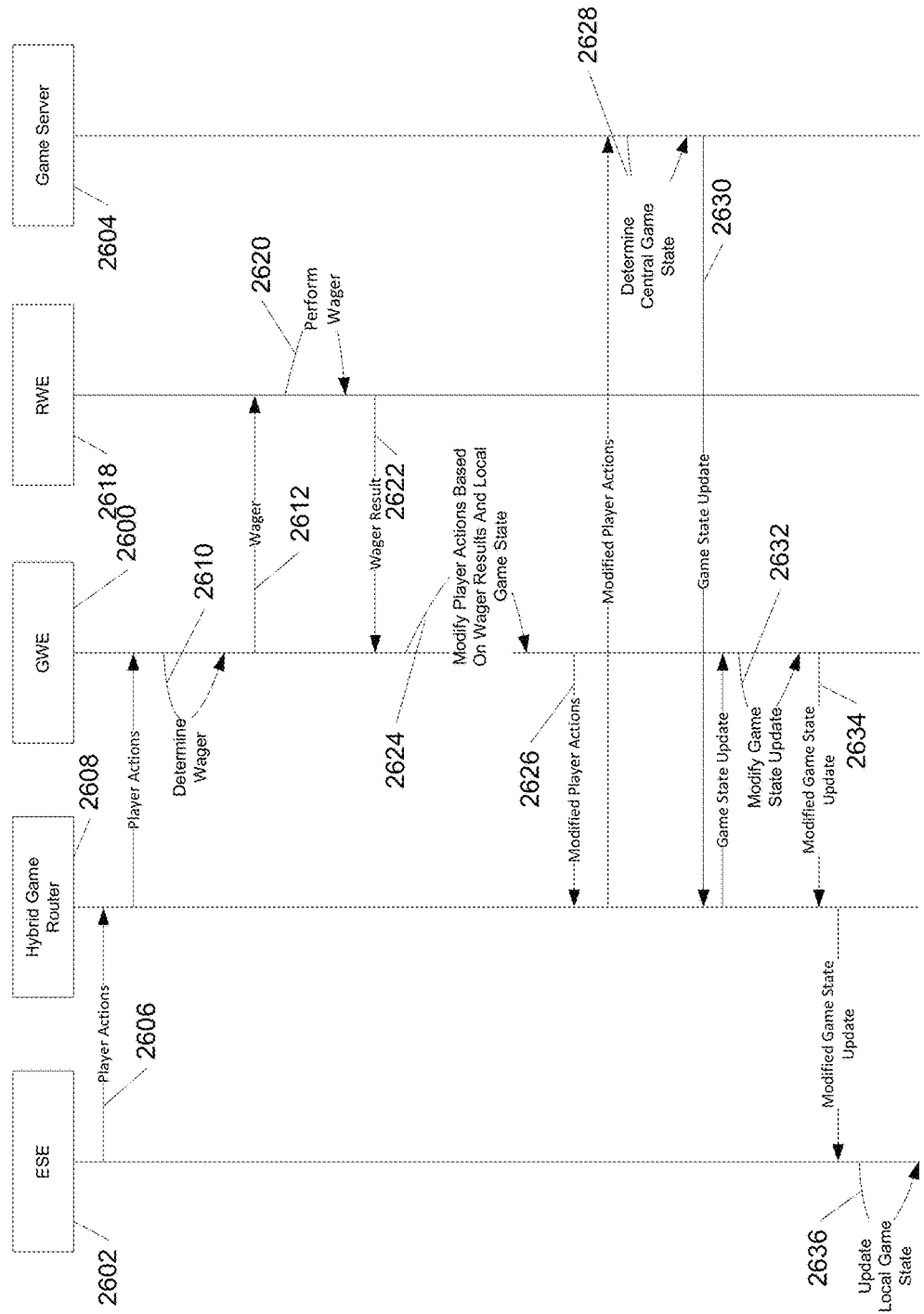
FIG. 26 is a sequence diagram illustrating a sequence of operations between components of a networked hybrid game in accordance with an embodiment of the invention.

FIG. 26 is a sequence diagram illustrating the interactions between an ESE, a GWE, a RWE and a game server in accordance with an embodiment of the invention. In this diagram, a GWE 2600 maintains a local game state that the GWE uses to modify intercepted game state updates and/or player actions being sent to an ESE 2602 by a game server 2604. The ESE receives player inputs from a player playing a game of the ESE. The ESE determines player actions 2606 based on the player inputs. The player actions are the actions taken by the player when interacting with elements of the game such as the virtual objects, non-player characters, player characters, etc. within the game The ESE transmits the player actions to a hybrid game router 2608. The hybrid game router receives the player actions and routes them to the GWE.

The GWE determines 2610 a type and amount of a wager 2612 based on the player actions and transmits the type and amount of the wager to an RWE 2618. The RWE receives the type and amount of wager and determines 2620 a wager result 2622 and transmits the wager result to the GWE. The GWE uses the wager result and a local game state to generate 2624 modified player actions 2626 as described herein that are transmitted to the game server via the hybrid game router.

The game server receives the modified player actions and updates 2628 a central game state using the player actions. The game server transmits a game state update 2630 to the hybrid game router. The hybrid game router routes the game state update to the GWE. The GWE receives the game state updates and modifies 2632 the game state updates based on the wager result and the local game state being maintained by the GWE. The GWE also uses the modified game state update 2634 to update the GWE's own local game state. In this manner, the GWE holds and maintains a local game state that is kept in synchronization with the local game state of the ESE. The GWE transmits the modified game state updates to the ESE via the hybrid game router and the ESE uses the modified game state updates to update 2636 a local game state.

In numerous embodiments, the GWE receives the player actions from the ESE. The GWE uses the player actions to determine a wager as described herein. The wager is transmitted to the RWE. In response to receiving the wager, the RWE executes the wager as described herein and transmits the wager result back to the GWE. The GWE uses the wager result to generate a game state update based on the wager result, the player actions and the GWE's own local game state. For example, the GWE may calculate the amount an EE is incremented or decremented based on the wager result as described herein. The GWE uses the game state update to update its own local game state and transmits the game state update to the game engine along with the player actions. The game server receives the player actions and the game state updates to generate a new game state that is then used for processing as described herein.

In many embodiments, the ESE performs some of the services of a game engine, such as collision detection, and generates a game state update reflecting the processing result of the performed service that is transmitted along with the player actions to the other components of a hybrid game as described herein.

Figure 27:
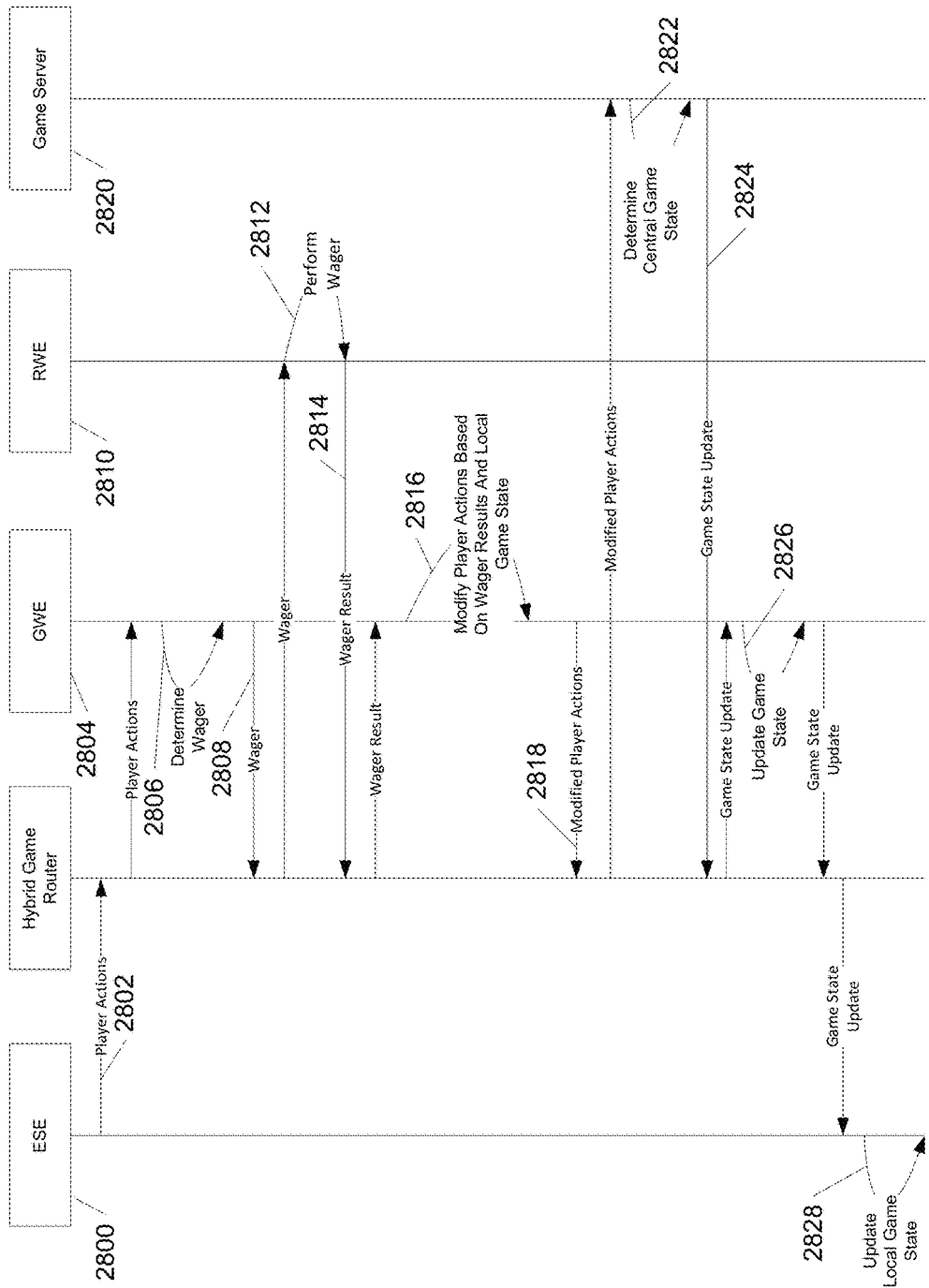
FIG. 27 is a sequence diagram illustrating a sequence of operations between components of a networked hybrid game in accordance with an embodiment of the invention.

FIG. 27 is a sequence diagram illustrating the sequence of operations between components of an online casino in accordance with an embodiment of the invention. An ESE 2800 transmits player actions to a hybrid game router 2802. The hybrid game router receives the player actions from the ESE and transmits the player actions to a GWE 2804. The GWE receives the player actions and determines 2806 a wager 2808 as described herein. The GWE transmits the wager to the hybrid game router. The hybrid game router receives the wager and transmits the wager to an RWE 2810. The RWE receives the wager and executes 2812 a wagering game using the wager as described herein. The RWE transmits a wager result 2814 of the executed wager to the hybrid game router. The hybrid game router receives the wager result and transmits the wager result to the GWE. The GWE receives the wager result and modifies 2816 the player actions based on the wager results and a local game state maintained by the GWE. The GWE transmits the modified player actions 2818 to the hybrid game router. The hybrid game router receives the modified player actions and transmits the modified player actions to a game server 2820. The game server receives the modified player actions and determines 2822 a new central game state using the player actions. The game server also determines a game state update 2824 that is used by the GWE and the ESE to update their respective local game states. The game server transmits the game state update to the hybrid game router. The hybrid game router receives the game state update and transmits the game state update to the GWE. The GWE uses the game state update to update 2826 its own local game state. The GWE transmits the game state update to the hybrid game router. The hybrid game router receives the game state update and transmits the game state update to the ESE. The ESE receives the game state update and updates 2828 its own local game state.

Figure 28:
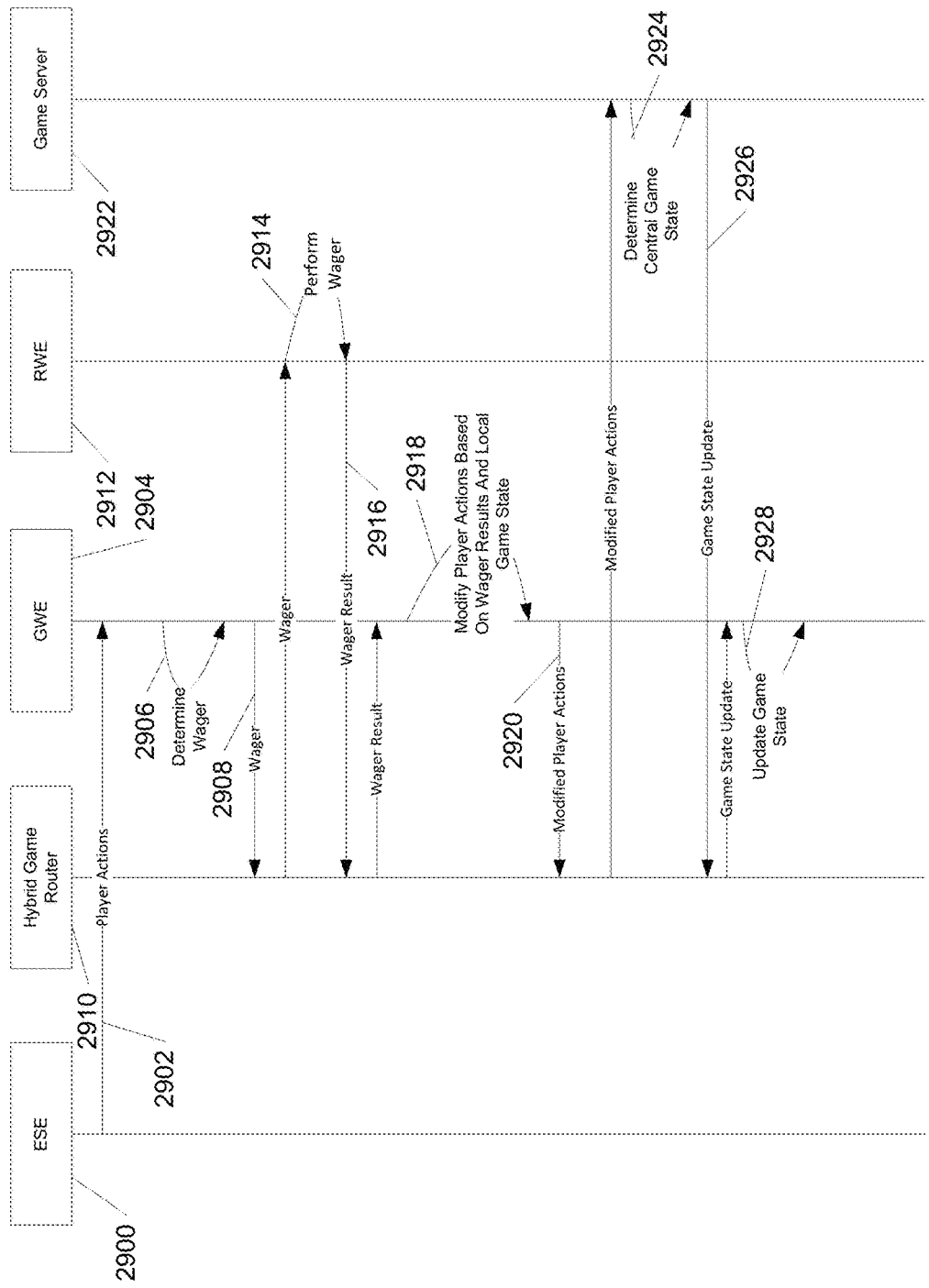
FIG. 28 is a sequence diagram illustrating a sequence of operations between components of a networked hybrid game in accordance with an embodiment of the invention.

FIG. 28 is a sequence diagram illustrating the sequence of operations between components of an online casino in accordance with an embodiment of the invention wherein an ESE and a GWE share the same host. In operation, an ESE 2900 transmits player actions 2902 to a GWE 2904. The GWE receives the player actions and determines 2906 a wager 2908 using the player actions as described herein. The GWE transmits the wager to a hybrid game router 2910. The hybrid game router receives the wager and transmits the wager to an RWE 2912. The RWE receives the wager and executes 2914 a wagering game using the wager as described herein. The RWE transmits a wager result 2916 of the executed wager to the hybrid game router. The hybrid game router receives the wager result and transmits the wager result to the GWE. The GWE receives the wager result and modifies 2918 the player actions based on the wager results and the local game state maintained by the GWE and the ESE as described herein. The GWE transmits the modified player actions 2920 to the hybrid game router. The hybrid game router receives the modified player actions and transmits the modified player actions to a game server 2922. The game server receives the modified player actions and determines 2924 a new central game state using the player actions. The game server also determines a game state update 2926 that is used by the GWE and the ESE to update the local game state. The game server transmits the game state update to the hybrid game router. The hybrid game router receives the game state update and transmits the game state update to the GWE. The GWE uses the game state update to update 2928 the local game state.

As described herein, a GWE and/or an ESE may modify the player actions received from the ESE before those player actions are forwarded to a game server. The modifications to the player actions are based on a wager result received from an RWE. The modified player actions may be modified in such a way that the modifications improve the player's chances for having a successful outcome in the game being played by the player. Alternatively, the player actions may be modified such that they decrease the player's chances of a successful outcome in the game being played by the player.

In various embodiments, an aimbot may be implemented to improve the player's ability to strike a virtual target using a virtual weapon when a wagering outcome is favorable to the player. An aimbot is a game enhancement that assists the player in acquiring a target within the game world. An aimbot is possible because the game state maintained within the ESE or the GWE includes the location of each object that a player may wish to target. The aimbot uses this location information to better define the player's own targeting actions. For example, if an aimpoint of virtual weapon being used by the player indicates that the player is pointing close to, but not exactly at, an object that is a potential target, the aimbot improves the aimpoint of the virtual weapon by modifying the player's actions such that those actions indicate that the player has perfectly aimed the virtual weapon at the object. Alternatively, the aimbot can be used to frustrate the player's ability to acquire a target by throwing off the aimpoint of the virtual weapon such that the player misses the aimed at target.

In many embodiments, a triggerbot is implemented to improve the player's ability to strike a virtual target using a virtual weapon when a wagering outcome is favorable to the player. A triggerbot is used to automatically trigger the firing of the virtual weapon when the aimpoint of the weapon indicates that the virtual weapon is properly aimed at an object representing an intended target. This ensures that the player will hit a target even though the player does not realize that they could have taken the shot. A triggerbot may also be used to increase the rate of triggering of the virtual weapon such that the player may fire the virtual weapon much faster than would normally be possible. Alternatively, a triggerbot can be used to frustrate a player taking a shot by modifying the player's actions such that when the player attempts to trigger the virtual weapon, the player actions are modified to indicate that the player did not trigger the virtual weapon or triggered the virtual weapon much more slowly.

In numerous embodiments, lag may be introduced into the outgoing player actions when a wagering outcome is favorable to the player such that the player's actions are summed up and then the summation of the player's actions are transmitted as a burst of actions, the burst of actions being faster than the player could have performed those actions alone. Alternatively, the transmission of the player's actions could be slowed down to the point where the player is inhibited from playing the game well.

In some embodiments, scripting of player actions may be implemented to either provide additional features for the player, such as the ability to perform a series of complicated actions quickly without hesitation or mistake, or to frustrate the player, such as initiating a series of player actions that disrupt the player's own actions. For example, in a racing game, steering, braking and acceleration actions could be initiated by a script that allow a player to perfectly negotiate a turn at the maximum possible velocity. As an example of scripted actions that frustrate a player, a player's virtual weapon may be triggered to repeatedly fire such that the virtual weapon is quickly depleted.

In numerous embodiments, a locally stored game state or locally stored game resources may be modified in order to provide either an advantage to a player or to frustrate a player without affecting the central game state of the game server. As one example, the amount of ammunition that a player has available for a virtual weapon is modified in the game state in order to either increment the amount of ammunition or to decrement the amount of ammunition. As an example of modifying a resource, the texture maps may be modified for an object such that the object when rendered does not obscure other objects in the game world. Alternatively, the texture map of an object may be modified such that it more easily blends into the surrounding texture maps, such as making the objects texture map identical to surface that is behind the object in the scene graph relative to the player's viewpoint, thus making the object more difficult to see by the player. As another example, an object's texture maps could be modified to make the object more easily seen, such as making the object completely white or in some other way to be highlighted.

In many embodiments, a local game state of a game may be read in order to provide additional information to a player in order to enhance the player's game play. For example, the attributes and position of certain objects or opponents in the game world may be provided to the player.

In numerous embodiments, collision boundaries of certain objects may be removed or altered within the local game state such that a player may move through an object in order to enhance a player's location in the game world. Alternatively, the collision boundaries on objects may be modified such that player is more constricted in movement, thus hindering the player's ability to obtain a favorable position.

Figure 29:
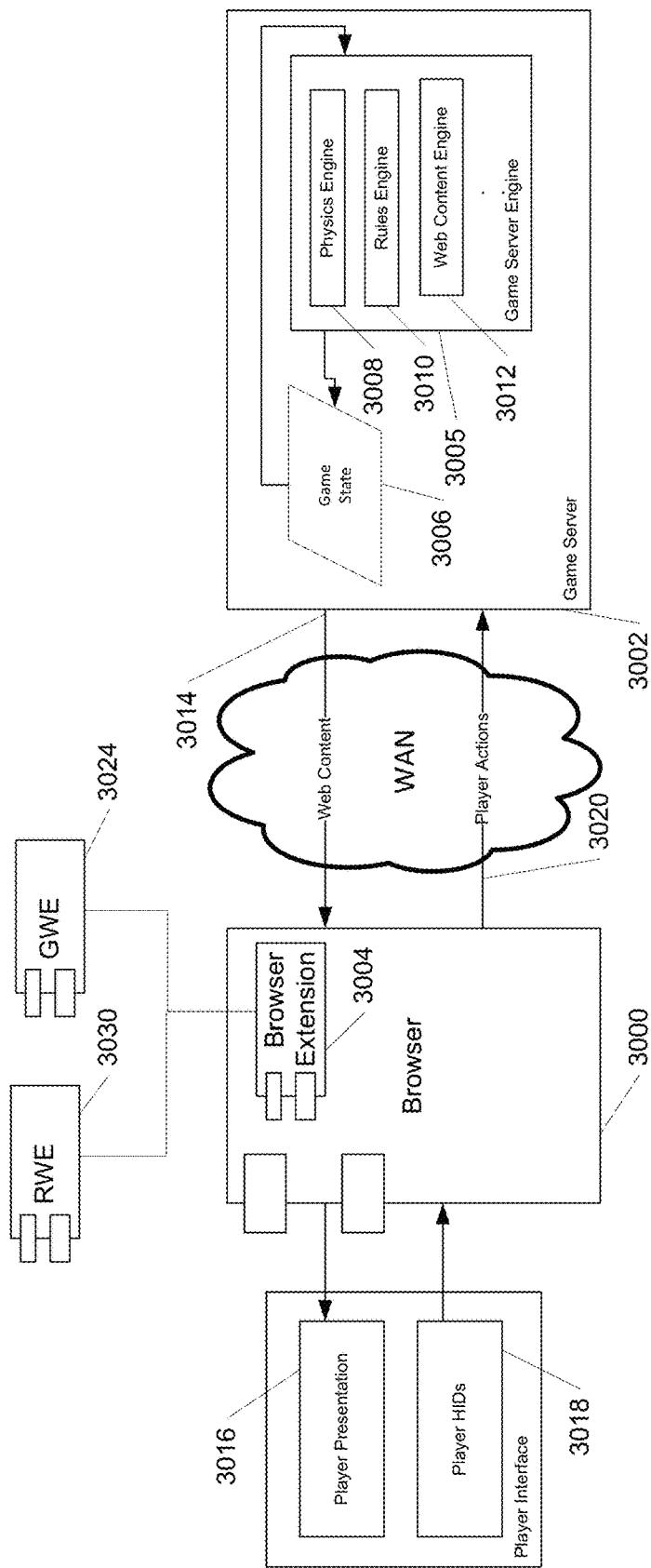
FIG. 29 is a deployment diagram of components of a networked hybrid game in accordance with an embodiment of the invention.
Figure 30:
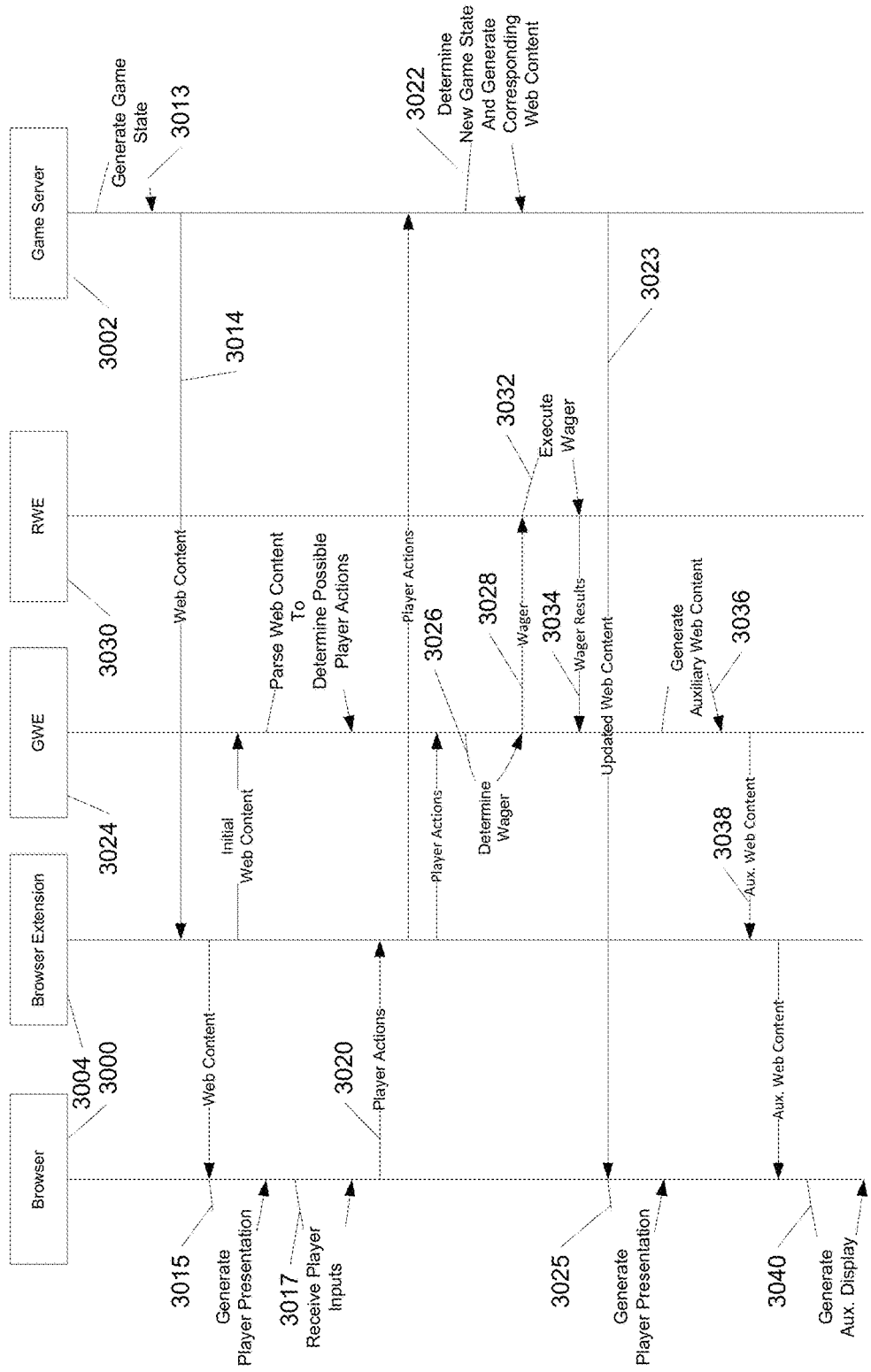
FIG. 30 is a sequence diagram illustrating a sequence of operations between components of a networked hybrid game in accordance with an embodiment of the invention.
Figure 31:
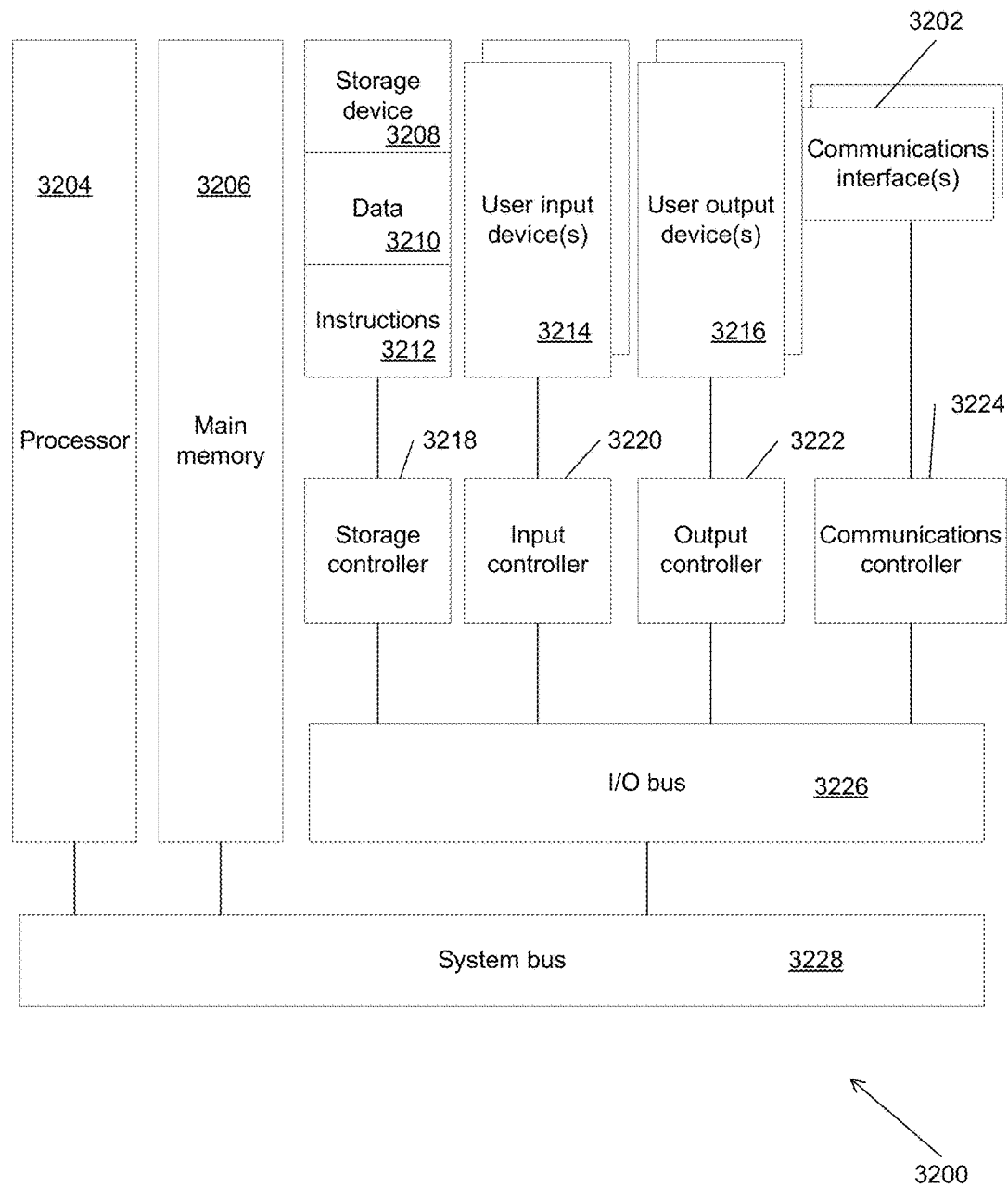
FIG. 31 illustrates a hardware architecture diagram of a processing apparatus utilized in the implementation of a networked hybrid game in accordance with an embodiment of the invention.

Referring now to both FIG. 29 and FIG. 30, FIG. 29 is a component diagram of a browser-based networked hybrid game in accordance with an embodiment of the invention and FIG. 30 is a sequence diagram illustrating interactions between the components of a browser-based networked hybrid game in accordance with an embodiment of the invention. A browser-based networked hybrid game includes a browser 3000 that is hosted by a client host and the browser is operatively coupled to a game server 3002 hosted by a game server host via a WAN connection. The browser includes a browser extension 3004. The game server includes a game server engine 3005 that uses a central game state 3006 to implement a game served by the game server. The game server engine includes components that operate on and use the central game state, such as a physics engine 3008, a game rules engine 3010, and a web content engine 3012, etc. The game server engine uses the central game state to generate 3013 an updated central game state. The game server also uses the web content engine to generate web content 3014 that is transmitted to the browser via the WAN. The browser uses the web content to generate 3015 a player presentation or display 3016 for presentation to a player. The player presentation may include audiovisual and tactile components that are presented to the player while playing the game. The player interacts with the game using one or more player HIDs 3018. The browser receives 3017 the player inputs through the player HIDs and generates player inputs or actions 3020 that are transmitted to the game server via the network. The game server receives the player actions and the game server engine uses the player actions and the central game state to generate 3022 a new central game state. The game server then generates updated web content 3023 that is transmitted to the browser and the browser uses the updated web content to generate 3035 a new player presentation for the player. The processes in both the browser and the game server loop continuously in a game loop while the player continues to play the game.

To implement a networked hybrid game, the browser plugin snoops on the communications between the browser and the game server; and routes those communications to a GWE 3024. The GWE receives the player actions and determines from those player actions which objects the player has selected. The GWE then generates 3026 a wager 3028 for use by an RWE 3030 based on the player actions. The GWE transmits the wager to the RWE and the RWE executes 3032 the wager and returns the wager result 3034 to the GWE. The GWE receives the wager result and generates 3036 auxiliary web content for the browser. The auxiliary web content includes the wager result for display to the player while the player is playing the browser based game. The GWE transmits the auxiliary web content 3038 to the browser extension 3004, the browser extension 3004 receives the auxiliary web content and passes the auxiliary web content to the browser 3000, and the browser generates 3040 an auxiliary display using the auxiliary web content.

Although various embodiments of components of networked hybrid games are discussed above, components of networked hybrid games can be networked in any configuration as appropriate to the requirements of a specific application in accordance with embodiments of the invention. In certain embodiments, components of a networked hybrid game, such as a GWE, RWE, ESE, router or server that performs services for a GWE, RWE, ESE, server or router can be networked in different configurations for a specific networked hybrid game gameplay application.

Processing Apparatus

Any of a variety of processing apparatuses can host various components of a networked hybrid game or an online casino utilizing a networked hybrid game in accordance with embodiments of the invention. In several embodiments, these processing apparatuses can include, but are not limited to, a mobile device such as a tablet computer or smartphone, a dedicated gaming machine, a general purpose computer, a computing device and/or a controller. A processing apparatus that is constructed to implement a component of a networked hybrid game or an online casino in accordance with various embodiments of the invention is illustrated in FIG. 32. In the processing apparatus 3200, a processor 3204 is coupled to a memory 3206 by a bus 3228. The processor 3204 is also coupled to non-transitory processor-readable storage media, such as a storage device 3208 that stores processor-executable instructions 3212 and data 3210 through the system bus 3228 to an I/O bus 3226 through a storage controller 3218. The processor 3204 is also coupled to one or more interfaces that may be used to connect the processor to other processing apparatuses as well as networks as described herein. The processor 3204 is also coupled via the bus to user input devices 3214, such as tactile devices including but not limited to keyboards, keypads, foot pads, touch screens, and/or trackballs, as well as non-contact devices such as audio input devices, motion sensors and motion capture devices that the processing apparatus may use to receive inputs from a user when the user interacts with the processing apparatus. The processor 3204 is connected to these user input devices 3214 through the system bus 3228, to the I/O bus 3226 and through the input controller 3220. The processor 3204 is also coupled via the bus to user output devices 3216 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 3228 to the I/O bus 3226 and through the output controller 3222. The processor 3204 can also be connected to a communications interface 3202 from the system bus 3228 to the I/O bus 3226 through a communications controller 3224.

In various embodiments, a processor loads the instructions and the data from the storage device into the memory and executes the instructions and operates on the data to implement the various aspects and features of the components of a gaming system as described herein. The processor uses the user input devices and the user output devices in accordance with the instructions and the data in order to create and operate user interfaces for players, casino operators, and/or owners as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, the storage device can include removable media such as but not limited to a USB memory device, an optical CD ROM, magnetic media such as tape and disks. Also, the storage device can be accessed through one of the interfaces or over a network. Furthermore, any of the user input devices or user output devices can be coupled to the processor via one of the interfaces or over a network. In addition, although a single processor is described, the processor can be a controller or other computing device or a separate computer as well as be composed of multiple processors or computing devices.

In numerous embodiments, any component of a networked hybrid game including an RWE, GWE, ESE, router or server as described herein can be implemented on multiple processing apparatuses, whether dedicated, shared or distributed in any combination thereof, or may be implemented on a single processing apparatus. In addition, while certain aspects and features of a networked hybrid game described herein have been attributed to an RWE, GWE, ESE, router or server, these aspects and features may be implemented in a hybrid form where any of the features or aspects may be performed by any of a RWE, GWE, ESE, router or server within a networked hybrid game or an online casino without deviating from the spirit of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A networked gaming system, comprising:
an entertainment software controller connected by a network to a game world controller, the entertainment software controller constructed to:
provide a skill-based entertainment game stored on non-transitory computer-readable media;
present a visual display of the skill-based entertainment game;
generate data for a first player action of the skill-based entertainment game;
distribute via a network the first player action taken by a first player during the first player's skillful execution of the skill-based entertainment game;
receive, from the game world controller, a modified game status update based on the first player action and a wager result;
distribute via the network the modified game status update for the visual display for a second player based on the modified update; and
update the visual display to incorporate the modified game status to the second player;
the game world controller connected by the network to the entertainment software controller and a game server, the game world controller constructed to:
receive, from the entertainment software controller, the first player action during the first player's skillful execution of the skill-based entertainment game;
generate a wager of real world credits for a gambling game based on the received first player action;
distribute, to a real world controller, the wager;
receive, from the real world controller, the wager result for the wager;
transmit, to a game server, the first player action;
receive, from the game server, a game state update of the skill-based entertainment game based on the first player action;
generate the modified game state update on the basis of the game state update and the wager result; and
distribute, to the entertainment software controller, the modified game state update; and the real world controller connected to the game world controller, and constructed to:
receive the wager from the game world controller; and
provide a wager result from the wager made in the gambling game using a random number generator.

2. The networked hybrid game of claim 1, wherein:
the game world controller is further constructed to:
generate a modified first player action based on the first player action and the received wagering result.

3. The networked hybrid game of claim 2, wherein the modified first player action provides an advantage to the first player.

4. The networked hybrid game of claim 1, wherein the modified game state provides an advantage to the first player.

5. The networked hybrid game of claim 1, wherein the modified game state provides an additional game object for the first player.

6. The networked hybrid game of claim 1, wherein the entertainment software controller is a game client.

7. The networked hybrid game of claim 1, wherein the entertainment software controller is a browser.

8. A networked gaming system, comprising:
an entertainment software controller connected by a network to a game world controller, the entertainment software controller constructed to:
provide a skill-based entertainment game stored on non-transitory computer-readable media;
present a visual display of the skill-based entertainment came;
generate data for a first player action of the skill-based entertainment game;
distribute via a network the first player action taken by a first player during the first player's skillful execution of the skill-based entertainment game;
receive, from the game world controller, a modified game status update based on the first player action and a wager result;
distribute via the network the modified game status update for a visual display for a second player based on the modified update; and
update the visual display to incorporate the modified game status to the second player;
the game world controller connected by the network to the entertainment software controller and a game server, the game world controller constructed to:
receive, from the entertainment software controller, the first player action during the first player's skillful execution of the skill-based entertainment game;
generate a wager of real world credits for a gambling game based on the received first player action;
distribute, to a real world controller, the wager;
receive, from the real world controller, the wager result based on a random number generator for the wager;
distribute, to a game server, the first player action;
receive, from the game server, a game state update of the skill-based entertainment game based on the first player action;
generate the modified game state update on the basis of the game state update and the wager result; and
distribute, to the entertainment software controller, the modified game state update.

9. The networked hybrid game of claim 8, wherein:
the game world controller is further constructed to:
generate a modified first player action based on the first player action and the received wagering result.

10. The networked hybrid game of claim 9, wherein the modified first player action provides an advantage to the first player.

11. The networked hybrid game of claim 8, wherein the modified game state provides an advantage to the first player.

12. The networked hybrid game of claim 8, wherein the modified game state provides an additional game object for the first player.

13. The networked hybrid game of claim 8, wherein the entertainment software controller is a game client.

14. The networked hybrid game of claim 8, wherein the entertainment software controller is a browser.

15. A networked gaming system, comprising:
a game world controller connected by a network to an entertainment software controller and a game server, the game world controller constructed to:
provide a skill-based entertainment game stored on non-transitory computer-readable media and executed by the entertainment software controller;
receive, from the entertainment software controller, a first player action taken by a first player during the first player's skillful execution of the skill-based entertainment game using a first visual display of a first player presentation presented by the entertainment software controller;
generate a wager of real world credits for a gambling game based on the received first player action;
distribute, to a real world controller, the wager;
receive, from the real world controller, a wager result for the wager;
distribute, to a game server, the first player action;
receive, from the game server, a game state update of the skill-based entertainment game based on the first player action;
generate a modified game state update on the basis of the game state update and the wager result; and
distribute, to the entertainment software controller, the modified game state update, the modified game state used to generate a second visual display of the modified game status to the second player presented by the entertainment software controller; and
the real world controller connected to the game world controller, and constructed to:
receive the wager from the game world controller; and
provide a wager result from the wager made in the gambling game using a random number generator.

16. The networked hybrid game of claim 15, wherein:
the game world controller is further constructed to:
generate a modified first player action based on the first player action and the received wagering result.

17. The networked hybrid game of claim 16, wherein the modified first player action provides an advantage to the first player.

18. The networked hybrid game of claim 15, wherein the modified game state provides an advantage to the first player.

19. The networked hybrid game of claim 15, wherein the modified game state provides an additional game object for the first player.

20. The networked hybrid game of claim 15, wherein the entertainment software controller is a game client.

* * * * *